(12) United States Patent
Nishikawa et al.

(10) Patent No.: US 9,575,401 B2
(45) Date of Patent: Feb. 21, 2017

(54) LIGHT SOURCE APPARATUS AND IMAGE DISPLAY APPARATUS

(71) Applicant: Sony Corporation, Tokyo (JP)

(72) Inventors: Jun Nishikawa, Kanagawa (JP); Kazuya Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/176,394

(22) Filed: Jun. 8, 2016

(65) Prior Publication Data

US 2016/0282709 A1 Sep. 29, 2016

Related U.S. Application Data

(63) Continuation of application No. 14/051,552, filed on Oct. 11, 2013, now Pat. No. 9,395,611.

(30) Foreign Application Priority Data

Oct. 18, 2012 (JP) ................... 2012-230457

(51) Int. Cl.
*G03B 21/14* (2006.01)
*G03B 21/20* (2006.01)
*G02B 26/00* (2006.01)

(52) U.S. Cl.
CPC ......... *G03B 21/2066* (2013.01); *G02B 26/008* (2013.01); *G03B 21/142* (2013.01); *G03B 21/204* (2013.01); *G03B 21/208* (2013.01); *G03B 21/2013* (2013.01); *G03B 21/2033* (2013.01)

(58) Field of Classification Search
CPC . G03B 21/142; G03B 21/2066; G03B 21/204; F21V 7/04

USPC ........... 362/84, 247, 296.01, 341, 347, 800; 353/84, 98, 99

See application file for complete search history.

(56) References Cited

U.S. PATENT DOCUMENTS

| | | | |
|---|---|---|---|
| 7,066,609 B2 | 6/2006 | Ishihara et al. | |
| 8,662,678 B2 | 3/2014 | Hirata et al. | |
| 9,395,611 B2 | 7/2016 | Nishikawa et al. | |
| 2013/0321777 A1 | 12/2013 | Wang et al. | |

(Continued)

FOREIGN PATENT DOCUMENTS

| | | |
|---|---|---|
| CN | 102053468 A | 5/2011 |
| CN | 201886268 U | 6/2011 |

(Continued)

*Primary Examiner* — William C Dowling
(74) *Attorney, Agent, or Firm* — Wolf, Greenfield & Sacks, P.C.

(57) ABSTRACT

A light source apparatus includes: at least one solid-state light source configured to output light in a predetermined wavelength range; a first optical system including at least one aspherical surface configured to convert a light flux from the solid-state light source into a substantially parallel light flux; an output unit including at least one light emitter that is excited by the light and emits visible light with a wavelength longer than that of the light, the output unit being configured to output light containing the light and the visible light; and a second optical system including at least one concave reflecting surface and being configured to reflect the light on the concave reflecting surface, the light coming from the solid-state light source and being converted into the substantially parallel light flux by the first optical system, to collect the light to the light emitter of the output unit.

10 Claims, 59 Drawing Sheets

(56) References Cited

U.S. PATENT DOCUMENTS

| | | | |
|---|---|---|---|
| 2014/0111775 A1 | 4/2014 | Nishikawa et al. | |
| 2014/0362350 A1 | 12/2014 | Takamatsu | |
| 2015/0049307 A1 | 2/2015 | Kashihara | |
| 2015/0098065 A1* | 4/2015 | Tanaka | G03B 21/2013 353/84 |
| 2015/0277217 A1 | 10/2015 | Takamatsu et al. | |
| 2015/0293432 A1* | 10/2015 | Kimura | G03B 21/208 353/31 |

FOREIGN PATENT DOCUMENTS

| | | |
|---|---|---|
| CN | 102540679 A | 7/2012 |
| JP | 05-082100 A | 4/1993 |
| JP | 09-043511 A | 2/1997 |
| JP | 2001-356404 A | 12/2001 |
| JP | 3102988 U | 7/2004 |
| JP | 2010-177035 A | 8/2010 |
| JP | 2011-065770 A | 3/2011 |
| JP | 2011-129448 A | 6/2011 |
| JP | 2012-037681 A2 | 2/2012 |
| JP | 2012-137608 A | 7/2012 |
| WO | WO 2010/138190 A1 | 12/2010 |

* cited by examiner

|  |  |
|---|---|
| NA of object side | 0.8116 |
| Focal length (f1) of first optical system | 5.064 |
| Focal length (f2) of second optical system | 43.480 |

| | | Curvature radius | Interval | n(445nm) | Remarks |
|---|---|---|---|---|---|
| | First light-source surface | infinity | 0.300 | | Initial surface of array |
| First optical system | S1 | infinity | 0.250 | 1.53308 | |
| | S2 | infinity | 1.600 | | |
| | S3 | infinity | 4.500 | 1.49959 | Collimator lens |
| | S4(Aspheric surface) | -13.180 | 50.000 | | End surface of array |
| Second optical system | S5(Aspheric surface) | -86.960 | -43.600 | | Concave reflecting surface |
| | S6(Eccentric surface) | infinity | -0.700 | 1.53308 | |
| | Second light-source surface | infinity | 0.000 | | |

| | A2 | A3 | A4 | A5 | A6 | A8 | A10 |
|---|---|---|---|---|---|---|---|
| K | | | | | | | |
| 10.80000 | -1.597E-01 | 6.733E-05 | -3.409E-03 | 1.749E-04 | -1.901E-04 | 1.237E-06 | -6.305E-07 |

S5

| K |
|---|
| -1.00000 |

S6

| Rotation about y axis | 40 degrees |
|---|---|
| Shift along x axis | -2.0mm |

FIG.9

| NA of object side | 0.8067 |
|---|---|
| Focal length (f1) of first optical system | 5.355 |
| Focal length (f2) of second optical system | 55.620 |

| | | Curvature radius | Interval | n(445nm) | Remarks |
|---|---|---|---|---|---|
| First optical system | First light-source surface | infinity | 0.300 | | Initial surface of array |
| | S1 | infinity | 0.250 | 1.53308 | |
| | S2 | infinity | 1.780 | | |
| | S3 | infinity | 4.500 | 1.49959 | |
| | S4(Aspheric surface) | -15.700 | 50.000 | | End surface of array |
| Second optical system | S5(Aspheric surface) | -111.240 | -32.290 | | Concave reflecting surface |
| | S6(Eccentric surface) | infinity | 17.500 | | Planar reflecting surface |
| | S7(Eccentric surface) | infinity | 0.700 | 1.53308 | |
| | Second light-source surface | infinity | 0.000 | | |

FIG.14

| S4 | | | | | | | |
|---|---|---|---|---|---|---|---|
| K | A2 | A3 | A4 | A5 | A6 | A8 | A10 |
| 10.50000 | -1.590E-01 | 5.876E-05 | -3.294E-03 | 2.013E-04 | -1.879E-04 | 2.255E-06 | -5.572E-07 |

| S5 | |
|---|---|
| K | -1.00000 |

| S6 | |
|---|---|
| Rotation about y axis | 20 degrees |

| S7 | |
|---|---|
| Shift along x axis | 14.97mm |

FIG.15

| | NA of object side | 0.8116 |
|---|---|---|
| | Focal length (f1) of first optical system | 5.064 |
| | Focal length (f2) of second optical system | 76.685 |

| | | Curvature radius | Interval | n(445nm) | Remarks |
|---|---|---|---|---|---|
| First optical system | First light-source surface | infinity | 0.300 | | |
| | S1 | infinity | 0.250 | 1.53308 | Initial surface of array |
| | S2 | infinity | 1.600 | | |
| | S3 | infinity | 4.500 | 1.49959 | |
| | S4(Aspheric surface) | -13.180 | 50.000 | | End surface of array |
| | S5(Aspheric surface) | -114.000 | -54.900 | | Concave reflecting surface |
| Second optical system | S6(Eccentric surface) | infinity | -0.900 | 1.48157 | Concave lens |
| | S7 | -2.800 | -3.300 | | |
| | S8 | infinity | -0.700 | 1.53308 | |
| | Second light-source surface | infinity | 0.000 | | |

| | A2 | A3 | A4 | A5 | A6 | A8 | A10 |
|---|---|---|---|---|---|---|---|
| K | | | | | | | |
| 10.80000 | -1.579E-01 | 6.733E-05 | -3.409E-03 | 1.749E-04 | -1.901E-04 | 1.237E-06 | -6.305E-07 |

S5

| K | |
|---|---|
| -1.00000 | |

S6

| Rotation about y axis | 40 degrees |
|---|---|
| Shift along x axis | -1.8mm |

FIG.21

| | NA of object side | 0.7621 |
|---|---|---|
| | Focal length (f1) of first optical system | 5.547 |
| | Focal length (f2) of second optical system | 76.685 |

| | | Curvature radius | Interval | n(445nm) | Remarks |
|---|---|---|---|---|---|
| | First light-source surface | infinity | 0.300 | | |
| First optical system | S1 | infinity | 0.250 | 1.53308 | Initial surface of array |
| | S2 | infinity | 1.600 | | |
| | S3 | infinity | 4.600 | 1.47713 | |
| | S4(Aspheric surface) | -121.635 | 90.000 | | End surface of array |
| | S5(Aspheric surface) | -127.500 | -62.000 | | Concave reflecting surface |
| Second optical system | S6(Eccentric surface) | infinity | -1.000 | 1.49959 | Concave lens |
| | S7(Aspheric surface) | -3.000 | -6.200 | | |
| | S8 | infinity | -0.700 | 1.53308 | |
| | Second light-source surface | infinity | 0.000 | | |

FIG.25

| S4 | K | A2 | A3 | A4 | A5 | A6 | A8 | A10 |
|---|---|---|---|---|---|---|---|---|
| | 19.30000 | -1.848E-01 | 1.423E-04 | -3.728E-03 | 4.152E-04 | -2.617E-04 | 6.470E-06 | -6.977E-07 |

| S5 | K |
|---|---|
| | -1.00000 |

| S6 | | |
|---|---|---|
| Rotation about y axis | 55 degrees | |
| Shift along x axis | -2.5mm | |

Odd-order aspheric surface

| S7 | K | A2 | A3 | A4 | A5 | A6 | A8 | A10 |
|---|---|---|---|---|---|---|---|---|
| | -8.80000 | -2.103E-01 | 1.602E-01 | -9.772E-02 | -3.199E-02 | 3.460E-02 | -3.882E-03 | 2.226E-04 |

FIG.26

| | NA of object side | 0.7843 |
|---|---|---|
| | Focal length (f1) of first optical system | 5.355 |
| | Focal length (f2) of second optical system | 133.933 |

| | | Curvature radius | Interval | n(445nm) | Remarks |
|---|---|---|---|---|---|
| First optical system | First light-source surface | infinity | 0.300 | | Initial surface of array |
| | S1 | infinity | 0.250 | 1.53308 | |
| | S2 | infinity | 1.780 | | |
| | S3 | infinity | 5.000 | 1.47713 | End surface of array |
| | S4 (Aspheric surface) | 63.330 | 5.000 | | Concave reflecting surface |
| | S5 (Aspheric surface) | -22.960 | -13.000 | | Concave reflecting surface |
| Second optical system | S6 | 2.800 | 16.000 | | |
| | S7 | infinity | 0.700 | 1.53308 | |
| | Second light-source surface | infinity | 0.000 | | |

FIG.31

| | K | A2 | A3 | A4 | A5 | A6 | A8 | A10 |
|---|---|---|---|---|---|---|---|---|
| S4 | -12.00000 | -2.036E-01 | 1.356E-04 | -3.949E-03 | 2.227E-04 | -2.140E-04 | 2.091E-06 | -7.666E-07 |

| | K |
|---|---|
| S5 | -1.09000 |

FIG.32

| NA of object side | 0.7843 |
|---|---|
| Focal length (f1) of first optical system | 5.355 |
| Focal length (f2) of second optical system | 174.571 |

| | | Curvature radius | Interval | n(445nm) | Remarks |
|---|---|---|---|---|---|
| | First light-source surface | infinity | 0.300 | | Initial surface of array |
| First optical system | S1 | infinity | 0.250 | 1.53308 | |
| | S2 | infinity | 1.600 | | |
| | S3 | infinity | 4.500 | 1.47713 | |
| | S4 (Aspheric surface) | 63.330 | 20.000 | | End surface of array |
| Second optical system | S5 (Aspheric surface) | -31.360 | -17.500 | | Concave reflecting surface |
| | S6 | 3.340 | 18.600 | | Concave reflecting surface |
| | S7 | infinity | 0.700 | 1.53308 | |
| | Second light-source surface | infinity | 0.000 | | |

FIG.36

| S4 | | | | | | | | |
|---|---|---|---|---|---|---|---|---|
| K | A2 | A3 | A4 | A5 | A6 | A8 | A10 |
| -12.00000 | -2.036E-01 | 1.356E-04 | -3.949E-03 | 2.227E-04 | -2.140E-04 | 2.091E-06 | -7.666E-07 |

| S5 | |
|---|---|
| K | |
| -1.08000 | |

FIG.37

| NA of object side | 0.8067 |
|---|---|
| Focal length (f1) of first optical system | 5.355 |
| Focal length (f2) of second optical system | 219.040 |

| | | Curvature radius | Interval | n(445nm) | Remarks |
|---|---|---|---|---|---|
| First optical system | First light-source surface | infinity | 0.300 | | Initial surface of array |
| | S1 | infinity | 0.250 | 1.53308 | |
| | S2 | infinity | 1.780 | | |
| | S3 | infinity | 4.500 | 1.49959 | |
| | S4(Aspheric surface) | -15.700 | 50.000 | | End surface of array |
| Second optical system | S5(Aspheric surface) | -111.240 | -66.000 | | Concave reflecting surface |
| | S6 | 16.556 | 37.000 | | Concave reflecting surface |
| | S7 | infinity | 0.700 | 1.53308 | |
| | Second light-source surface | infinity | 0.000 | | |

FIG.41

| S4 | K | A2 | A3 | A4 | A5 | A6 | A8 | A10 |
|---|---|---|---|---|---|---|---|---|
| | 10.50000 | -1.590E-01 | 5.876E-05 | -3.294E-03 | 2.013E-04 | -1.879E-04 | 2.255E-06 | -5.572E-07 |

| S5 | K |
|---|---|
| | -1.07700 |

FIG.42

| NA of object side | 0.8116 |
|---|---|
| Focal length (f1) of first optical system | 5.064 |
| Focal length (f2) of second optical system | 37.494 |

| | | Curvature radius | Interval | n(445nm) | Remarks |
|---|---|---|---|---|---|
| | First light-source surface | infinity | 0.300 | | Initial surface of array |
| First optical system | S1 | infinity | 0.250 | 1.53308 | |
| | S2 | infinity | 1.600 | | |
| | S3 | infinity | 4.500 | 1.49959 | |
| | S4 (Aspheric surface) | -13.180 | -15.500 | | End surface of array |
| Second optical system | S5 (Aspheric surface) | -22.050 | -8.000 | | Concave reflecting surface |
| | S6 (Aspheric surface) | -8.570 | 10.000 | | Convex reflecting surface |
| | S7 | infinity | 0.700 | 1.53308 | |
| | Second light-source surface | infinity | 0.000 | | |

FIG.47

| S4 | K | A2 | A3 | A4 | A5 | A6 | A8 | A10 |
|---|---|---|---|---|---|---|---|---|
| | 10.80000 | -1.597E-01 | 6.733E-05 | -3.409E-03 | 1.749E-04 | -1.901E-04 | 1.237E-06 | -6.305E-07 |

| S5 | K |
|---|---|
| | -1.09000 |

| S6 | K |
|---|---|
| | -1.64000 |

FIG.48

| | | |
|---|---|---|
| NA of object side | 0.8116 | |
| Focal length (f1) of first optical system | 5.064 | |
| Focal length (f2) of second optical system | 23.908 | |

| | | Curvature radius | Interval | n(445nm) | Remarks |
|---|---|---|---|---|---|
| | First light-source surface | infinity | 0.300 | | Initial surface of array |
| First optical system | S1 | infinity | 0.250 | 1.53308 | |
| | S2 | infinity | 1.600 | | |
| | S3 | infinity | 4.500 | 1.49959 | |
| | S4 (Aspheric surface) | -13.180 | 11.000 | | End surface of array |
| Second optical system | S5 (Aspheric surface) | -15.340 | -5.500 | | Concave reflecting surface |
| | S6 (Aspheric surface) | 16.556 | 6.500 | | Convex reflecting surface |
| | S7 | infinity | 0.560 | 1.53308 | |
| | Second light-source surface | infinity | 0.000 | | |

FIG.52

| S4 | | | | | | | |
|---|---|---|---|---|---|---|---|
| K | A2 | A3 | A4 | A5 | A6 | A8 | A10 |
| 10.80000 | -1.597E-01 | 6.733E-05 | -3.409E-03 | 1.749E-04 | -1.901E-04 | 1.237E-06 | -6.305E-07 |

| S5 | |
|---|---|
| K | -0.84000 |

| S6 | |
|---|---|
| K | -1.56000 |

FIG.53

| Embodiment No. | Second optical component | |f1| | |f2| | fM(=R2/2) | fm | KM | Am | f2/f1 | f2/fM | f2/fm | fM/fm |
|---|---|---|---|---|---|---|---|---|---|---|---|
| 1st Embodiment | None | 5.064 | 43.480 | 43.480 | (-) | | (-) | 8.586 | 1.000 | (-) | (-) |
| 2nd Embodiment | Planar reflecting surface | 5.355 | 55.620 | 55.620 | infinity | -1.000 | 20.000 | 10.387 | 1.000 | (-) | (-) |
| 3rd Embodiment | Lens | 5.064 | 76.685 | 57.000 | -5.814 | -1.000 | (-) | 15.143 | 1.345 | -13.189 | -9.803 |
| 4th Embodiment | Lens | 5.547 | 76.685 | 107.681 | -2.655 | -1.000 | (-) | 13.824 | 0.712 | -28.884 | -40.559 |
| 5th Embodiment | Concave reflecting surface | 5.355 | 133.933 | 11.480 | 1.400 | -1.090 | (-) | 25.012 | 11.667 | 95.666 | 8.200 |
| 6th Embodiment | Concave reflecting surface | 5.355 | 174.571 | 15.680 | 1.670 | -1.080 | (-) | 32.602 | 11.133 | 104.534 | 9.389 |
| 7th Embodiment | Concave reflecting surface | 5.355 | 219.040 | 55.620 | 8.278 | -1.077 | (-) | 40.907 | 3.938 | 26.460 | 6.719 |
| 8th Embodiment | Convex reflecting surface | 5.064 | 37.494 | 11.025 | -4.285 | -1.090 | (-) | 7.404 | 3.401 | -8.750 | -2.573 |
| 9th Embodiment | Convex reflecting surface | 5.064 | 23.908 | 7.670 | -8.278 | -0.840 | (-) | 4.721 | 3.117 | -2.888 | -0.927 |

FIG.54

LIGHT SOURCE APPARATUS AND IMAGE DISPLAY APPARATUS

CROSS REFERENCE TO RELATED APPLICATIONS

This application is a continuation of and claims the benefit under 35 U.S.C. §120 of U.S. patent application Ser. No. 14/051,552, titled "LIGHT SOURCE APPARATUS AND IMAGE DISPLAY APPARATUS," filed on Oct. 11, 2013, which claims priority under 35 U.S.C. §119(a) to Japanese Priority Patent Application JP 2012-230457 filed on Oct. 18, 2012. The entire contents of these applications are incorporated herein by reference.

BACKGROUND

The present disclosure relates to a light source apparatus and an image display apparatus using the light source apparatus.

Recently, products including solid-state light sources such as a light-emitting diode (LED) and a laser diode (LD) have been increasingly used. The solid-state light sources are adopted as light sources used in projectors for presentation and digital cinema, instead of mercury lamps, xenon lamps, and the like used in related art. The solid-state light sources such as LEDs have advantages such as having long lifetime, no replacement of lamps, which is necessary in related art, and lighting-up immediately after power-on.

Such a projector includes a type in which a solid-state light source such as an LED is directly used as a light source. On the other hand, there is another type in which a light emitter such as a phosphor, which is excited by excitation light to emit light, is used as a light source. In this case, the solid-state light source is used as an excitation light source that outputs excitation light.

For example, Japanese Patent Application Laid-open No. 2012-8303 proposes an optical system in which a collimated laser light beam is collected onto a phosphor by using a convex lens (see paragraph [0014], FIG. 1, etc. of Japanese Patent Application Laid-open No. 2012-8303). Further, Japanese Patent Application Laid-open No. 2012-37681 proposes an optical system including mirrors arranged in a stepwise manner and convex lenses. In this optical system, intervals of light fluxes from a plurality of light sources are narrowed by the mirrors arranged in the stepwise manner. Then, light is collected onto a phosphor by the convex lenses (see paragraph [0052], FIG. 1, etc. of Japanese Patent Application Laid-open No. 2012-37681).

Futhermore, Japanese Patent Application Laid-open No. 2012-58638 proposes an optical system in which a light collecting optical system is used instead of convex lenses in order to collect light from a plurality of light sources in a small space. This light collecting optical system is formed of an aggregate of small lenses, in which a plurality of small lenses each having a planar incidence plane and an aspherical-convex emission plane are arranged. An incidence plane of the light collecting optical system is a continuous plane, and an emission plane of the light collecting optical system is provided with a difference in level such that a center thereof recedes more along an optical axis of the light source apparatus (see paragraph [0038], FIG. 4, etc. of Japanese Patent Application Laid-open No. 2012-58638).

SUMMARY

In the optical systems disclosed in Japanese Patent Application Laid-open Nos. 2012-8303, 2012-37681, and 2012-58638, in the case where the number of light sources is increased in order to attain a high luminance, the convex lens, the mirrors arranged in the stepwise manner, and the light collecting optical system described above are inevitably increased in size. As a result, the apparatus is enlarged.

For example, in the optical system disclosed in Japanese Patent Application Laid-open No. 2012-8303, when the width of a light flux of a laser light source is increased, a large-sized lens has to be used. Additionally, it is also necessary to arrange the lens at a position distant from the laser light source. As a result, the apparatus is enlarged in an optical-axis direction and a diameter direction.

In the optical system disclosed in Japanese Patent Application Laid-open No. 2012-37681, the intervals of optical axes entering the convex lenses can be narrowed by the mirrors arranged in the stepwise manner. However, an area of the mirror itself is inevitably increased, which enlarges the apparatus.

In the case of using the light collecting optical system disclosed in Japanese Patent Application Laid-open No. 2012-58638, it may be possible to achieve downsizing more than when using the convex lens disclosed in Japanese Patent Application Laid-open No. 2012-8303. However, along with the increase in number of light sources, an increase in area of the incidence plane is difficult to avoid, and the apparatus is enlarged.

In view of the circumstances as described above, it is desirable to provide a light source apparatus and an image display apparatus that are capable of attaining a high luminance while suppressing an increase in size of the apparatuses.

In view of the circumstances as described above, according to an embodiment of the present disclosure, there is provided a light source apparatus including at least one solid-state light source, a first optical system, an output unit, and a second optical system.

The at least one solid-state light source is configured to output light in a predetermined wavelength range.

The first optical system includes at least one aspherical surface configured to convert a light flux from the at least one solid-state light source into a substantially parallel light flux.

The output unit includes at least one light emitter that is excited by the light from the at least one solid-state light source and emits visible light with a wavelength longer than that of the light, the output unit being configured to output, as output light, light containing the light in the predetermined wavelength range and the visible light from the at least one light emitter.

The second optical system includes at least one concave reflecting surface, the second optical system being configured to reflect the light on the at least one concave reflecting surface, the light coming from the at least one solid-state light source and being converted into the substantially parallel light flux by the first optical system, to collect the light to the at least one light emitter of the output unit.

In the light source apparatus, the first optical system including the at least one aspherical surface allows the light flux from the at least one solid-state light source to be converted into the substantially parallel light flux. Then, the light of the substantially parallel light flux is reflected on the at least one concave reflecting surface of the second optical system to be collected to the at least one light emitter of the output unit. The light containing the light in the predetermined wavelength range from the solid-state light source and the visible light from the light emitter is output from the output unit. In such a manner, the use of the concave reflecting surface to collect the light to the light emitter allows the light source apparatus to be made compact. For example, even in the case where the number of laser light sources is increased in order to attain a high luminance, the increase in size of the second optical system can be suppressed. As a result, it is possible to attain a high luminance while suppressing an increase in size of the apparatus.

Each of the first optical system and the second optical system may have a focal length that satisfies the following expression, $$1<f2/f1<80$$

where f1 represents the focal length of the first optical system, and f2 represents the focal length of the second optical system.

The generation of displacement of a position of the light collected by the second optical system can be suppressed by setting the focal length of the first optical system and that of the second optical system so as to satisfy the above expression.

The at least one concave reflecting surface may include a rotation-symmetric aspherical surface that satisfies the following expression, $$-1.5<Km<-0.5$$

where Km represents a conic constant of the at least one concave reflecting surface.

The accuracy of light collection by the second optical system can be improved by setting the concave reflecting surface serving as the rotation-symmetric aspherical surface so as to satisfy the above expression.

The at least one concave reflecting surface may include a free-form surface that is free from an axis of rotational symmetry.

The second optical system may include an optical member configured to guide the light to the at least one light emitter, the light coming from the at least one solid-state light source and being reflected on the at least one concave reflecting surface.

The degree of freedom on the design of the second optical system can be increased by providing such an optical member. As a result, the downsizing of the light source apparatus can be achieved.

The optical member may have a focal length that satisfies the following expression, $$-200<f2/fm<200$$

where f2 represents a focal length of the second optical system, and fm represents a focal length of the optical member.

The accuracy of light collection by the second optical system can be improved by setting the focal length of the optical member so as to satisfy the above expression.

The optical member may include a lens and have a focal length that satisfies the following expression, $$-100<fM/fm<100$$

where fM represents a focal length of the at least one concave reflecting surface, and fm represents a focal length of the lens.

The accuracy of light collection by the second optical system can be improved by setting the focal length of the lens serving as the optical member so as to satisfy the above expression.

The optical member may include a second concave reflecting surface that is different from a first concave reflecting surface serving as the at least one concave reflecting surface of the second optical system, the optical member having a focal length that satisfies the following expression, $$0.5<fM/fm<50$$

where fM represents a focal length of the first concave reflecting surface, and fm represents the focal length of the optical member.

The accuracy of light collection by the second optical system can be improved by setting the focal length of the optical member including the second concave reflecting surface so as to satisfy the above expression.

The optical member may include a convex reflecting surface and have a focal length that satisfies the following expression, $$-50<fM/fm<-0.5$$

where fM represents a focal length of the at least one concave reflecting surface, and fm represents the focal length of the optical member.

The accuracy of light collection by the second optical system can be improved by setting the focal length of the optical member including the convex reflecting surface so as to satisfy the above expression.

The optical member may include a planar reflecting surface configured to reflect the light to the at least one light emitter, the light coming from the at least one solid-state light source and being reflected on the at least one concave reflecting surface.

The planar reflecting surface may be arranged at a rotation angle with a state parallel to an arrangement surface on which the at least one light emitter is arranged being set to zero degrees and with a rotation direction from the state toward the at least one concave reflecting surface about a predetermined rotation axis being set as a positive direction, the rotation angle satisfying the following expression, $$0° <Am<60°$$

where Am represents the rotation angle of the planar reflecting surface.

The second optical system can be appropriately downsized by arranging the planar reflecting surface so as to satisfy the above expression.

A plurality of light collecting optical systems each including a set of the first optical system and the second optical system may be arranged symmetrically about a predetermined reference axis based on a position of the at least one light emitter.

Thus, a high luminance of the output light from the output unit can be attained.

The second optical system may include an optical member configured to guide the light to the at least one light emitter, the light coming from the at least one solid-state light source and being reflected on the at least one concave reflecting surface. In this case, the light source apparatus may further include an arrangement mechanism configured to adjust an arrangement of the optical member included in each of the plurality of light collecting optical systems.

With such an arrangement mechanism, the plurality of light collecting optical systems can be easily arranged.

The output unit may include a rotating wheel including an arrangement surface on which the at least one light emitter is arranged, the rotating wheel being configured to rotate about a predetermined rotation axis extending in a direction vertical to the arrangement surface. In this case, the second optical system may be configured to collect the light from the first optical system to a plurality of positions on the at least one light emitter arranged on the arrangement surface of the rotating wheel, the plurality of positions being different from one another in distance from the rotation axis.

Thus, the deterioration of the light emitter can be suppressed.

The light source apparatus may further include a third optical system configured to convert a light flux of the output light into a substantially parallel light flux, the output light being output from the output unit, the third optical system having a variable focal length.

Thus, the output light from the output unit can be efficiently guided to an external system and the like.

According to another embodiment of the present disclosure, there is provided an image display apparatus including a light source apparatus, an image generation system, and a projection system.

The light source apparatus includes at least one solid-state light source, a first optical system, an output unit, and a second optical system.

The at least one solid-state light source is configured to output light in a predetermined wavelength range.

The first optical system includes at least one aspherical surface configured to convert a light flux from the at least one solid-state light source into a substantially parallel light flux.

The output unit includes at least one light emitter that is excited by the light from the at least one solid-state light source and emits visible light with a wavelength longer than that of the light, the output unit being configured to output, as output light, light containing the light in the predetermined wavelength range and the visible light from the at least one light emitter.

The second optical system includes at least one concave reflecting surface, the second optical system being configured to reflect the light on the at least one concave reflecting surface, the light coming from the at least one solid-state light source and being converted into the substantially parallel light flux by the first optical system, to collect the light to the at least one light emitter of the output unit.

The image generation system includes an image generation element and a lighting optical system.

The image generation element is configured to generate an image based on applied light.

The lighting optical system is configured to apply the output light from the light source apparatus to the image generation element.

The projection system is configured to project the image generated by the image generation element.

As described above, according to the present disclosure, it is possible to provide a light source apparatus and an image display apparatus that are capable of attaining a high luminance while suppressing an increase in size of the apparatuses.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 8 is a table showing data on the first light source unit according to the first embodiment;

FIG. 9 is a table showing data on the first light source unit according to the first embodiment;

FIG. 14 is a table showing data on the first light source unit according to the second embodiment;

FIG. 15 is a table showing data on the first light source unit according to the second embodiment;

FIG. 20 is a table showing data on the first light source unit according to the third embodiment;

FIG. 21 is a table showing data on the first light source unit according to the third embodiment;

FIG. 25 is a table showing data on the first light source unit according to the fourth embodiment;

FIG. 26 is a table showing data on the first light source unit according to the fourth embodiment;

FIG. 31 is a table showing data on the first light source unit according to the fifth embodiment;

FIG. 32 is a table showing data on the first light source unit according to the fifth embodiment;

FIG. 36 is a table showing data on the first light source unit according to the sixth embodiment;

FIG. 37 is a table showing data on the first light source unit according to the sixth embodiment;

FIG. 41 is a table showing data on the first light source unit according to the seventh embodiment;

FIG. 42 is a table showing data on the first light source unit according to the seventh embodiment;

FIG. 47 is a table showing data on the first light source unit according to the eighth embodiment;

FIG. 48 is a table showing data on the first light source unit according to the eighth embodiment;

FIG. 52 is a table showing data on the first light source unit according to the ninth embodiment;

FIG. 53 is a table showing data on the first light source unit according to the ninth embodiment;

FIG. 54 is a table showing data of the first to ninth embodiments;

DETAILED DESCRIPTION OF EMBODIMENTS

Hereinafter, embodiments of the present disclosure will be described with reference to the drawings.

First Embodiment

Figure 1:
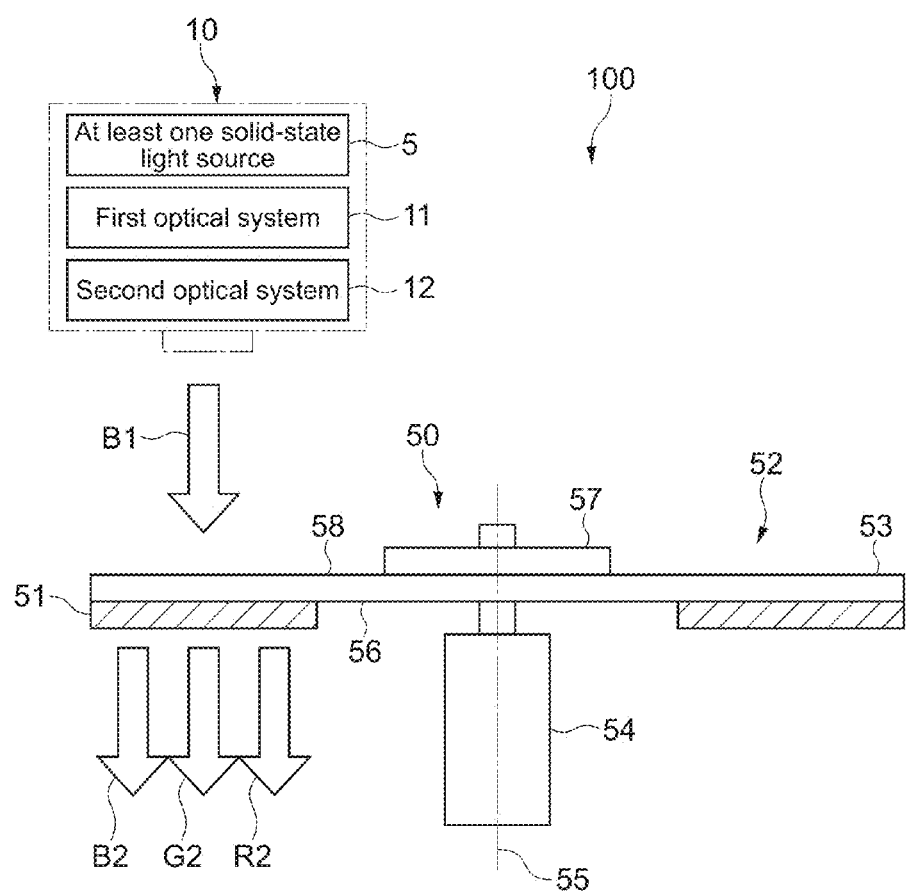
FIG. 1 is a diagram showing a schematic configuration example of a light source apparatus according to a first embodiment of the present disclosure.

FIG. 1 is a diagram showing a schematic configuration example of a light source apparatus 100 according to a first embodiment of the present disclosure. The light source apparatus 100 is a light source apparatus for a projector and has a type in which laser light in a blue wavelength range is combined with light in red and green wavelength ranges, the light being generated from a fluorescent substance excited by the laser light in the blue wavelength range, to output white light.

The light source apparatus 100 includes a first light source unit 10 and a second light source unit 50. The first light source unit 10 includes a plurality of laser light sources 5, a first optical system 11, and a second optical system 12. The first and second optical systems 11 and 12 are configured to collect light output from the plurality of laser light sources 5 onto a phosphor layer 51 of the second light source unit 50.

The plurality of laser light sources 5 are blue laser light sources capable of oscillating blue laser light B1 having a peak wavelength of an emission intensity within the wavelength range of from 400 nm to 500 nm, for example. The plurality of laser light sources 5 correspond to at least one solid-state light source that outputs light in a predetermined wavelength range. Other light sources such as a light-emitting diode (LED) may be used as the solid-state light source. Further, the light in the predetermined wavelength range is also not limited to the blue laser light B1.

The first optical system 11 includes at least one aspherical surface that converts light fluxes of the blue laser light B1, which are output from the plurality of laser light sources 5, into substantially parallel light. The second optical system 12 includes at least one concave reflecting surface and reflects the blue laser light B1 on the concave reflecting surface, the blue laser light B1 coming from the plurality of laser light sources 5 and being converted into substantially parallel light fluxes by the first optical system 11, to collect the blue laser light B1 onto at least one phosphor layer 51 of the second light source unit 50. The first and second optical systems 11 and 12 will be described later in detail.

The second light source unit 50 corresponds to an output unit and includes a phosphor wheel 52. The phosphor wheel 52 includes a disk-like substrate 53 and the phosphor layer 51. The substrate 53 transmits the blue laser light B1. The phosphor layer 51 is provided on the substrate 53. A motor 54 that drives the phosphor wheel 52 is connected to the center of the substrate 53. The phosphor wheel 52 has a rotation axis 55 on a normal line passing through the center of the substrate 53 and is rotatable about the rotation axis 55.

The phosphor wheel 52 includes a rotating wheel 57 including an arrangement surface 56 on which the phosphor layer 51 as a light emitter is arranged. The rotating wheel 57 rotates about a predetermined rotation axis extending in a direction vertical to the arrangement surface 56. The rotation axis 55 shown in FIG. 1 corresponds to the predetermined rotation axis extending in the direction vertical to the arrangement surface 56. The rotating wheel 57 with the phosphor layer 51 arranged thereon is the phosphor wheel 52.

The phosphor layer 51 corresponds to at least one light emitter that is excited by the light from the plurality of laser light sources 5 and emits visible light with a wavelength longer than that of the light from the plurality of laser light sources 5. In this embodiment, the phosphor layer 51 contains a fluorescent substance that emits fluorescence by being excited by the blue laser light B1 having a center wavelength of about 445 nm. The phosphor layer 51 converts part of the blue laser light B1, which is output by the plurality of laser light sources 5, into light in a wavelength range including the red or green wavelength range (that is, yellow light) and then outputs the resultant light.

As the fluorescent substance contained in the phosphor layer 51, for example, a YAG (yttrium, aluminum, garnet)-based phosphor is used. It should be noted that the type of fluorescent substance, a wavelength range of excited light, and a wavelength range of the visible light generated by excitation are not limited.

Further, since the phosphor layer 51 absorbs part of the excitation light and also transmits part of the excitation light, the phosphor layer 51 can output the blue laser light B1 that has been output from the plurality of laser light sources 5. Thus, the light output from the phosphor layer 51 is white light obtained by combination of the blue excitation light and the yellow fluorescence. In order to transmit part of the excitation light in such a manner, the phosphor layer 51 may contain filler particles serving as particulate substance having light transparency, for example.

As shown in FIG. 1, the phosphor wheel 52 is arranged such that a main surface 58, which is one of the two main surfaces of the substrate 53 and on which the phosphor layer 51 is not provided, faces the first light source unit 10. Further, the phosphor wheel 52 is arranged such that a focal position of the blue laser light B1 collected by the first light source unit 10 matches a predetermined position on the phosphor layer 51.

By the rotation of the substrate 53 by the motor 54, the laser light sources 5 apply the excitation light to the phosphor layer 51 while relatively moving an application position on the phosphor layer 51. Thus, light containing blue laser light B2, which has passed through the phosphor layer 51, and green light G2 and red light R2 as visible light output from the phosphor layer 51 are output as output light by the second light source unit 50. The rotation of the phosphor wheel 52 allows avoidance of deterioration of the phosphor layer 51 due to the excitation light applied to a certain position of the phosphor layer 51 for a long period of time.

Figure 2:
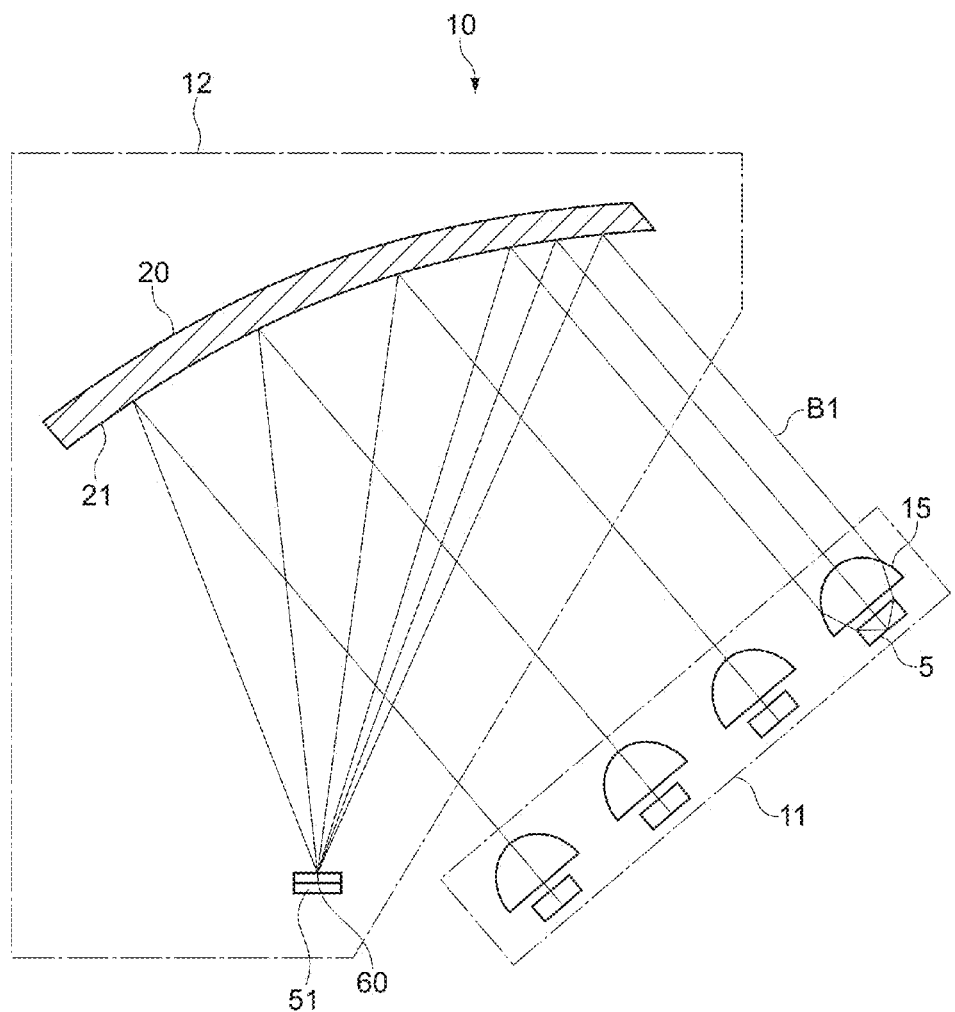
FIG. 2 is a schematic diagram showing a configuration example of a first light source unit shown in FIG. 1 and an optical path of laser light.

FIG. 2 is a schematic diagram showing a configuration example of the first light source unit 10 shown in FIG. 1 and an optical path of the laser light B1. The first light source unit 10 includes the plurality of laser light sources 5 and a plurality of collimator lenses 15. The plurality of collimator lenses 15 convert each of light fluxes of the respective laser light sources 5 into a substantially parallel light flux. Further, the first light source unit 10 includes a reflecting member 20 that reflects the blue laser light B1, which have been converted into the substantially parallel light fluxes by the collimator lenses 15, onto a predetermined light collecting point 60 on the phosphor layer 51. The reflecting member 20 includes a concave reflecting surface 21 and reflects the blue laser light B1 on the concave reflecting surface 21 to collect the blue laser light B1 onto the light collecting point 60. As the reflecting member 20, for example, a reflective mirror is used.

Each of the collimator lenses 15 provided to the respective laser light sources 5 is a rotation-symmetric aspherical lens. The aspherical surfaces of the plurality of collimator lenses 15 correspond to at least one aspherical surface of the first optical system 11. In this embodiment, one collimator lens 15 is provided to each laser light source 5, but the present disclosure is not limited thereto. For example, the light fluxes from a predetermined number of laser light sources 5 may be collectively converted into substantially parallel light fluxes by one aspherical lens. Alternatively, if the light fluxes from the laser light sources 5 can be converted into substantially parallel light fluxes, a lens including a non-rotation-symmetric aspherical surface and the like may be used.

Figure 3:
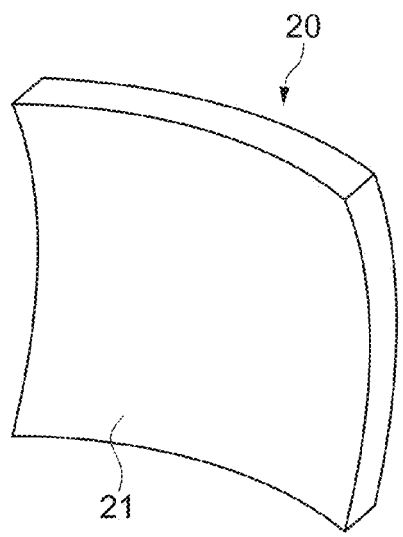
FIG. 3 is a schematic diagram showing an example of a reflecting member according to the embodiment of the present disclosure.
Figure 4:
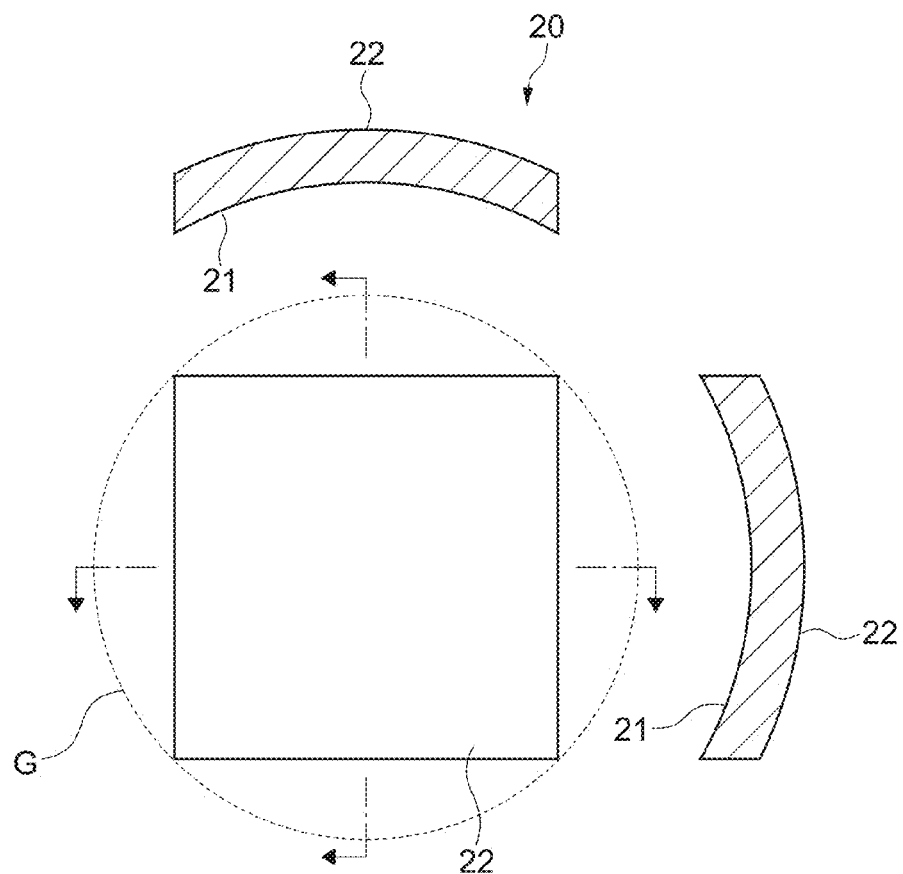
FIG. 4 is a schematic diagram showing an example of the reflecting member according to the embodiment of the present disclosure.

FIGS. 3 and 4 are schematic diagrams each showing an example of the reflecting member 20. The reflecting member 20 is included in the second optical system 12 and includes the concave reflecting surface 21. The concave reflecting surface 21 may be a rotation-symmetric aspherical surface or a free-form surface having no axis of rotational symmetry. The shape of the concave reflecting surface 21 is appropriately set based on the positions of the plurality of laser light sources 5, the position of the light collecting point 60, the level of the light flux of the laser light B1 coming into the concave reflecting surface 21, an incident angle, and the like.

FIG. 4 is a diagram showing the reflecting member 20, viewed from the side of a back surface 22, which is the side opposite to the concave reflecting surface 21. Further, FIG. 4 also shows cross-sectional views of the reflecting member 20 taken along directions substantially orthogonal to each other. As shown in FIG. 4, the reflecting member 20 has a substantially rectangular outer shape when viewed from the side of the back surface 22 (hereinafter, the outer shape viewed from the side of the back surface 22 is simply referred to as an outer shape). Further, the reflecting member 20 has a cross section whose shape is formed to correspond to the shape of the concave reflecting surface 21.

For example, the outer shape of the reflecting member 20 can be appropriately changed in accordance with the size of an area to which the blue laser light B1 converted into the substantially parallel light fluxes by the first optical system 11 is applied. For example, as shown in FIG. 4, the substantially rectangular reflecting member 20 may be used. Alternatively, a reflecting member 20 having a triangular shape or another multiangular shape, and the like may be used. Thus, compared with the case where a light collecting lens is used to collect the light from the plurality of laser light sources 5, the outer shape of the reflecting member 20 can be more appropriately adjusted to be made smaller.

For example, it is assumed that the blue laser light B1 is applied to the entire area of the concave reflecting surface 21 of the reflecting member 20 shown in FIG. 4. In this case, when the blue laser light B1 is intended to be collected using a light collecting lens, a lens with such a size that covers at least the outer shape of the reflecting member 20 (see circle G indicated by a broken line in FIG. 4) has to be used. Further, compared with the case of using the light collecting lens, the thickness of the reflecting member 20 (see the cross-sectional views of FIG. 4) can also be reduced. As a result, it is possible to produce a compact second optical system 12 and suppress an increase in size of the light source apparatus 100. Further, it is clearly found that a reflecting surface having a shape of a paraboloidal surface is more suitable for a small-sized light collecting optical system than a generally-used refracting system including lenses, also in terms of an optical system of a telescope.

Typically, the concave reflecting surface 21 is a mirror surface. This mirror surface allows the blue laser light B1 to be reflected and collected onto the phosphor layer 51. The material of the reflecting member 20 is not limited, and a metal material and glass are used therefor, for example.

Hereinafter, specific examples of the first light source unit 10 will be described. FIGS. 5 to 9 are diagrams for describing the specific examples.

Figure 5:
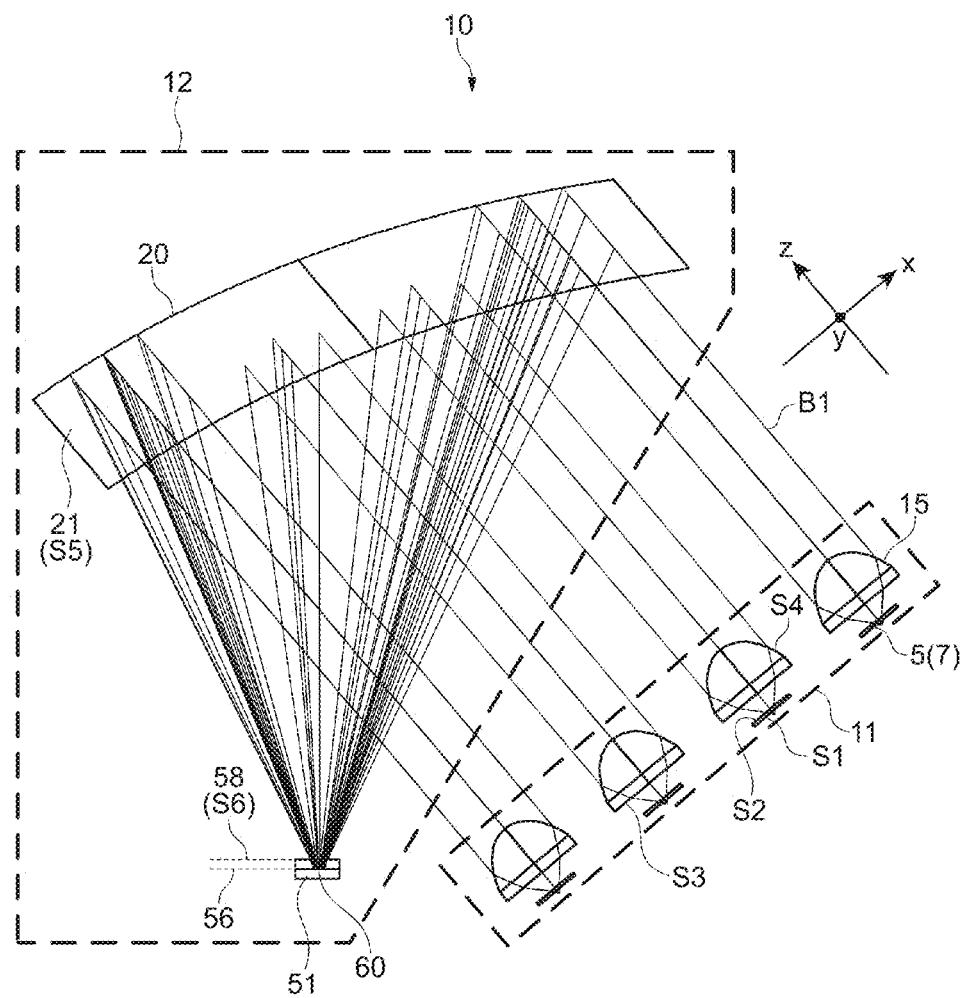
FIG. 5 is a diagram showing a configuration of the first light source unit according to the first embodiment.
Figure 6:
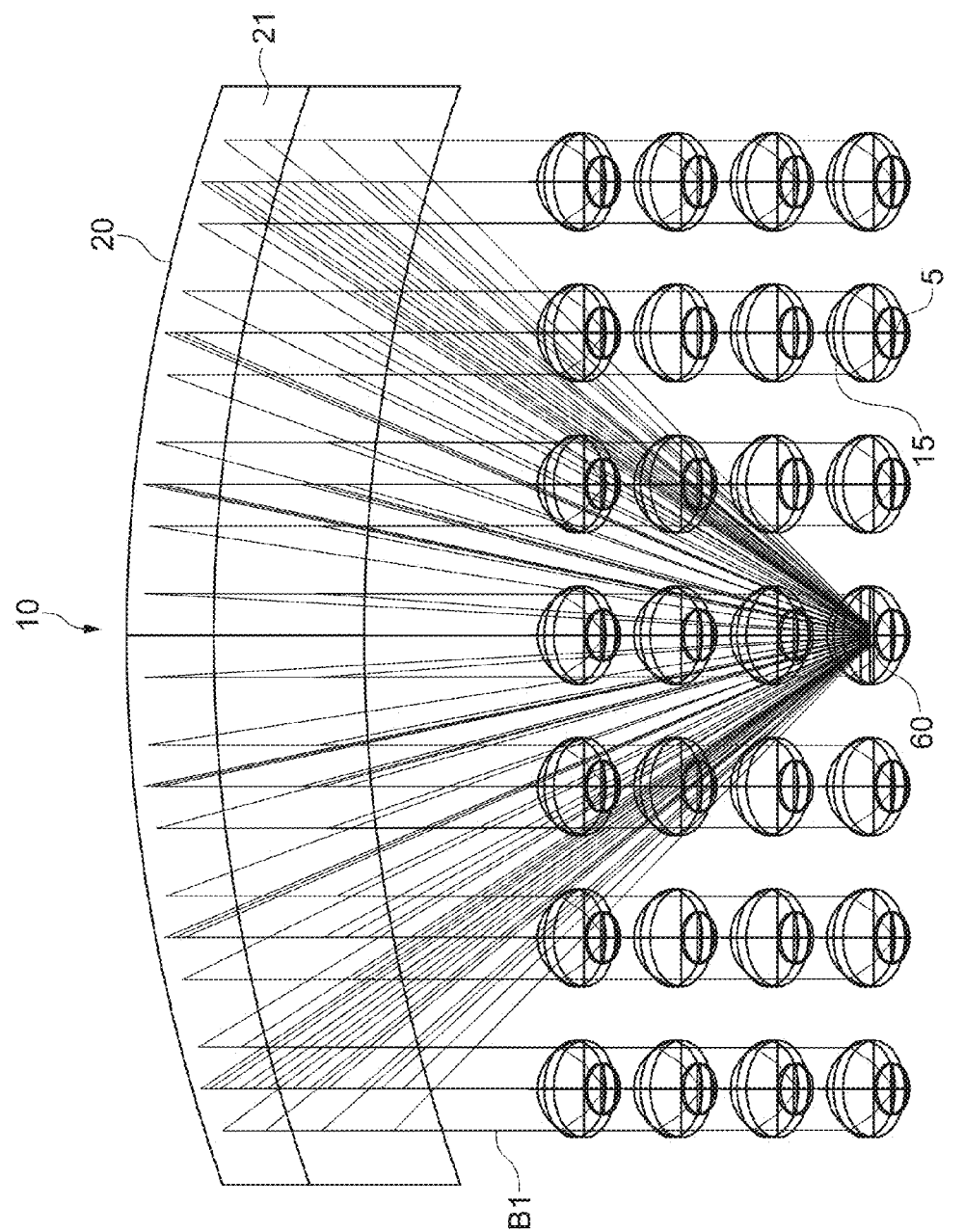
FIG. 6 is a diagram showing the configuration of the first light source unit according to the first embodiment.

FIGS. 5 and 6 are diagrams each showing a configuration of the first light source unit 10. FIG. 6 is a diagram of the first light source unit 10 shown in FIG. 5, viewed in a direction from the rear surface side of the plurality of laser light sources 5 toward the reflecting member 20.

As shown in FIGS. 5 and 6, the light fluxes from the plurality of laser light sources 5 are converted into substantially parallel light fluxes by the collimator lenses 15 provided to the respective laser light sources 5. The blue laser light B1 converted into the substantially parallel light fluxes are reflected on the concave reflecting surface 21 of the reflecting member 20 and then collected onto the predetermined light collecting point 60 on the phosphor layer 51.

Figure 7:
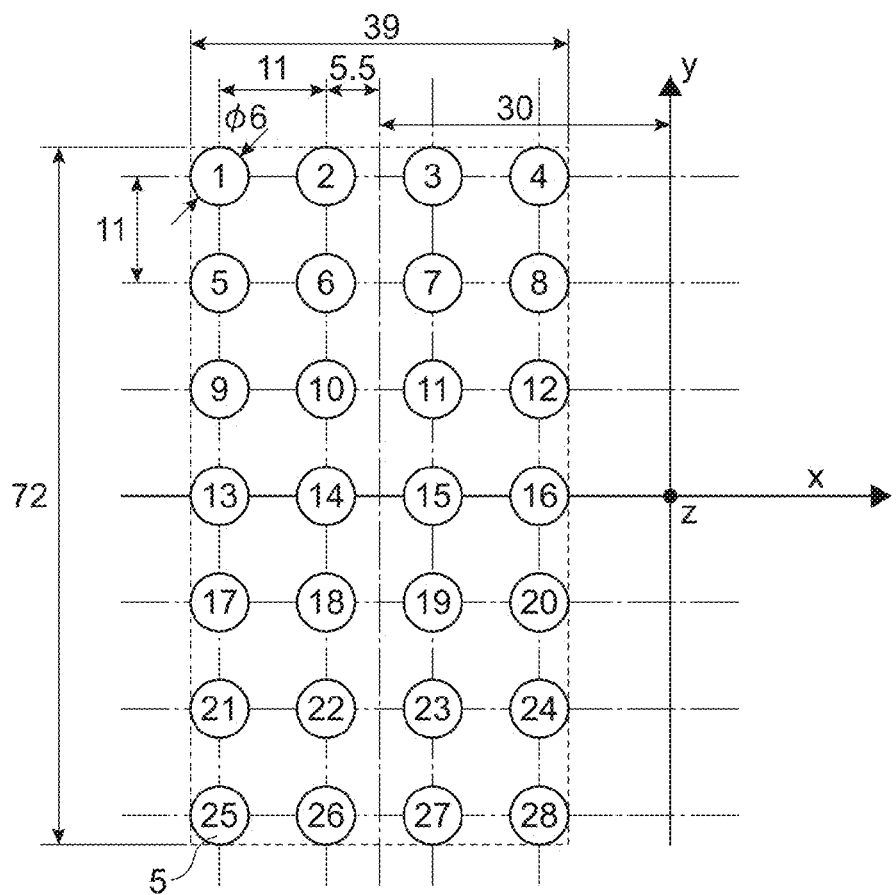
FIG. 7 is a diagram showing the number of laser light sources and arrangement positions thereof according to the first embodiment.

FIG. 7 is a diagram showing the number of laser light sources 5 and arrangement positions thereof. Xyz coordinates shown in FIG. 7 correspond to the xyz coordinates shown in FIG. 5. As shown in FIG. 7, in this embodiment, a laser light source array including a total of 28 pieces of laser light sources 5 is used. The 28 pieces of laser light sources 5 are arranged in matrix of four laser light sources 5 along an x-axis direction by seven laser light sources 5 along a y-axis direction. It should be noted that the number of laser light sources 5 is not limited.

The laser light sources 5 are arranged at intervals of 11 mm in the x-axis direction and the y-axis direction. The laser light B1 of the substantially parallel light fluxes output from the collimator lenses 15 have a light flux diameter of 6 mm. Therefore, the blue laser light B1 of the substantially parallel light fluxes are applied toward the concave reflecting surface 21 in the range of 39 mm in the x-axis direction and 72 mm in the y-axis direction. It should be noted that the original point at which the x axis and y axis intersect is an optical axis of the second optical system 12.

FIGS. 8 and 9 are tables each showing data on the first light source unit 10. An object side NA in the table refers to a numerical aperture of the collimator lens 15 to the blue laser light B1 from each laser light source 5. A focal length f1 of the first optical system 11 is a focal length of the collimator lens 15 (unit thereof is mm). A focal length f2 of the second optical system 12 is a focal length of the concave reflecting surface 21 of the reflecting member 20 (unit thereof is mm).

A first light-source surface of the first optical system 11 corresponds to an initial surface of the array and also corresponds to output surfaces of the 28 pieces of laser light sources 5. A surface S1 is a surface of a cover glass 7 on the side of the light source (see FIG. 5). The cover glass 7 covers the laser light source 5. A surface S2 is the other surface of the cover glass 7, that is, a surface on the side from which the laser light B1 is output. A surface S3 is a planar surface of the collimator lens 15 on the side of the laser light source 5. A surface S4 is an aspherical surface of the collimator lens 15 and is an end surface of the array. The surfaces S1 to S4 are included in the first optical system 11.

A surface S5 and the following surfaces are included in the second optical system 12. The surface S5 is the concave reflecting surface 21 of the reflecting member 20. In this embodiment, the concave reflecting surface 21 is formed of an aspherical surface. A surface S6 is the surface 58 that is on the side opposite to the arrangement surface 56 on which the phosphor layer 51 is arranged. The surface S6 is set as an eccentric surface that is eccentric with respect to an xy plane formed of the x axis and the y axis of FIG. 5. This setting is performed in order that substantially center light of the light fluxes of the blue laser light B1, which have been reflected on the concave reflecting surface 21, is input to the phosphor layer 51 in a substantially vertical direction. A second light-source surface of the second optical system 12 corresponds to a surface of the phosphor layer 51, to which the blue laser light B1 is input.

The table of FIG. 8 shows a curvature radius (mm) of each surface, an interval between surfaces (mm), and a refractive index n for the blue laser light with a wavelength of 445 nm. The curvature radius and the interval are denoted by symbols of plus and minus based on the z axis of the figures. It should be noted that the "infinity" of the curvature radius means that a surface is planar. The refractive index n is described for the cover glass 7, the collimator lens 15, and the substrate 53 including the arrangement surface 56.

FIG. 9 shows data of the aspherical surfaces, that is, the surface S4 and the surface S5, and data of the surface S6 that are set to be eccentric. In this embodiment, an aspherical surface is represented by the following expression. It should be noted that in the expression, c represents a curvature, K represents a conic constant, and Ai represents a correction factor.

$$z = \frac{ch^2}{1 + \{1 - (1 + K)c^2 h^2\}^{1/2}} + \sum_{i=1} A i h^i$$

The surface S4 serving as the aspherical surface of the collimator lens 15 is expressed by substituting the conic constant K and the correction factor Ai shown in FIG. 9 into the above expression. Further, the curvature c is obtained from the curvature radius of FIG. 8. The surface S5 serving as the concave reflecting surface is a paraboloidal surface whose conic constant K is −1. The surface S6 serving as the eccentric surface is eccentric by 40 degrees with respect to the xy plane in a clockwise direction about the y axis and by −2.0 mm in the x-axis direction.

The focal length f1 of the first optical system 11 and the focal length f2 of the second optical system 12 have been considered. As a result, it is desirable that the focal lengths of the first and second optical systems 11 and 12 satisfy the following conditional expression (1), $$1 < f2/f1 < 80 \tag{1}$$

where f1 is a focal length of the first optical system, and f2 is a focal length of the second optical system.

The conditional expression (1) appropriately determines the focal length f2 of the second optical system with respect to the focal length f1 of the first optical system. Here, the case where the upper limit of the conditional expression (1) is not satisfied, that is, the case where f2/f1<80 is not satisfied will be discussed. In this case, it is assumed that relative positions of the laser light sources 5 and the collimator lenses 15 are displaced at the time of assembly of the first optical system 11 and the like. Then, the light collecting point 60 at which the blue laser light B1 is collected in the second optical system 12 is largely displaced from a desired point.

Figure 10:
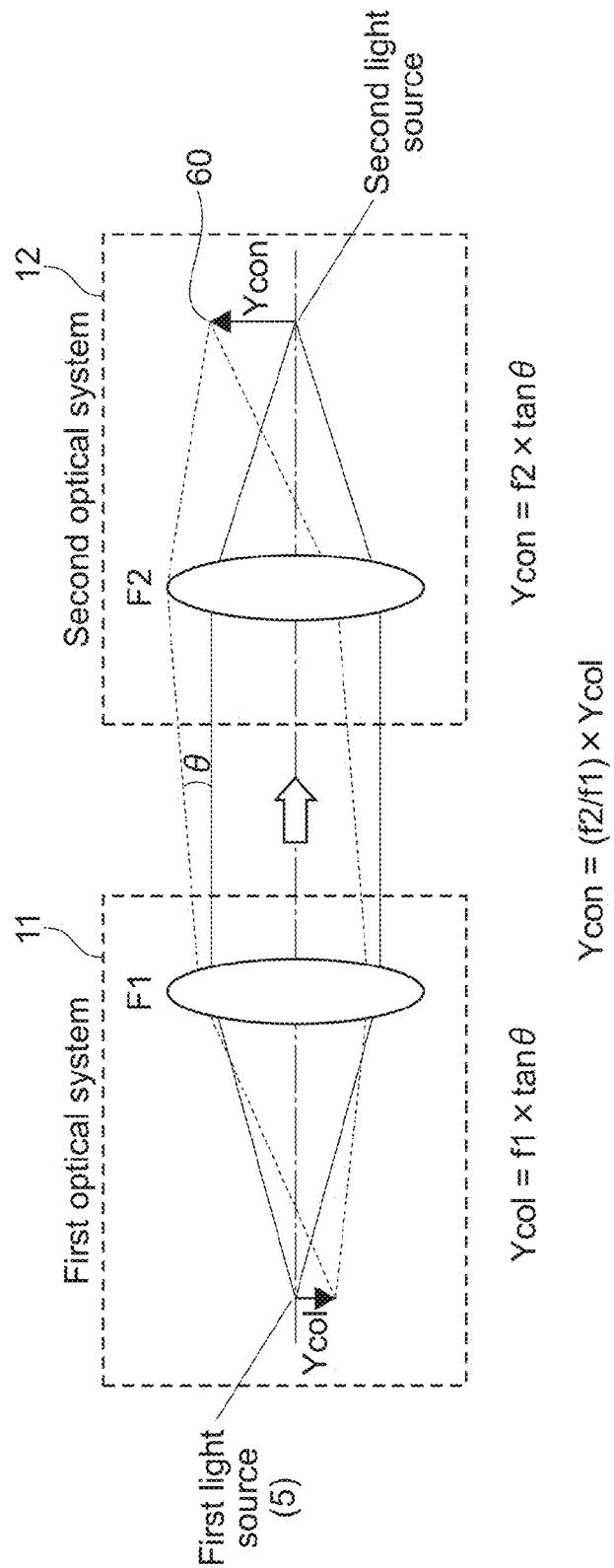
FIG. 10 is a schematic diagram for describing the displacement of a light collecting point.

FIG. 10 is a schematic diagram for describing the displacement of the light collecting point 60. In FIG. 10, the first optical system 11 is schematically illustrated as an optical system including a lens F1 whose focal length is f1. Similarly, the second optical system 12 is schematically illustrated as an optical system including a lens F2 whose focal length is f2.

In FIG. 10, Ycol represents a relative displacement between the laser light sources 5 and the collimator lens 15. Ycon represents a displacement of the light collecting point 60. As shown in FIG. 10, when Ycol is generated, a light flux output from the lens F1 is tilted by an angel of θ. Using this angle of θ, Ycol and Ycon are expressed by the following expressions.

$$Ycol = f1 \times \tan\theta$$

$$Ycon = f2 \times \tan\theta$$

By the two expressions, the following expression (A) is established for Ycol and Ycon.

$$Ycon = (f2/f1) \times Ycol \quad (A)$$

Specifically, the displacement of the light collecting point 60 in the second optical system 12 is proportional to a ratio of the focal length f2 to the focal length f1.

Therefore, when a value of f2/f1 is larger than the upper limit of the conditional expression (1), the displacement of the light collecting point 60 is largely varied. As a result, for example, when variations and the like occur when the plurality of laser light sources 5 are assembled, it is difficult to collect the blue laser light B1 from each laser light source 5 to one spot.

On the other hand, in the case where the lower limit of the conditional expression (1) is not satisfied, the second optical system 12 is extremely downsized, which does not establish the system. By the considerations as described above, it is found that the generation of the displacement of the light collecting point 60 can be suppressed in the case where f2/f1 satisfies the conditional expression (1). The lower limit and the upper limit of the conditional expression (1) are found as values for determining an effective range, but the effective range of f2/f1 may be changed depending on various conditions and the like, for example. For example, it is also conceived that a smaller range included in the range expressed by the conditional expression (1) may be established as an effective range. It should be noted that the consideration on the conditional expression (1) above similarly applies to an optical system in which a light collecting lens is intended to be used.

Further, the concave reflecting surface 21 of the second optical system 12 is also considered. As a result, it is desirable that the concave reflecting surface 21 be formed of a rotation-symmetric aspherical surface and a conic constant thereof satisfy the following conditional expression (2), $$-1.5 < Km < -0.5 \quad (2)$$

where Km is a conic constant of the concave reflecting surface.

In the case where the concave reflecting surface 21 formed of a rotation-symmetric aspherical surface does not satisfy the conditional expression (2), there is a possibility that the blue laser light B1 from the plurality of laser light sources 5 are difficult to be collected at one light collecting point 60. Specifically, in the case where the conditional expression (2) is satisfied, the blue laser light B1 can be collected to a desired light collecting point 60 highly accurately.

It should be noted that, as described above, the concave reflecting surface 21 can be formed of a free-form surface free from an axis of rotational symmetry.

As described above, in the light source apparatus 100 according to this embodiment, the light fluxes from the plurality of laser light sources 5 are converted into substantially parallel light fluxes by the first optical system 11 including at least one aspherical surface. The blue laser light B1 as the substantially parallel light fluxes are reflected on the at least one concave reflecting surface 21 of the second optical system 12 and collected onto the phosphor layer 51 of the second light source unit 50. The second light source unit 50 outputs white light containing the blue laser light from the laser light sources 5 and visible light from the phosphor layer 51. In such a manner, the use of the concave reflecting surface 21 to collect the light to the phosphor layer 51 allows the light source apparatus 100 to be made compact. For example, even in the case where the number of laser light sources 5 is increased in order to attain a high luminance, the increase in size of the second optical system 12 can be suppressed by appropriately setting the shape of the concave reflecting surface 21, an arrangement position thereof, and the like. As a result, it is possible to attain a high luminance while suppressing an increase in size of the light source apparatus.

Second Embodiment

A light source apparatus according to a second embodiment of the present disclosure will be described. In the following description, the same configurations and actions as those of the light source apparatus 100 described in the above embodiment are not described or simply described.

Figure 11:
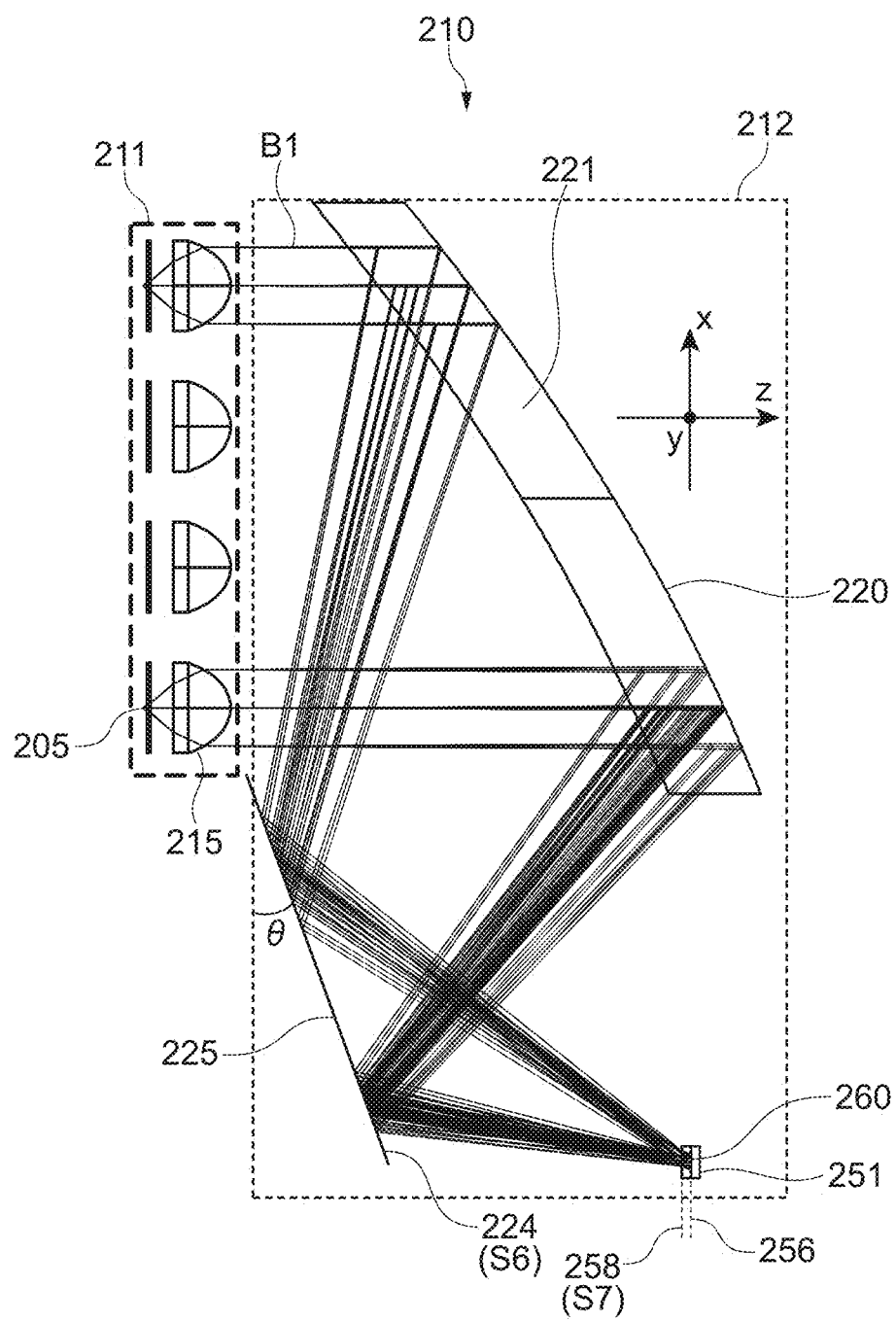
FIG. 11 is a diagram showing a configuration of a first light source unit according to a second embodiment of the present disclosure.
Figure 12:
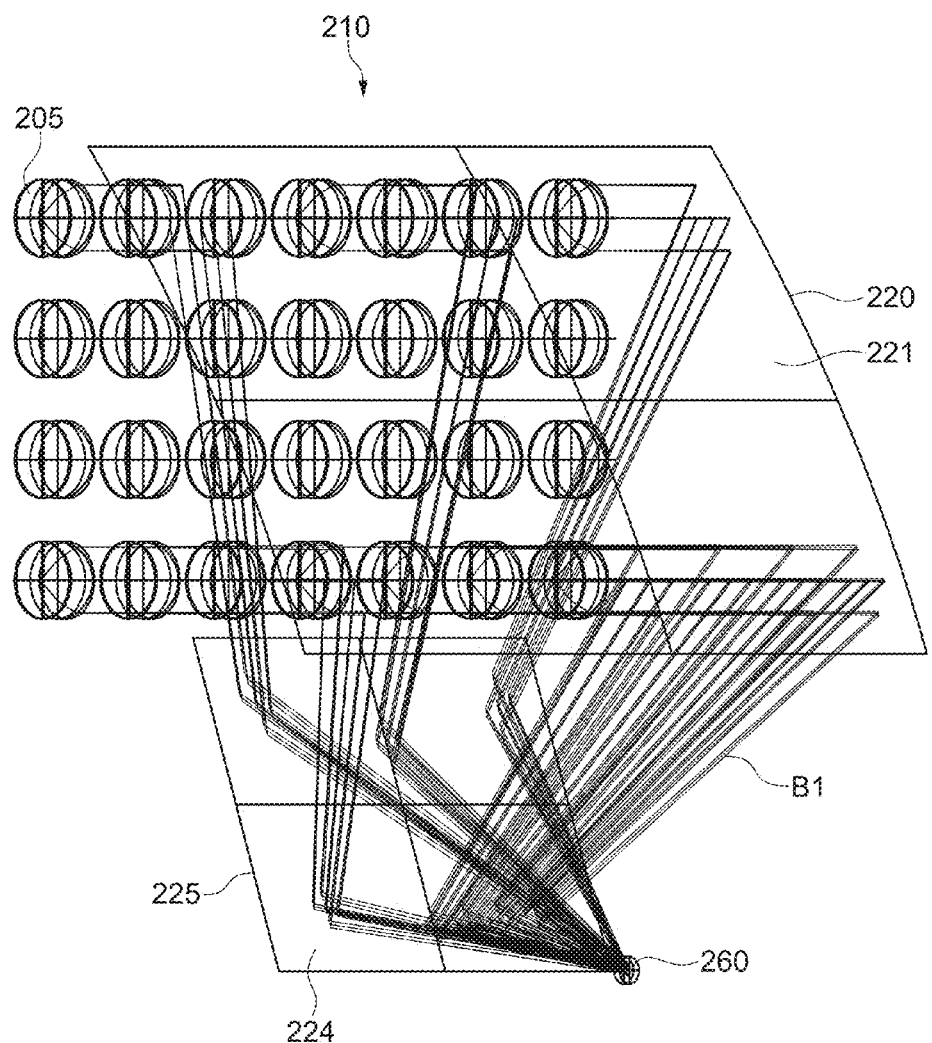
FIG. 12 is a diagram showing the configuration of the first light source unit according to the second embodiment.
Figure 13:
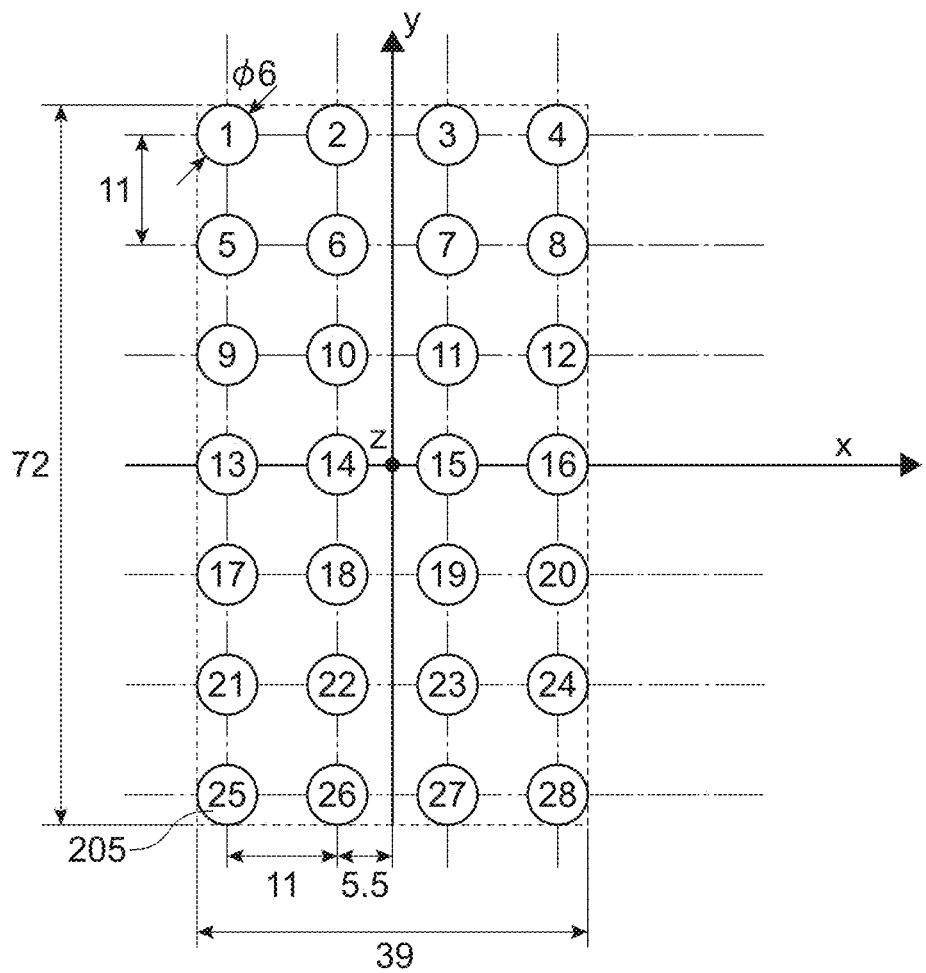
FIG. 13 is a diagram showing the number of laser light sources and arrangement positions thereof according to the second embodiment.

FIGS. 11 to 15 are diagrams for describing a light source apparatus 200 according to this embodiment. FIGS. 11 and 12 are diagrams each showing a configuration of a first light source unit 210 according to this embodiment. FIG. 13 is a diagram showing the number of laser light sources 205 and arrangement positions thereof. FIGS. 14 and 15 are tables each showing data on the first light source unit 210.

As shown in FIGS. 11 and 12, in this embodiment, a second optical system 212 includes a planar reflecting member 225 including a planar reflecting surface 224. The planar reflecting member 225 corresponds to an optical member that guides light coming from a plurality of laser light sources 205, which has been reflected on a concave reflecting surface 221, to a phosphor layer 251. The planar reflecting surface 224 of the planar reflecting member 225 reflects the light coming from the plurality of laser light sources 205, which has been reflected on the concave reflecting surface 221, to the phosphor layer 251. Thus, blue laser light B1 output from the plurality of laser light sources 205 is collected onto a predetermined light collecting point 260 on the phosphor layer 251. It should be noted that FIG. 12 is a diagram of the first light source unit 210 viewed obliquely from the rear surface side of the plurality of laser light sources 205.

As shown in FIG. 13, also in this embodiment, a laser light source array including 28 pieces of laser light sources is used as in the first embodiment. The blue laser light B1 as the substantially parallel light fluxes are output along a normal direction (z-axis direction) of a surface on which the plurality of laser light sources 205 are arranged. The blue laser light B1 are reflected on the concave reflecting surface 221 toward the planar reflecting surface 224. Then, the blue laser light B1 are reflected on the planar reflecting surface 224 to be collected on the phosphor layer 251. The arrangement positions of the plurality of laser light sources 205, a reflecting member 220, and the planar reflecting member 225, the shape and angle of each reflecting surface, and the like can be appropriately set in a range in which the blue laser light B1 is collected to the predetermined light collecting point 260.

In the table of FIG. 14, a focal length f2 of the second optical system 212 is a focal length of the optical system including the reflecting member 220 and the planar reflecting member 225. However, a focal length of the planar reflecting surface 224 of the planar reflecting member 225 is infinite. Therefore, the focal length f2 of the second optical system 212 is a focal length of the concave reflecting surface 221.

Further, a surface S6 set as an eccentric surface is the planar reflecting surface 224 of the planar reflecting member 225. As shown in FIG. 15, the planar reflecting surface 224 is eccentric by 20 degrees with respect to the xy plane in a clockwise direction about the y axis. A surface S7 is a surface 258 that is on the side opposite to an arrangement surface 256 on which the phosphor layer 251 is arranged (corresponding to the surface S6 of the first embodiment). In this embodiment, the surface S7 is not rotated and is arranged in parallel with the xy plane with a shift of 14.97 mm in the x-axis direction.

As described above, the second optical system 212 may include an optical member different from the reflecting member 220. Thus, the degree of freedom on the design of the second optical system 212 can be increased, and the downsizing of the light source apparatus can be achieved.

In the case where the planar reflecting member 225 is used as an optical member, an arrangement angle of the planar reflecting surface 224 of the planar reflecting member 225 has been considered. As a result, with a state parallel to the arrangement surface 256 on which the phosphor layer 251 is arranged being set to zero degrees, and with a rotation direction from the state toward the concave reflecting surface 221 about a predetermined rotation axis being set as a positive direction, it is desirable that the planar reflecting surface 224 be arranged at an rotation angle that satisfies the following conditional expression (3), $$0°<Am<60° \quad (3)$$

where Am represents a rotation angle of the planar reflecting surface.

As shown in FIG. 11, in this embodiment, the state parallel to the xy plane is 0°. Then, with the y axis being a rotation axis, a rotation direction toward the concave reflecting surface 221 is a positive direction. Therefore, it is desirable to arrange the planar reflecting surface 224 at an angle in the range from 0° to 60° about the y axis.

The conditional expression (3) controls the downsizing of the second optical system 12. It is assumed that the upper limit of the conditional expression (3) is not satisfied and the planar reflecting surface 224 is tilted by 60° or more about the y axis. In this case, there is a high possibility that the reflected light flux from the concave reflecting surface 221 interferes with the phosphor layer 251. It is next assumed that the lower limit of the conditional expression (3) is not satisfied and the planar reflecting surface 224 is tilted by 0° or less about the y axis. In other words, it is assumed that the planar reflecting surface 224 is tilted to the side opposite to the concave reflecting surface 221 from the state parallel to the xy plane. In this case, a distance between the concave reflecting surface 221 and the phosphor layer 251 (distance in the x-axis direction in FIG. 11) is increased, and thus the system is enlarged.

By the considerations described above, in the case where the conditional expression (3) is satisfied, it is found that the second optical system can be appropriately downsized. It is also conceived that a smaller range included in the range expressed by the conditional expression (3) may be established as an effective range depending on various conditions.

Figure 16:
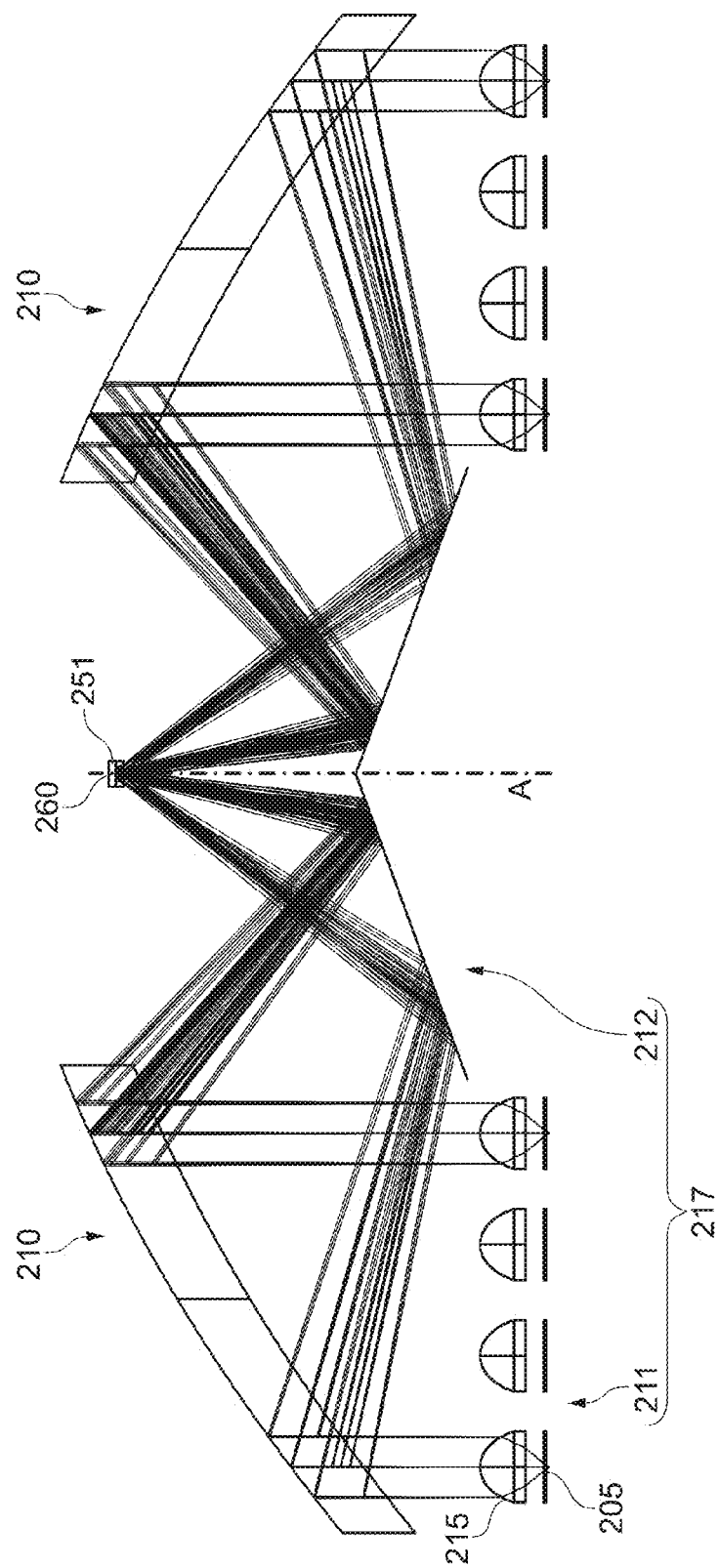
FIG. 16 is a diagram showing a configuration example in the case where two first light source units shown in FIG. 11 are used.

FIG. 16 is a diagram showing a configuration example in the case where two first light source units shown in FIG. 11 are used. In the example shown in FIG. 16, light collecting optical systems 217 each including a set of the first and second optical systems 211 and 212 are arranged at respective two positions that are symmetric about the axis A passing through the phosphor layer 251. With such a configuration, the number of laser light sources 205 is doubled, that is, 56 pieces, and thus an amount of light fluxes collected on the phosphor layer 251 is also increased. As a result, a high luminance of white light output from the phosphor layer 251 can be achieved.

When light coming from the 56 pieces of laser light sources 205 is intended to be collected with a light collecting lens, a huge lens has to be used. However, since the two reflecting members 220 each including the concave reflecting surface 221 are used in this embodiment, an increase in size of the light source apparatus can be suppressed.

The position of the axis A to serve as a reference for determining the arrangement positions of the plurality of light collecting optical systems 217 may be appropriately set. In other words, the plurality of light collecting optical systems 217 may be arranged to be symmetric about a predetermined reference axis based on the position of the phosphor layer 251. As the predetermined reference axis based on the position of the phosphor layer 251, the axis A passing through the light collecting point 260 as shown in FIG. 16 may be set, or for example, the rotation axis 55 passing through the center of the phosphor wheel 52 shown in FIG. 1 may be set.

It should be noted that the light collecting optical systems 217 to be arranged are not limited to the set of the first and second optical systems 211 and 212 according to the second embodiment. A plurality of sets of the first and second optical systems 11 and 12 described in the first embodiment may be arranged. Additionally, a plurality of sets of first and second optical systems according to another embodiment to be described later may be arranged as the light collecting optical systems.

It should be noted that the configuration shown in FIG. 16 may be seen as one first light source unit. Specifically, the 56 pieces of laser light sources 205 are seen as a plurality of laser light sources. The collimator lens 215 provided to each laser light source 205 forms one first optical system. Then, it can be assumed that a plurality of reflecting members and a plurality of planar reflecting members form one second optical system.

Third Embodiment

Figure 17:
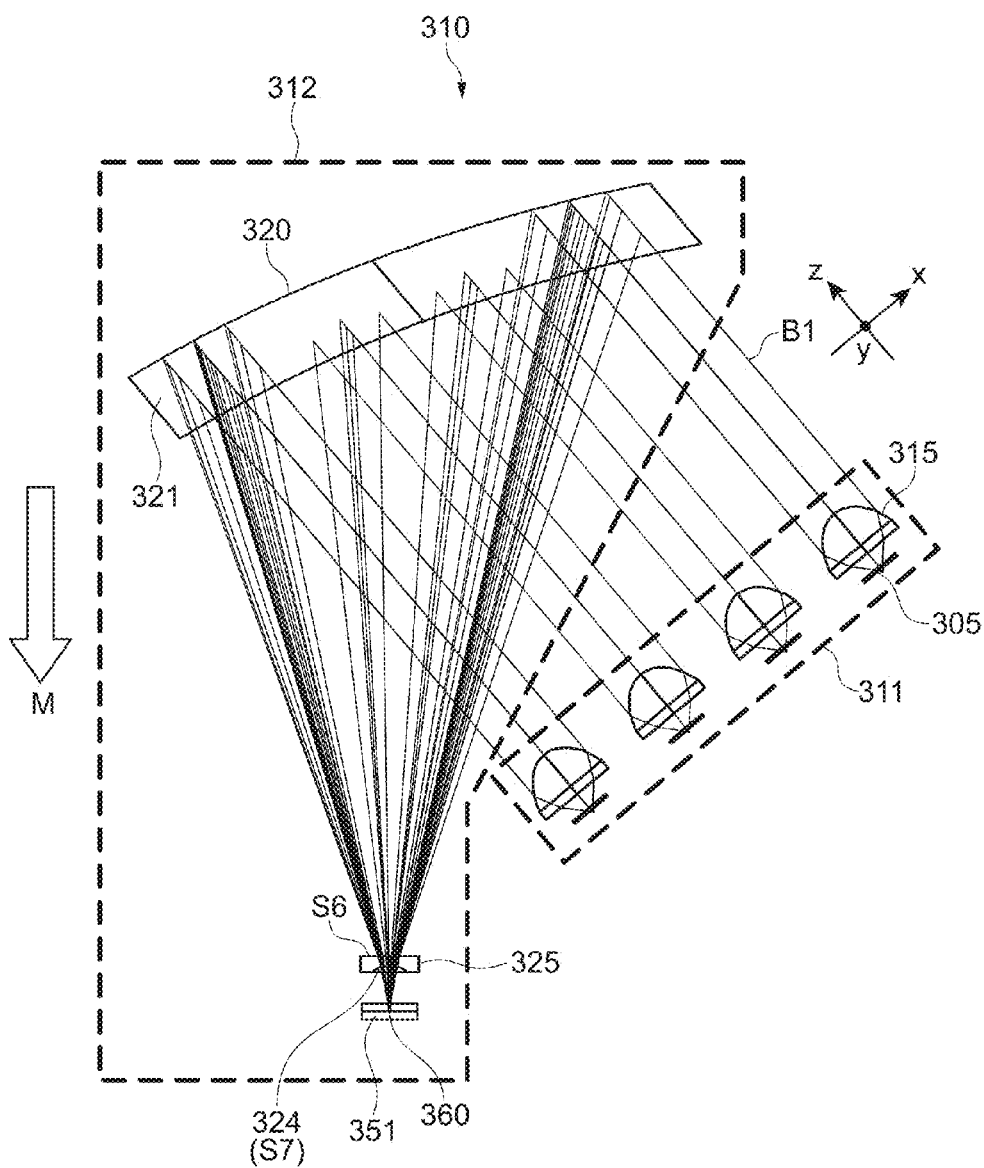
FIG. 17 is a diagram showing a configuration of a first light source unit according to a third embodiment of the present disclosure.
Figure 18:
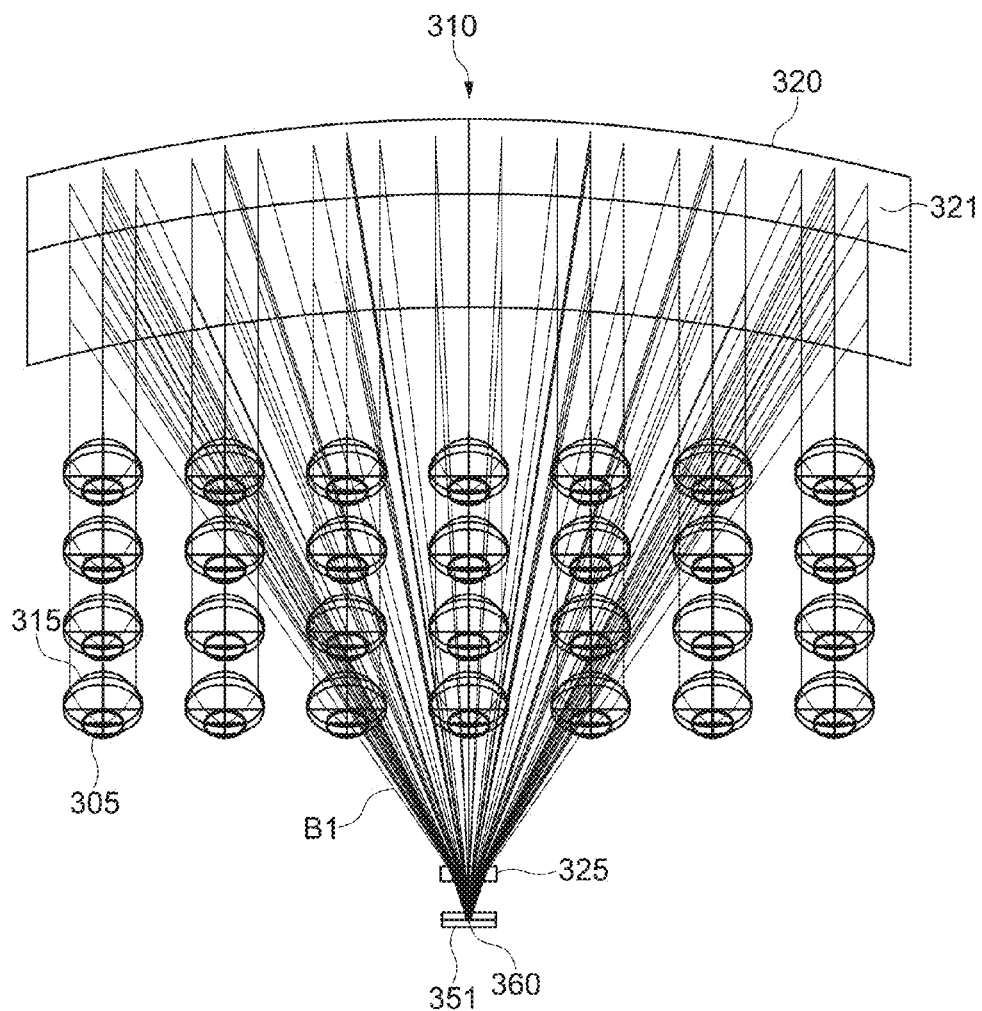
FIG. 18 is a diagram showing a configuration of the first light source unit according to the third embodiment.
Figure 19:
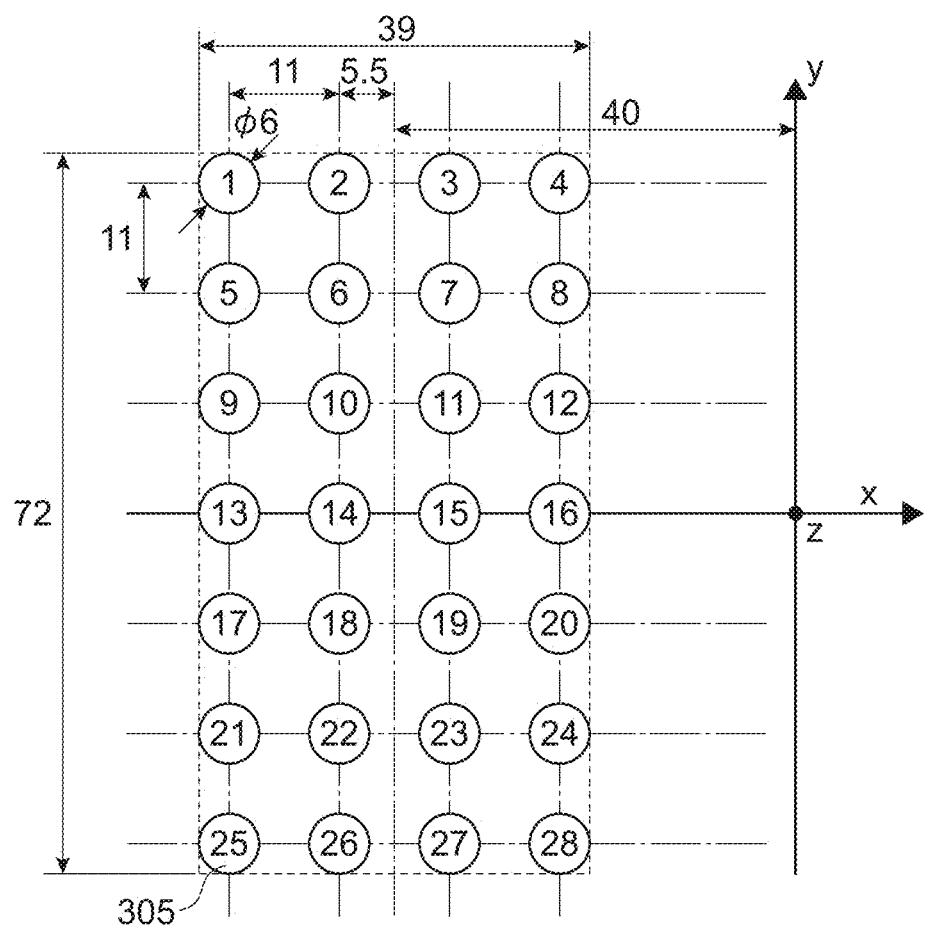
FIG. 19 is a diagram showing the number of laser light sources and arrangement positions thereof according to the third embodiment.

A light source apparatus according to a third embodiment of the present disclosure will be described. FIGS. 17 and 18 are diagrams each showing a configuration of a first light source unit 310 according to this embodiment. FIG. 19 is a diagram showing the number of laser light sources 305 and arrangement positions thereof. FIGS. 20 and 21 are tables each showing data on the first light source unit 310.

As shown in FIGS. 17 and 18, in this embodiment, a second optical system 312 includes a concave lens 325. The concave lens 325 corresponds to an optical member that guides light coming from a plurality of laser light sources 305, which has been reflected on a concave reflecting surface 321, to a phosphor layer 351. With the concave lens 325, blue laser light B1 reflected on the concave reflecting surface 321 is collected to a predetermined light collecting point 360 on the phosphor layer 351. It should be noted that FIG. 18 is a diagram of the first light source unit 310 viewed in a direction from the rear surface side of the plurality of laser light sources 305 toward the reflecting member 320.

As shown in FIG. 19, also in this embodiment, a laser light source array including 28 pieces of laser light sources is used as in the first embodiment. The blue laser light B1 as the substantially parallel light fluxes are output along a normal direction (z-axis direction) of a surface on which the plurality of laser light sources 305 are arranged. The blue laser light B1 are reflected on the concave reflecting surface 321 toward the concave lens 325. Then, the blue laser light B1 are collected on the phosphor layer 351 by use of the concave lens 325.

The concave lens 325 is arranged between the concave reflecting surface 321 and the phosphor layer 351, along substantially the center of the light fluxes from the concave reflecting surface 321 (along a direction of the arrow M), side by side with the phosphor layer 351. The arrangement of the concave lens 325 allows the light collecting point 360 for the reflected light from the concave reflecting surface 321 to be adjusted in the direction of the arrow M. As a result, the degree of freedom on the design of the second optical system 312 can be increased, and the downsizing of the light source apparatus can be achieved. It should be noted that the arrangement positions of the plurality of laser light sources 305, the reflecting member 320, the concave lens 325, and the like can be appropriately set.

In the table of FIG. 20, a focal length f2 of the second optical system 312 is a focal length of the optical system including the reflecting member 320 and the concave lens 325. In this embodiment, a focal length fM of the concave reflecting surface 321 is 57.000, and a focal length fm of the concave lens 325 is −5.814. By the arrangement of those components as shown in FIG. 17, the focal length f2 of the second optical system 312 is set to 76.685.

Further, a surface S6 that is set as an eccentric surface is a planar surface of the concave lens 325 on the rear side thereof. The surface S6 is eccentric by 40 degrees with respect to the xy plane in a clockwise direction about the y axis and by −1.8 mm in the x-axis direction. A surface S7 is a concave surface 324 of the concave lens 325, and a curvature radius thereof is −2.800.

In this embodiment, the concave surface 324 of the concave lens 325 is a spherical surface.

In the case where a member having power, in other words, a member having a predetermined focal length is used as an optical member, a focal length thereof has been considered. As described above, it is desirable that the focal length of the optical member satisfy the following conditional expression (4), $$-200 < f2/fm < 200 \quad (4)$$

where f2 represents a focal length of the second optical system, and fm represents a focal length of the optical member.

The conditional expression (4) appropriately determines the focal length of the second optical system 312 and the focal length of the optical member. If any of a member having positive power and a member having negative power is used as the optical member, the second optical system 312 is established. Therefore, the focal length of the optical member may take a positive value or a negative value. However, in the case where the upper and lower limits of the conditional expression (4) are not satisfied, it is found a possibility that an absolute value of the power (absolute value of the focal length of the optical member) becomes significantly large and thus the blue laser light B1 is not collected to a desired light collecting point 360. Specifically, in the case where the conditional expression (4) is satisfied, the blue laser light B1 can be collected to a desired light collecting point highly accurately.

Further, in the case where the optical member is formed of a lens, it is desirable that a focal length of the lens satisfy the following conditional expression (5), $$-100 < fM/fm < 100 \quad (5)$$

where fM represents a focal length of the concave reflecting surface, and fm represents a focal length of the lens.

The conditional expression (5) appropriately determines the focal length of the concave reflecting surface 321 and the focal length of the lens. In this embodiment, the concave lens 325 having a negative focal length is used, but a lens having a positive focal length may be used. As described on the conditional expression (4), there is a possibility that an absolute value of the focal length of the lens becomes significantly large and thus the accuracy of light collection is lowered. Therefore, if the conditional expression (5) is satisfied, the blue laser light B1 can be collected to a desired light collecting point highly accurately.

It is also conceived that a smaller range included in the range expressed by the conditional expressions (4) and (5) may be established as an effective range depending on various conditions.

Fourth Embodiment

Figure 22:
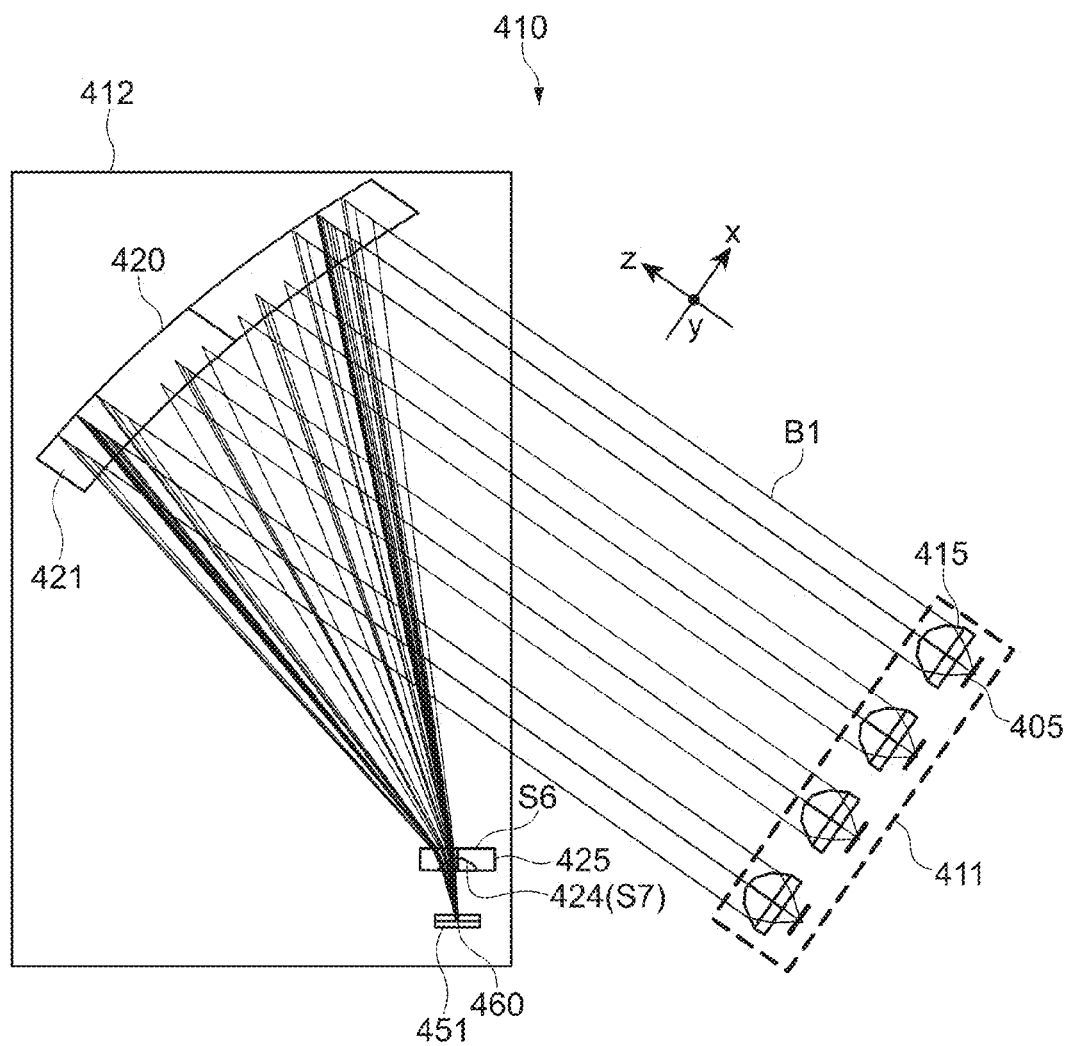
FIG. 22 is a diagram showing a configuration of a first light source unit according to a fourth embodiment of the present disclosure.
Figure 23:
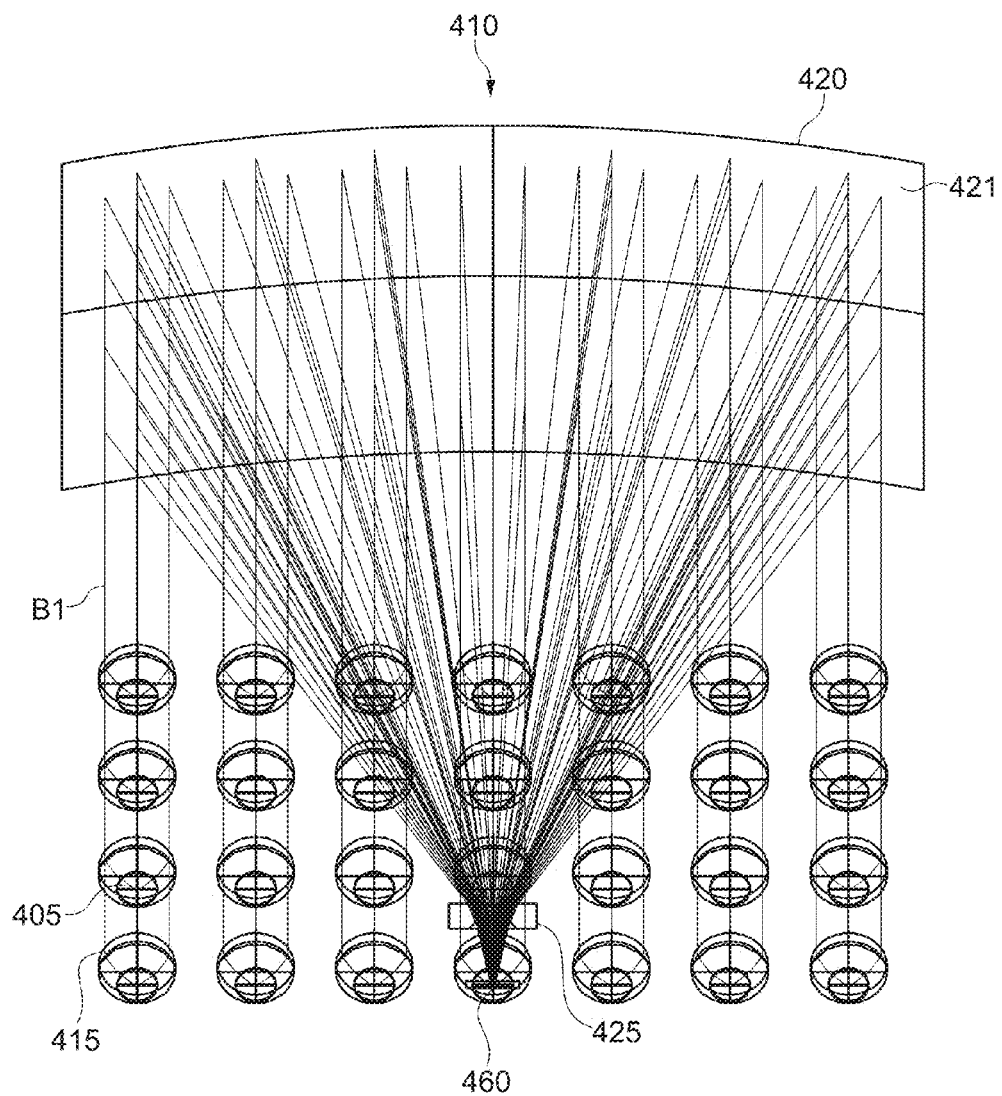
FIG. 23 is a diagram showing the configuration of the first light source unit according to the fourth embodiment.
Figure 24:
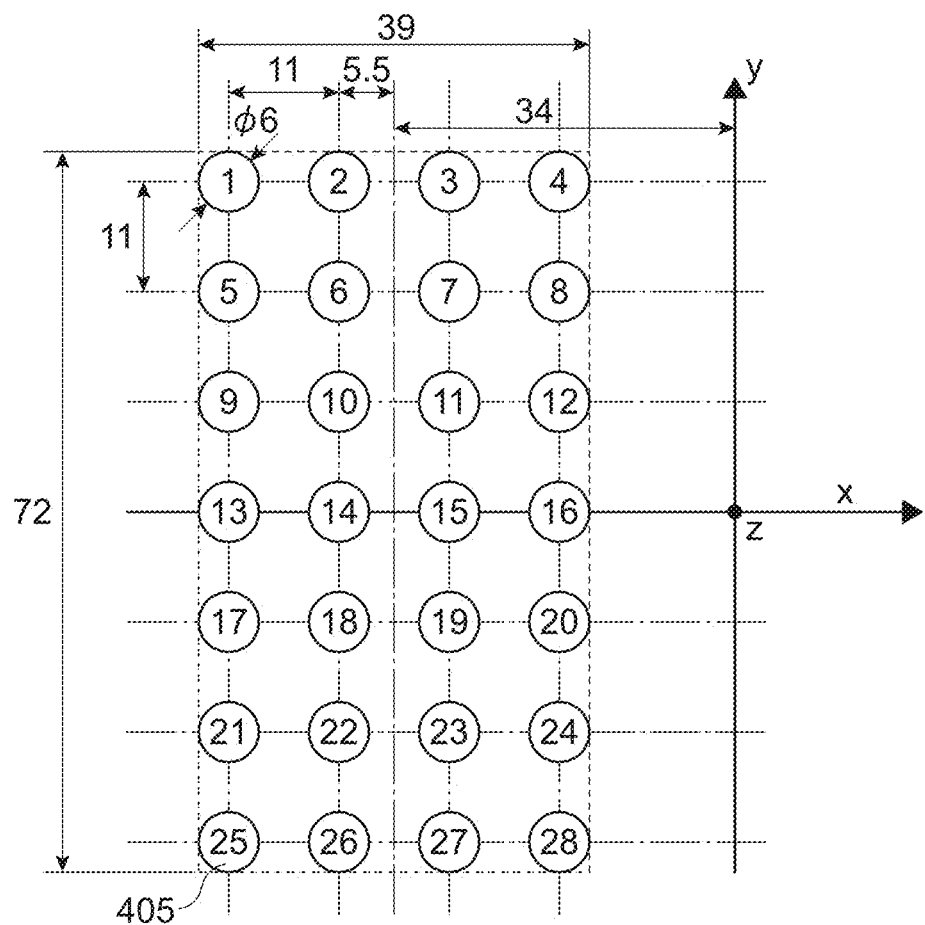
FIG. 24 is a diagram showing the number of laser light sources and arrangement positions thereof according to the fourth embodiment.

A light source apparatus according to a fourth embodiment of the present disclosure will be described. FIGS. 22 and 23 are diagrams each showing a configuration of a first light source unit 410 according to this embodiment. FIG. 24 is a diagram showing the number of laser light sources 405 and arrangement positions thereof.

FIGS. 25 and 26 are tables each showing data on the first light source unit 410.

As shown in FIGS. 22 and 23, a second optical system 412 according to this embodiment includes a concave lens 425 as an optical member as in the third embodiment. As shown in the table of FIG. 25, a surface S7 as a concave surface 424 of the concave lens 425 is formed of an aspherical surface. FIG. 26 shows data on the aspherical surface of the surface S7.

As described above, the concave lens 425 including the concave surface 424 of the aspherical surface may be used as the optical member. Also in this case, if the conditional expressions (4) and (5) described above are satisfied, the accuracy of light collection by the second optical system 412 can be improved. It should be noted that in this embodiment, a focal length fM of a concave reflecting surface 421 is 107.681, and a focal length fm of the concave lens 425 is −2.655.

Figure 27:
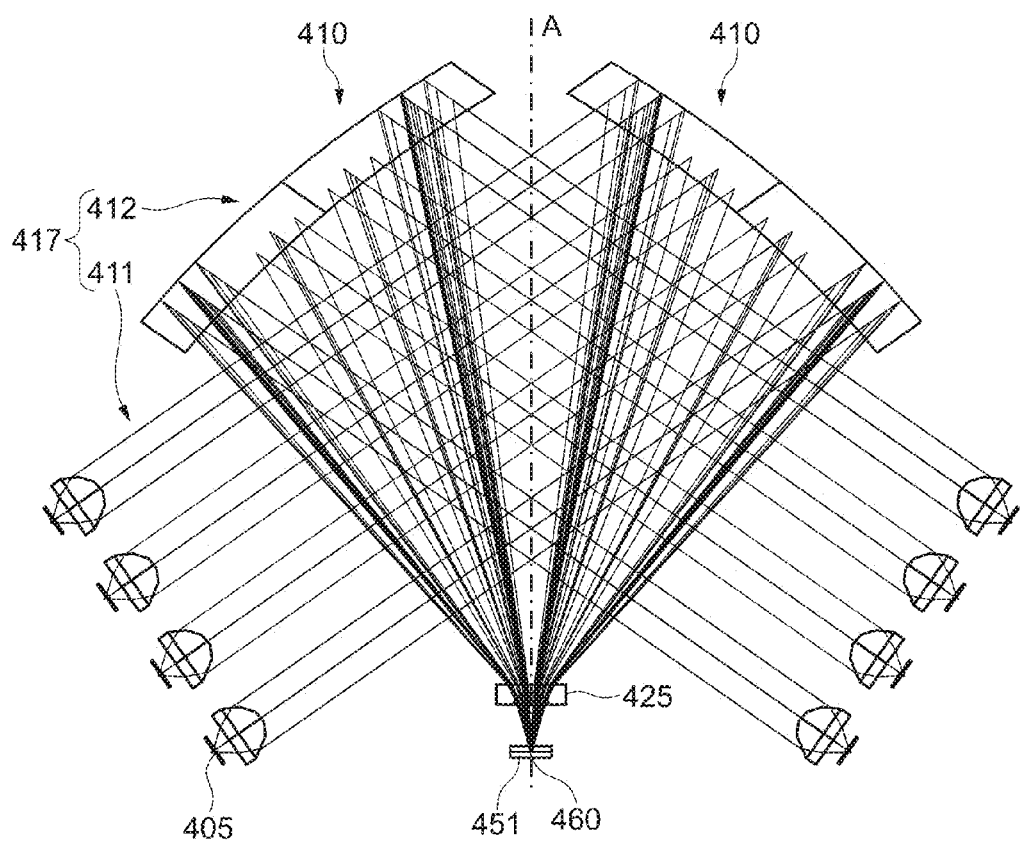
FIG. 27 is a diagram showing a configuration example in the case where two first light source units shown in FIG. 22 are used.

FIG. 27 is a diagram showing a configuration example in the case where two first light source units 410 shown in FIG. 22 are used. As shown in FIG. 27, light collecting optical systems 417 each including a set of first and second optical systems 411 and 412 are arranged at respective two positions that are symmetric about the axis A passing through a phosphor layer 451. Thus, the number of laser light sources 405 can be increased, and a high luminance of white light to be output can be achieved.

The first light source unit 410 according to this embodiment is compared with the first light source unit 310 according to the third embodiment shown in FIG. 17. In this case, the first light source unit 410 according to this embodiment has a larger distance between the plurality of laser light sources 405 and a reflecting member 420. This is because the concave lens 425 including the aspherical surface is used as the optical member. As a result, it is easy to arrange the plurality of light collecting optical systems 417 at positions that are symmetric about the axis A. As described above, for the purpose of arranging the plurality of light collecting optical systems 417, the optical member included in the second optical system 412 may be appropriately set.

Fifth Embodiment

Figure 28:
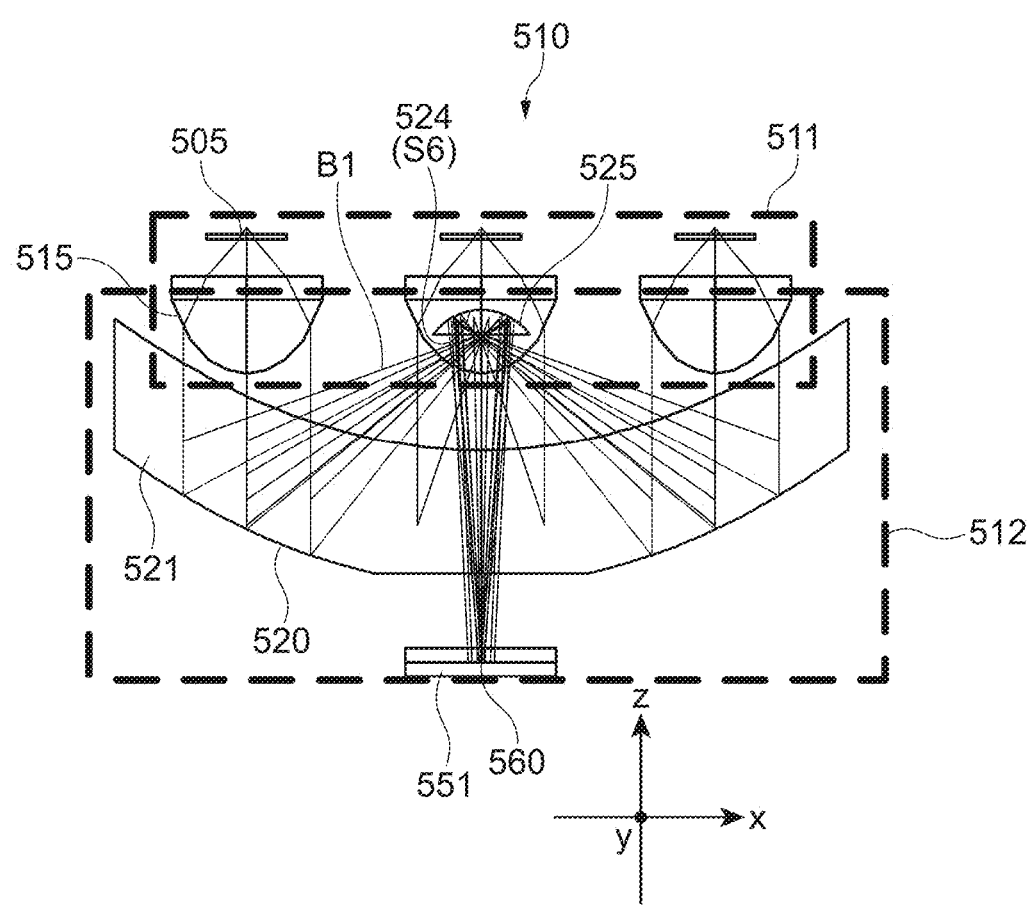
FIG. 28 is a diagram showing a configuration of a first light source unit according to a fifth embodiment of the present disclosure.
Figure 29:
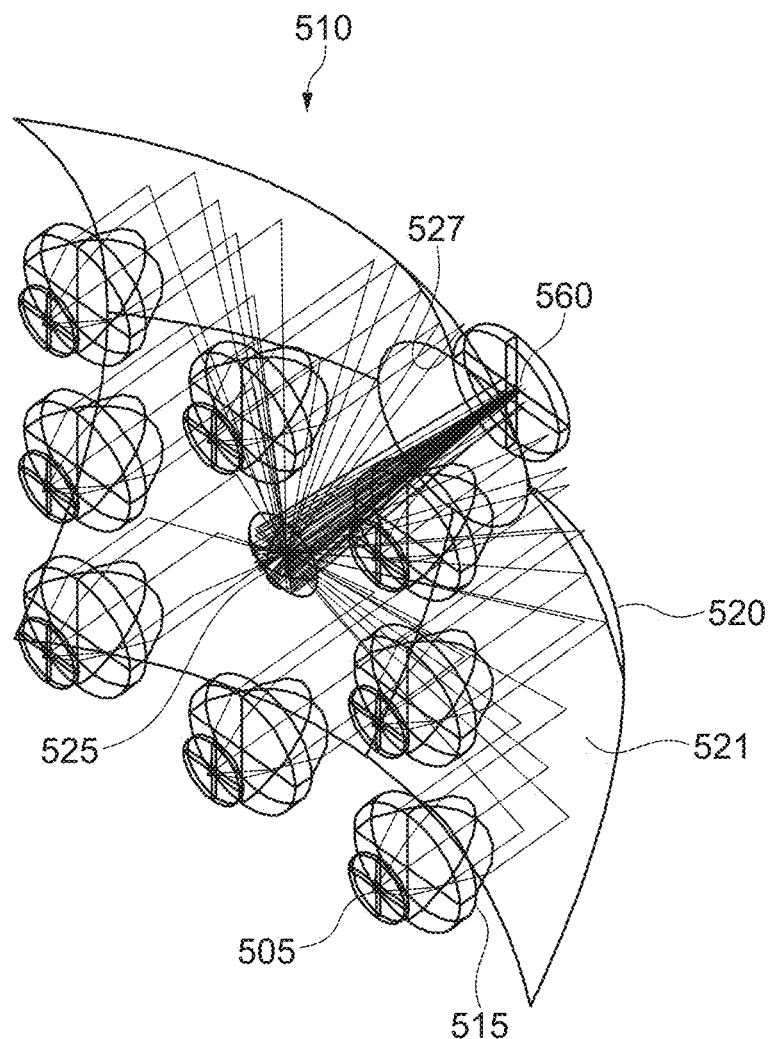
FIG. 29 is a diagram showing the configuration of the first light source unit according to the fifth embodiment.
Figure 30:
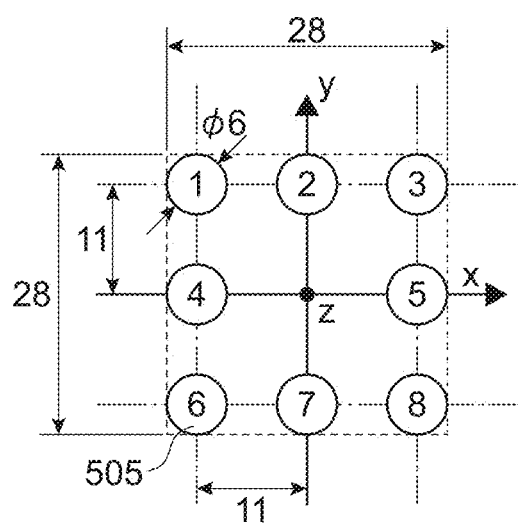
FIG. 30 is a diagram showing the number of laser light sources and arrangement positions thereof according to the fifth embodiment.

A light source apparatus according to a fifth embodiment of the present disclosure will be described. FIGS. 28 and 29 are diagrams each showing a configuration of a first light source unit 510 according to this embodiment. FIG. 30 is a diagram showing the number of laser light sources 505 and arrangement positions thereof. FIGS. 31 and 32 are tables each showing data on the first light source unit 510.

As shown in FIG. 30, in this embodiment, a laser light source array including a total of 8 pieces of laser light sources 505 is used. The 8 pieces of laser light sources 505 are arranged in matrix of three laser light sources 505 in the x-axis direction by three laser light sources 505 in the y-axis direction, and the center of the matrix is vacant. As shown in FIG. 28, a reflecting member 520 including a concave reflecting surface 521 is arranged at a position opposed to the plurality of laser light sources 505. The reflecting member 520 is arranged at a position relatively close to the plurality of laser light sources 505 so as to cover the plurality of laser light sources 505.

As shown in FIG. 29, a reflecting member 525 including a concave reflecting surface 524 is arranged as an optical member at the vacant position located at substantially the center of the laser light source array including the 8 pieces of laser light sources 505. Hereinafter, the reflecting member 520 is referred to as a first reflecting member 520 including a first concave reflecting surface 521. On the other hand, the reflecting member 525 as the optical member is referred to as a second reflecting member 525 including a second concave reflecting surface 524.

The second reflecting member 525 is arranged such that the second concave reflecting surface 524 is opposed to the first concave reflecting surface 521. An opening 527 is formed at substantially the center of the first concave reflecting surface 521, and beyond the opening 527 (on the side opposite to the first concave reflecting surface 521), a predetermined light collecting point 560 on a phosphor layer 551 is set.

Blue laser light B1 as substantially parallel light fluxes are output along a normal direction (z-axis direction) of a surface on which the plurality of laser light sources 505 are arranged. The blue laser light B1 are reflected on the first concave reflecting surface 521 toward the second reflecting member 525. Then, the blue laser light B1 are reflected on the second concave reflecting surface 524 and collected to the light collecting point 560 via the opening 527.

In the table of FIG. 31, a focal length f2 of a second optical system 512 is a focal length of the optical system including the first and second reflecting members 520 and 525. In this embodiment, a focal length fM of the first concave reflecting surface 521 is 11.480, and a focal length fm of the second reflecting member 525 is 1.400. By the arrangement of those components as shown in FIG. 28, the focal length f2 of the second optical system 512 is set to 133.933.

A surface S6 is the second concave reflecting surface 524, and a curvature radius is 2.800. In this embodiment, the second concave reflecting surface 524 is a spherical surface. By the appropriate use of the concave reflecting surface 524 as the optical member in such a manner, the first light source unit 510 can be downsized. As a result, an increase in size of the light source apparatus can be suppressed. Further, it is also advantageous for arrangement of a plurality of first light source units 510.

In the case where the optical member includes the concave reflecting surface 524, it is desirable that a focal length of the optical member satisfy the following conditional expression (6), $$0.5 < fM/fm < 50 \qquad (6)$$

where fM represents a focal length of the first concave reflecting surface, and fm represents a focal length of the optical member (focal length of the second concave reflecting surface).

The conditional expression (6) appropriately determines a focal length of each of the first and second concave reflecting surfaces 521 and 524. In the case where the upper and lower limits of the conditional expression (6) are not satisfied, there is a possibility that power of the second concave reflecting surface 524 becomes significantly large and thus the accuracy of light collection is lowered. Therefore, if the focal length is appropriately set so as to satisfy the conditional expression (6), the blue laser light B1 can be collected to a desired light collecting point highly accurately. It is also conceived that a smaller range included in the range expressed by the conditional expression (6) may be established as an effective range depending on various conditions.

Sixth Embodiment

Figure 33:
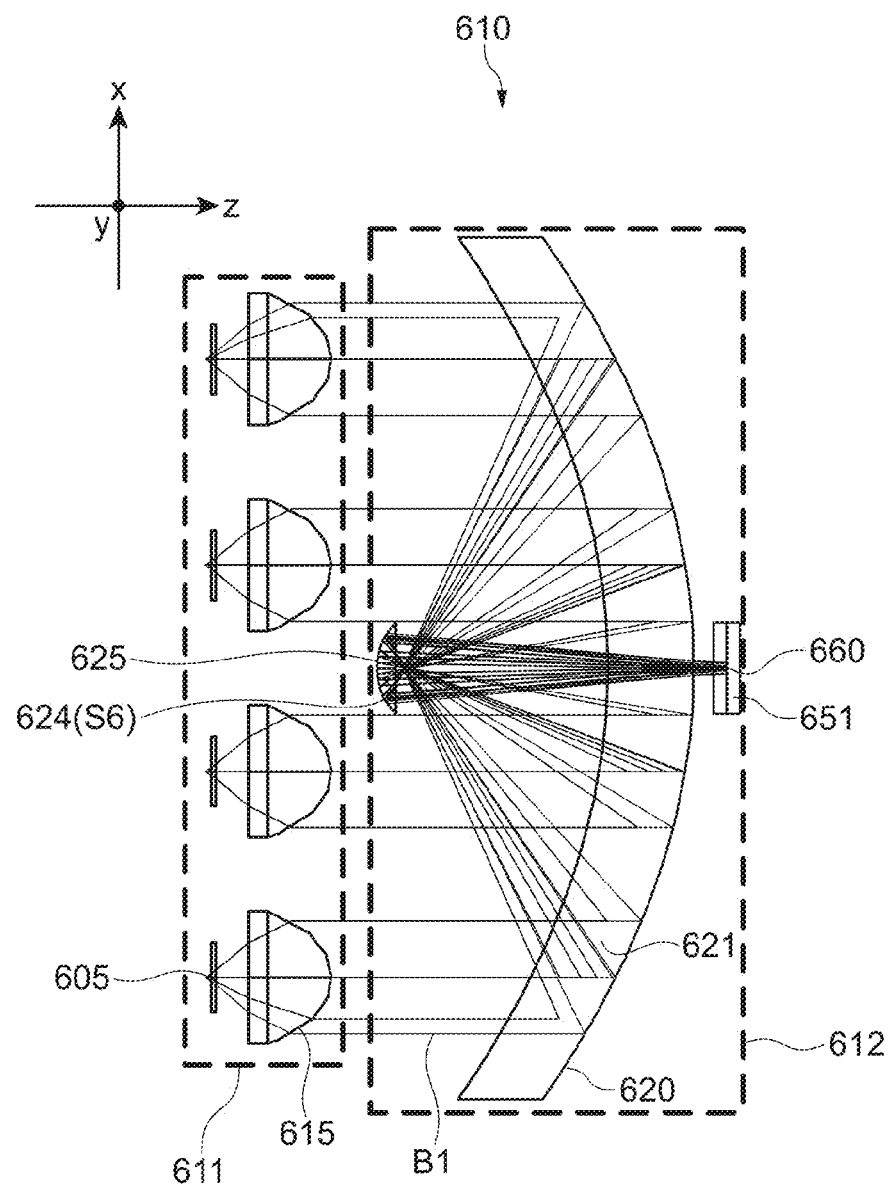
FIG. 33 is a diagram showing a configuration of a first light source unit according to a sixth embodiment of the present disclosure.
Figure 34:
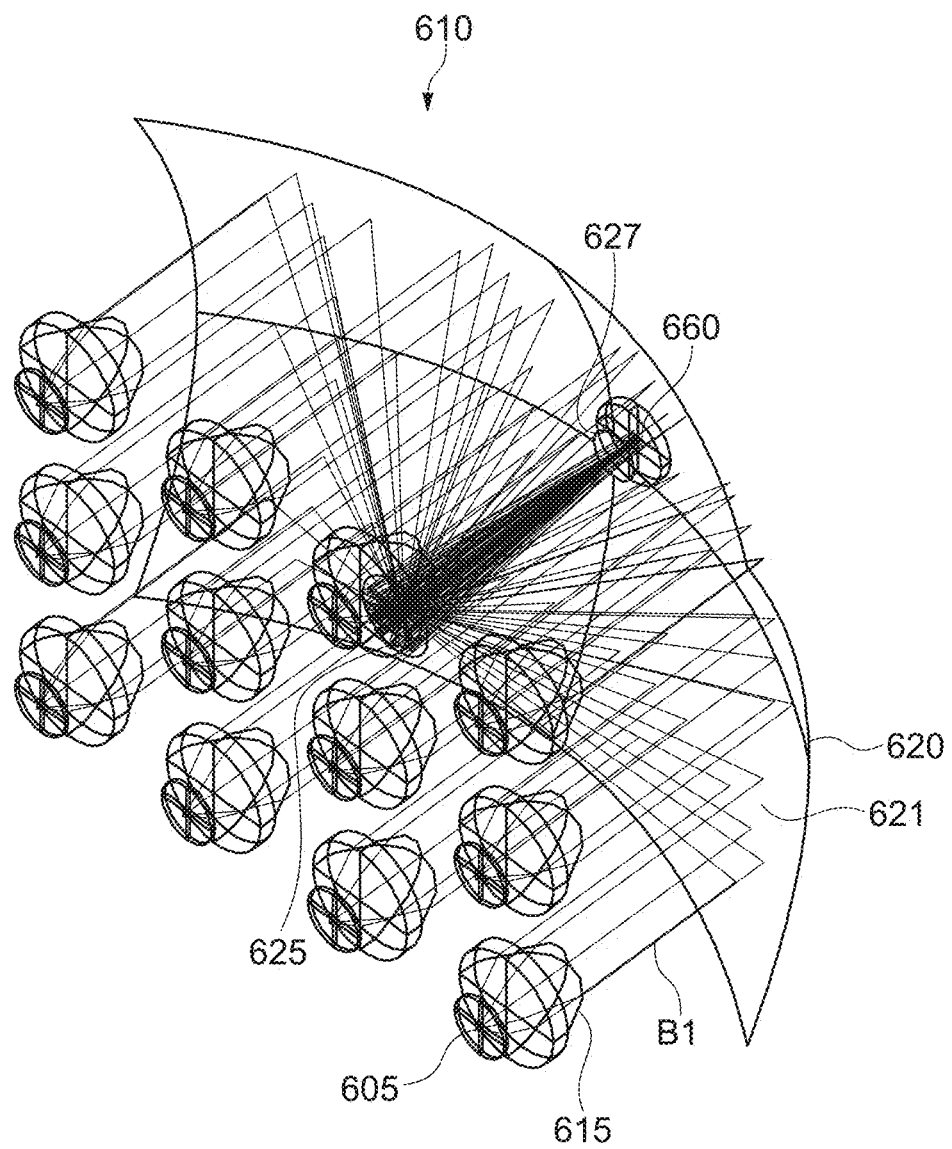
FIG. 34 is a diagram showing the configuration of the first light source unit according to the sixth embodiment.
Figure 35:
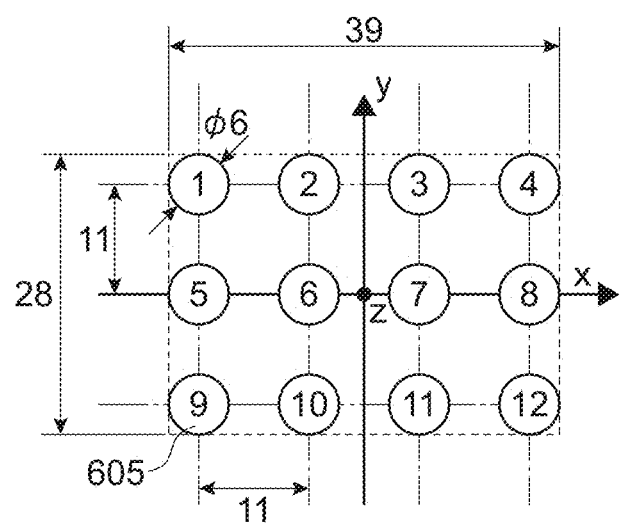
FIG. 35 is a diagram showing the number of laser light sources and arrangement positions thereof according to the sixth embodiment.

A light source apparatus according to a sixth embodiment of the present disclosure will be described. FIGS. 33 and 34 are diagrams each showing a configuration of a first light source unit 610 according to this embodiment. FIG. 35 is a diagram showing the number of laser light sources 605 and arrangement positions thereof. FIGS. 36 and 37 are tables each showing data on the first light source unit 610.

The first light source unit 610 according to this embodiment has substantially the same configuration as the first light source unit 510 according to the fifth embodiment. The first light source unit 610 is mainly different from the first light source unit 510 in the number of laser light sources 605 and the positions of a second reflecting member 625. Along with the difference, data values shown in FIGS. 36 and 37 are different from those of the first light source unit 510. As shown in FIG. 35, in this embodiment, a laser light source array including a total of 12 pieces of laser light sources 605 is used. The 12 pieces of laser light sources 605 are arranged in in matrix of four laser light sources 605 in the x-axis direction by three laser light sources 605 in the y-axis direction. Then, as shown in FIGS. 33 and 34, the second reflecting member 625 is arranged at substantially the center of the 12 pieces of laser light sources 605 and closer to a first concave reflecting surface 621 than the plurality of laser light sources 605. Blue laser light B1 as substantially parallel light fluxes are output along a normal direction (z-axis direction) of a surface on which the plurality of laser light sources 605 are arranged. The blue laser light B1 are reflected on the first concave reflecting surface 621 toward the second reflecting member 625. Then, the blue laser light B1 are reflected on a second concave reflecting surface 624 and collected to a light collecting point 660 via an opening 627.

Also with such a configuration, if the conditional expression (6) described above is satisfied, the accuracy of light collection by a second optical system 612 can be improved. It should be noted that in this embodiment, a focal length fM is 15.680, and a focal length fm is 1.670.

Seventh Embodiment

Figure 38:
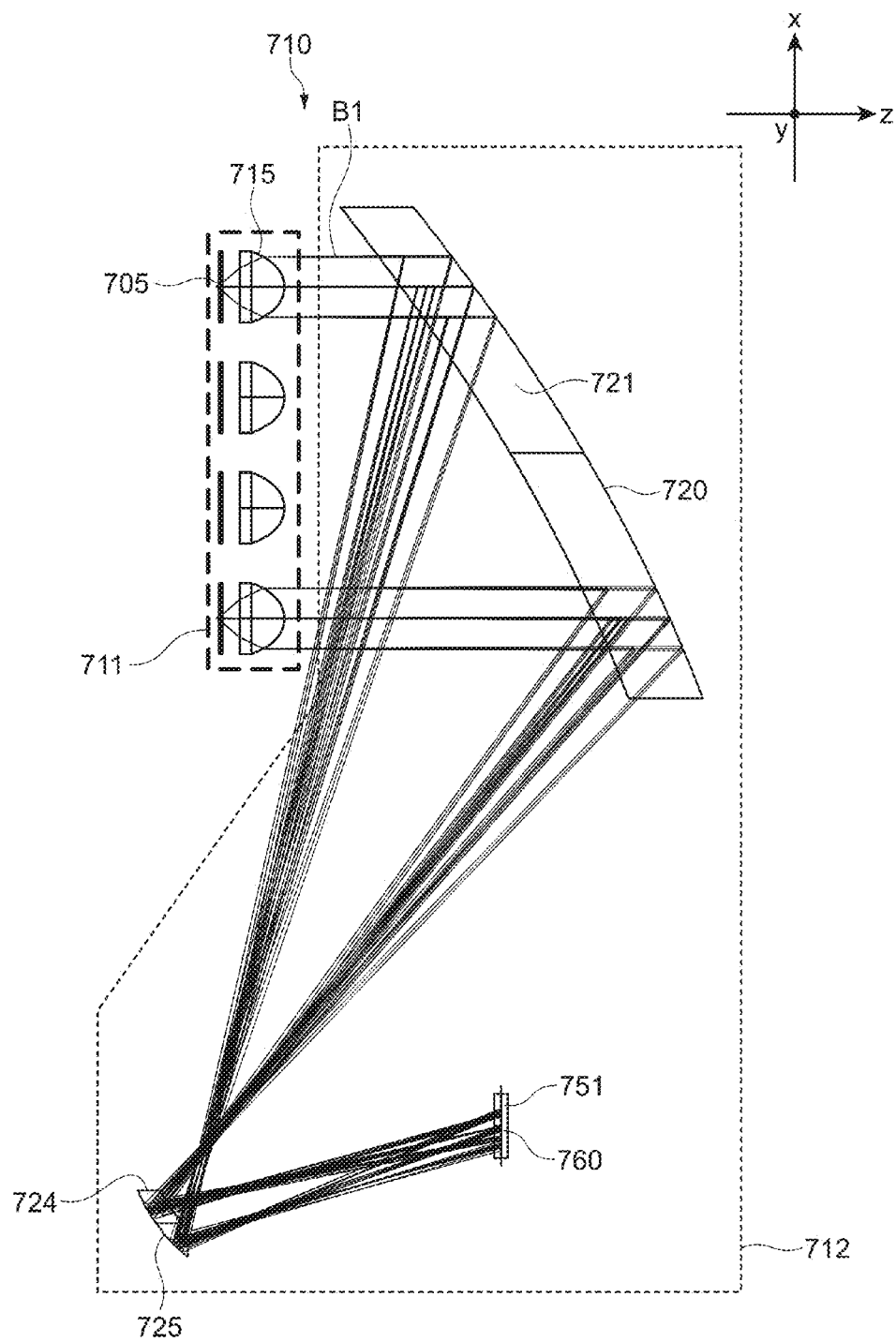
FIG. 38 is a diagram showing a configuration of a first light source unit according to a seventh embodiment of the present disclosure.
Figure 39:
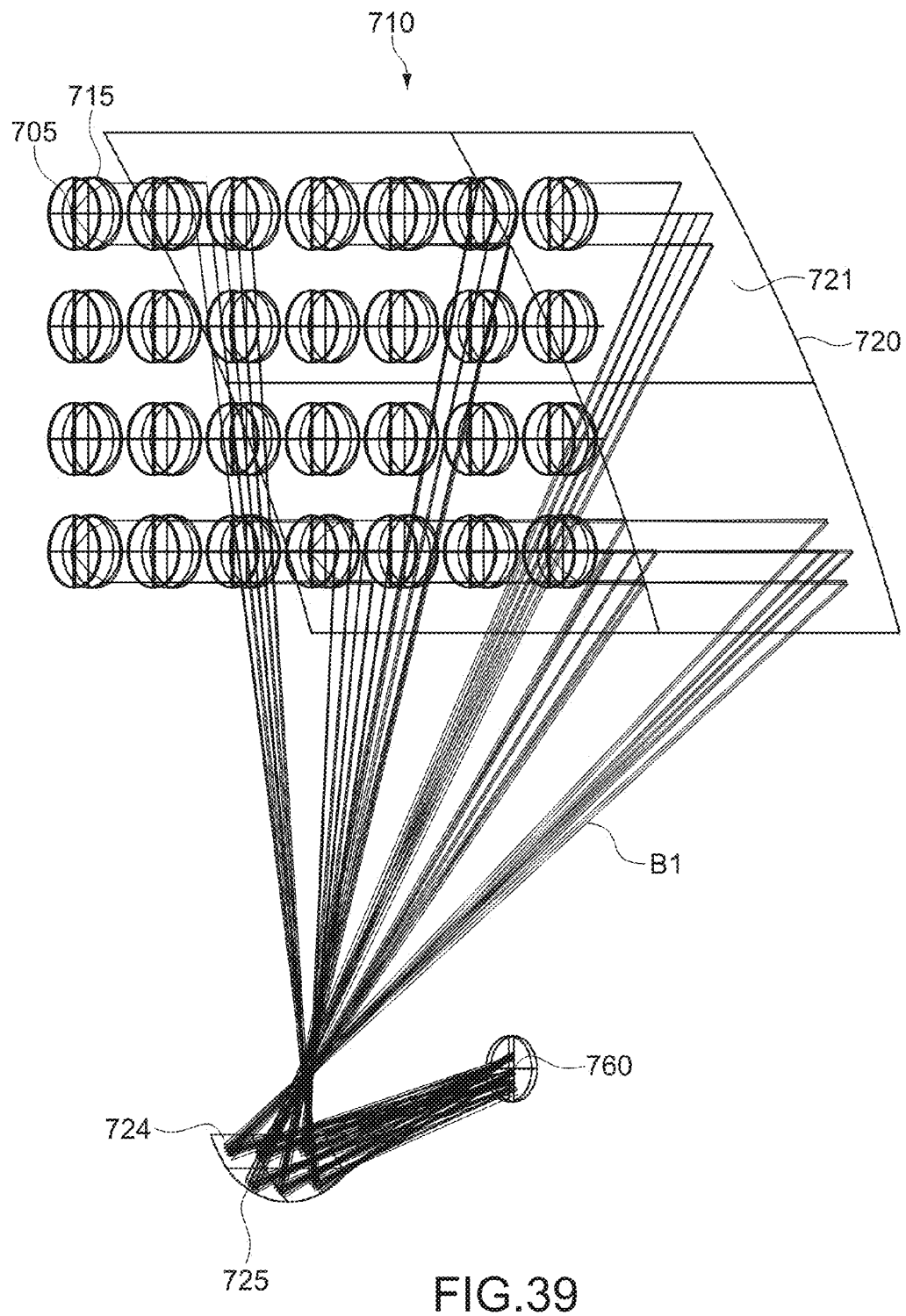
FIG. 39 is a diagram showing the configuration of the first light source unit according to the seventh embodiment.
Figure 40:
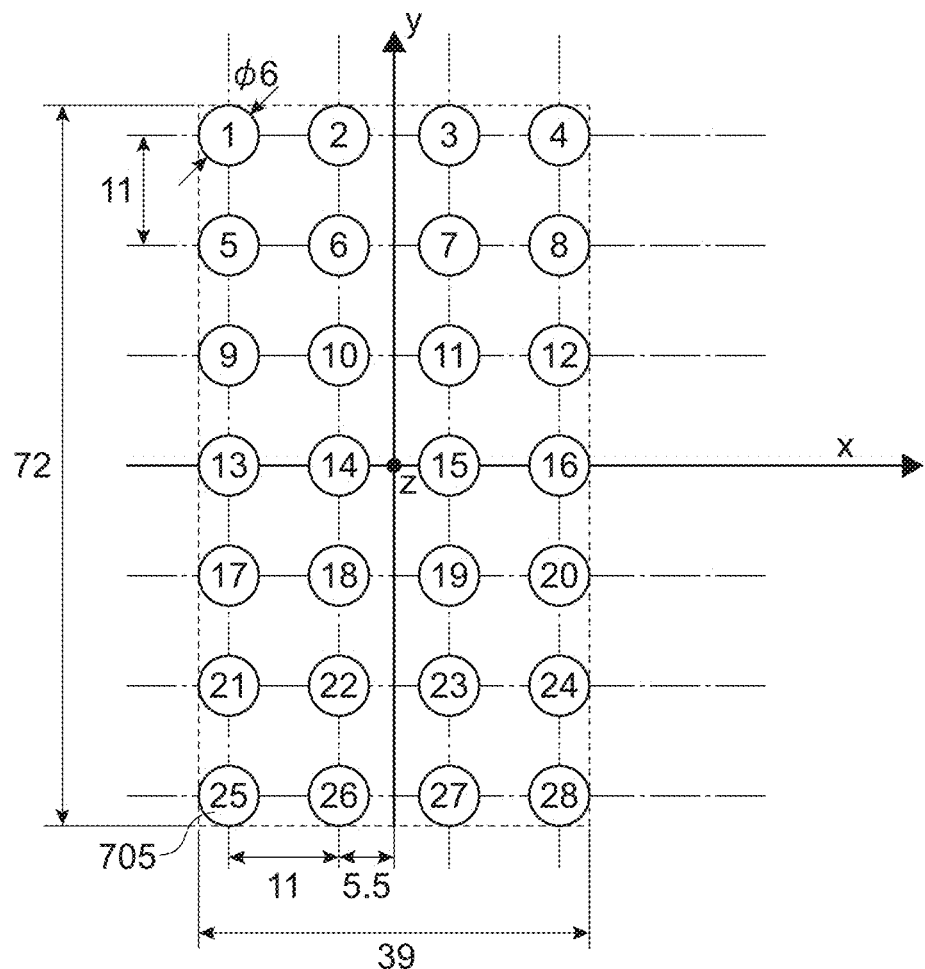
FIG. 40 is a diagram showing the number of laser light sources and arrangement positions thereof according to the seventh embodiment.

A light source apparatus according to a seventh embodiment of the present disclosure will be described. FIGS. 38 and 39 are diagrams each showing a configuration of a first light source unit 710 according to this embodiment. FIG. 40 is a diagram showing the number of laser light sources 705 and arrangement positions thereof. FIGS. 41 and 42 are tables each showing data on the first light source unit 710.

Also in the first light source unit 710 according to this embodiment, a second optical system 712 includes a second reflecting member 725 including a second concave reflecting surface 724 as an optical member. As shown in FIGS. 38 and 39, in this embodiment, a light collecting point 760 on a phosphor layer 751 is set at a position relatively distant from the positions of a plurality of laser light sources 705 and a first reflecting member 720 in the x-axis direction. In order to collect blue laser light B1 to the light collecting point 760, the second reflecting member 725 is also arranged at a position distant from the first reflecting member 720 and the like. It should be noted that as shown in FIG. 40, a laser light source array including 28 pieces of laser light sources 705 is used.

Also with such a configuration, if the conditional expression (6) described above is satisfied, the accuracy of light collection by the second optical system 712 can be improved. It should be noted that in this embodiment, a focal length fM is 55.620, and a focal length fm is 8.378.

Figure 43:
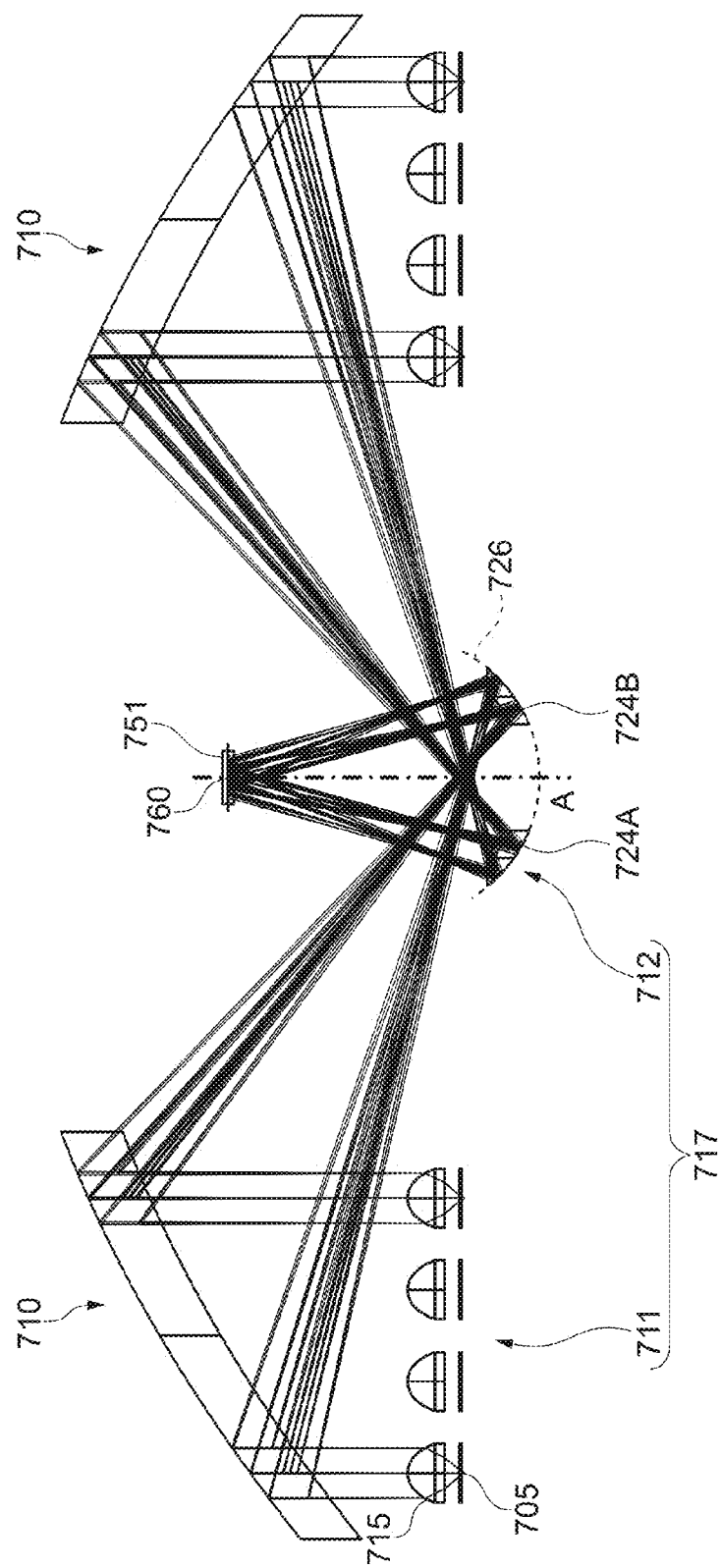
FIG. 43 is a diagram showing a configuration example in the case where two first light source units shown in FIG. 38 are used.

FIG. 43 is a diagram showing a configuration example in the case where two first light source units 710 shown in FIG. 38 are used. As shown in FIG. 43, light collecting optical systems 717 each including a set of first and second optical systems 711 and 712 are arranged at respective two positions that are symmetric about the axis A passing through the phosphor layer 751. Thus, the number of laser light sources 705 can be increased, and a high luminance of white light to be output can be achieved.

For example, by the appropriate setting of the position of the second reflecting member 725 and the like, an optimum configuration for arranging a plurality of light collecting optical systems 717 can be achieved. It should be noted that two second concave reflecting surfaces 724A and 724B shown in FIG. 43 are spherical surfaces. For example, a concave reflecting surface 726 formed of one spherical surface may be used instead of the two second concave reflecting surfaces 724A and 724B.

As in this embodiment, in the case where one second concave reflecting surface 724 is used in one light collecting optical system, the arrangement for each light collecting optical system 717 is easily performed. It should be noted that an arrangement mechanism that can appropriately arrange the positions, arrangement angles, and the like of the plurality of second concave reflecting surfaces 724 may be used. This is not limited to the case where the optical member included in the second optical system 712 is the second reflecting member 725.

In other words, it is assumed that a plurality of light collecting optical systems each including a set of a first optical system and a second optical system including a reflecting member (first reflecting member) and an optical member (second reflecting member) are arranged. In this case, an arrangement mechanism that can arrange the positions, arrangement angles, and the like of the plurality of optical members may be used. Thus, a plurality of light collecting optical systems can be easily arranged.

A configuration of the arrangement mechanism is not limited. For example, a holding mechanism to hold an optical member, a guide mechanism to rotate and move the holding mechanism, and the like may be appropriately used. The optical member may be adjusted and fixed to an appropriate position by the arrangement mechanism. Further, using an actuator and the like, a configuration in which the position of the optical member is adjustable during an operation of a light source apparatus may be adopted.

Eighth Embodiment

A light source apparatus according to an eighth embodiment of the present disclosure will be described.

Figure 44:
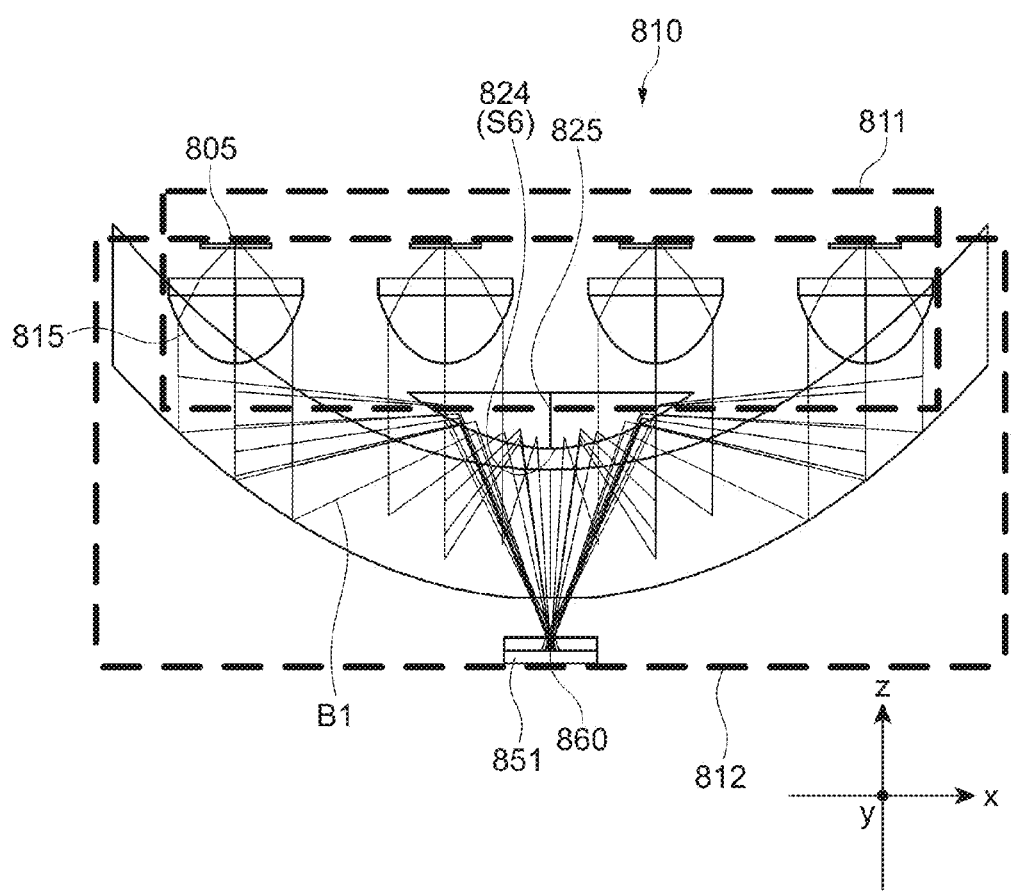
FIG. 44 is a diagram showing a configuration of a first light source unit according to an eighth embodiment of the present disclosure.
Figure 45:
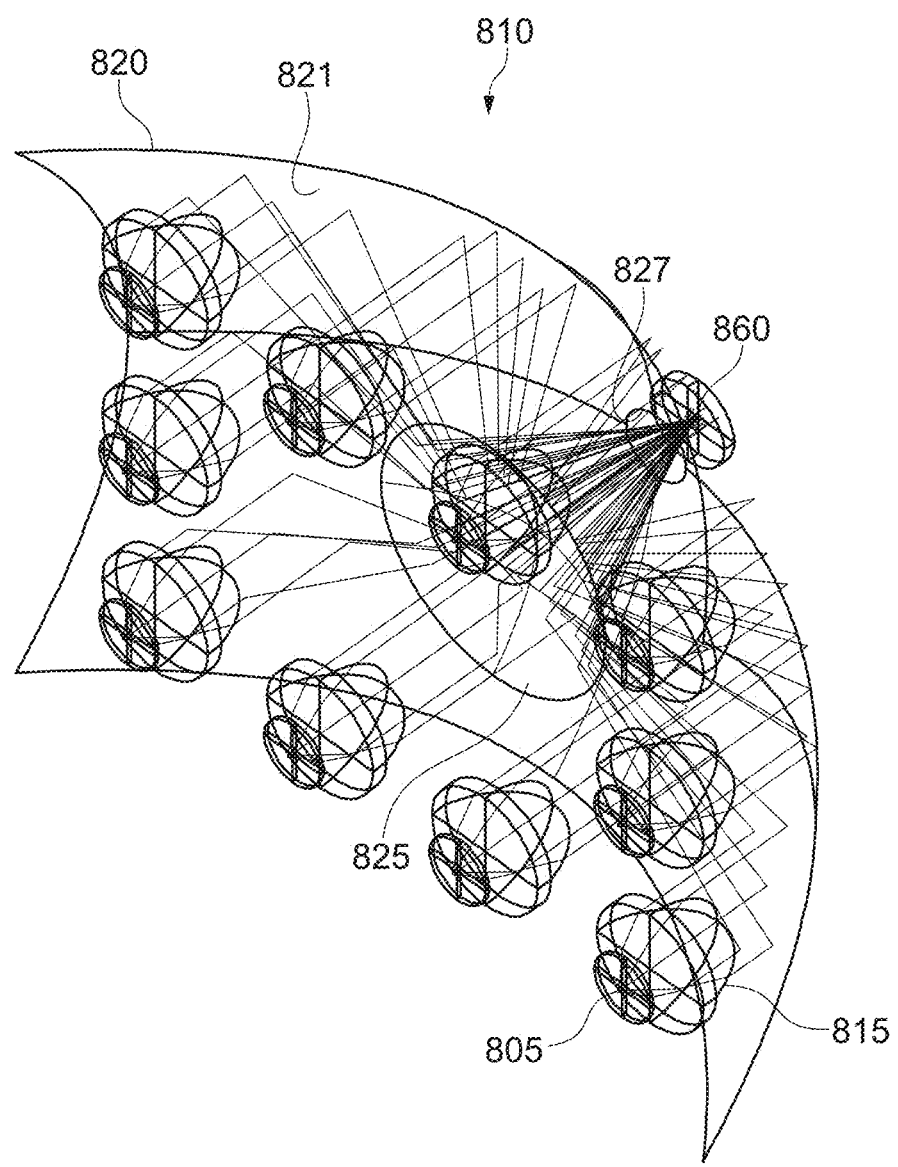
FIG. 45 is a diagram showing the configuration of the first light source unit according to the eighth embodiment.
Figure 46:
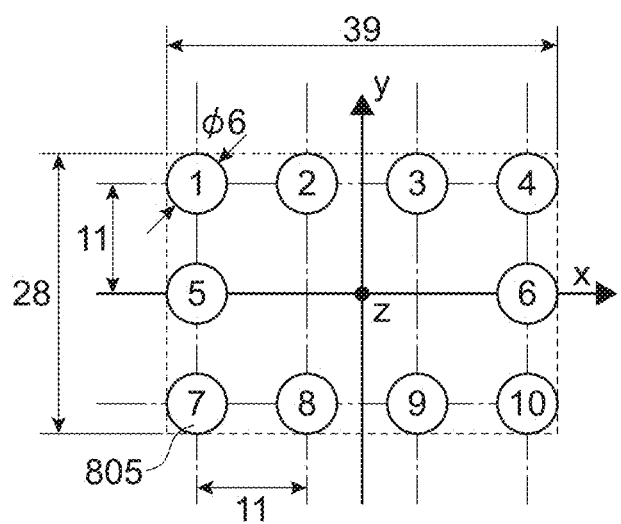
FIG. 46 is a diagram showing the number of laser light sources and arrangement positions thereof according to the eighth embodiment.

FIGS. 44 and 45 are diagrams each showing a configuration of a first light source unit 810 according to this embodiment. FIG. 46 is a diagram showing the number of laser light sources 805 and arrangement positions thereof. FIGS. 47 and 48 are tables each showing data on the first light source unit 810.

As shown in FIG. 46, in this embodiment, a laser light source array including a total of 10 pieces of laser light sources 805 is used. The 10 pieces of laser light sources 805 are arranged in matrix of four laser light sources 805 in the x-axis direction by three laser light sources 805 in the y-axis direction, and the center of the matrix corresponding to two laser light sources 805 is vacant. As shown in FIG. 44, a reflecting member 820 including a concave reflecting surface 821 is arranged at a position opposed to the plurality of laser light sources 805. The reflecting member 820 is arranged at a position relatively close to the plurality of laser light sources 805 so as to cover the plurality of laser light sources 805.

As shown in FIG. 45, a convex reflecting member 825 including a convex reflecting surface 824 is arranged as an optical member at the vacant position located at substantially the center of the laser light source array including the 10 pieces of laser light sources 805. The convex reflecting member 825 is arranged at a position closer to the concave reflecting surface 821 than the plurality of laser light sources 805.

The convex reflecting member 825 is arranged such that the convex reflecting surface 824 is opposed to the concave reflecting surface 821. An opening 827 is formed at substantially the center of the concave reflecting surface 821, and beyond the opening 827 (on the side opposite to the concave reflecting surface 821), a predetermined light collecting point 860 on a phosphor layer 851 is set.

Blue laser light B1 as substantially parallel light fluxes are output along a normal direction (z-axis direction) of a surface on which the plurality of laser light sources 805 are arranged. The blue laser light B1 are reflected on the concave reflecting surface 821 toward the convex reflecting member 825. Then, the blue laser light B1 are reflected on the convex reflecting surface 824 and collected to the light collecting point 860 via the opening 827.

In the table of FIG. 47, a focal length f2 of a second optical system 812 is a focal length of the optical system including the reflecting member 820 and the convex reflecting member 825. In this embodiment, a focal length fM of the concave reflecting surface 821 is 11.025, and a focal length fm of the convex reflecting member 825 is −4.285. By the arrangement of those components as shown in FIG. 44, the focal length f2 of the second optical system 812 is set to 37.494.

A surface S6 is the convex reflecting surface 824 formed of an aspherical surface. In the table of FIG. 48, data of the surface S6 as the aspherical surface is shown. By the appropriate use of the convex reflecting member 825 as the optical member in such a manner, the first light source unit 810 can be downsized. As a result, an increase in size of the light source apparatus can be suppressed.

Further, it is also advantageous for arrangement of a plurality of first light source units 810.

In the case where the optical member includes the convex reflecting surface 824, it is desirable that a focal length of the optical member satisfy the following conditional expression (7), $$-50 < fM/fm < -0.5 \quad (7)$$

where fM represents a focal length of the concave reflecting surface, and fm represents a focal length of the optical member (focal length of the convex reflecting surface).

The conditional expression (7) appropriately determines a focal length of the concave reflecting surface 821 and a focal length of the convex reflecting surface 824. In the case where the upper and lower limits of the conditional expression (7) are not satisfied, there is a possibility that power of the convex reflecting surface 824 becomes significantly large and thus the accuracy of light collection is lowered. Therefore, if the focal length is appropriately set so as to satisfy the conditional expression (7), the blue laser light B1 can be collected to a desired light collecting point highly accurately.

It is also conceived that a smaller range included in the range expressed by the conditional expression (7) may be established as an effective range depending on various conditions.

Ninth Embodiment

Figure 49:
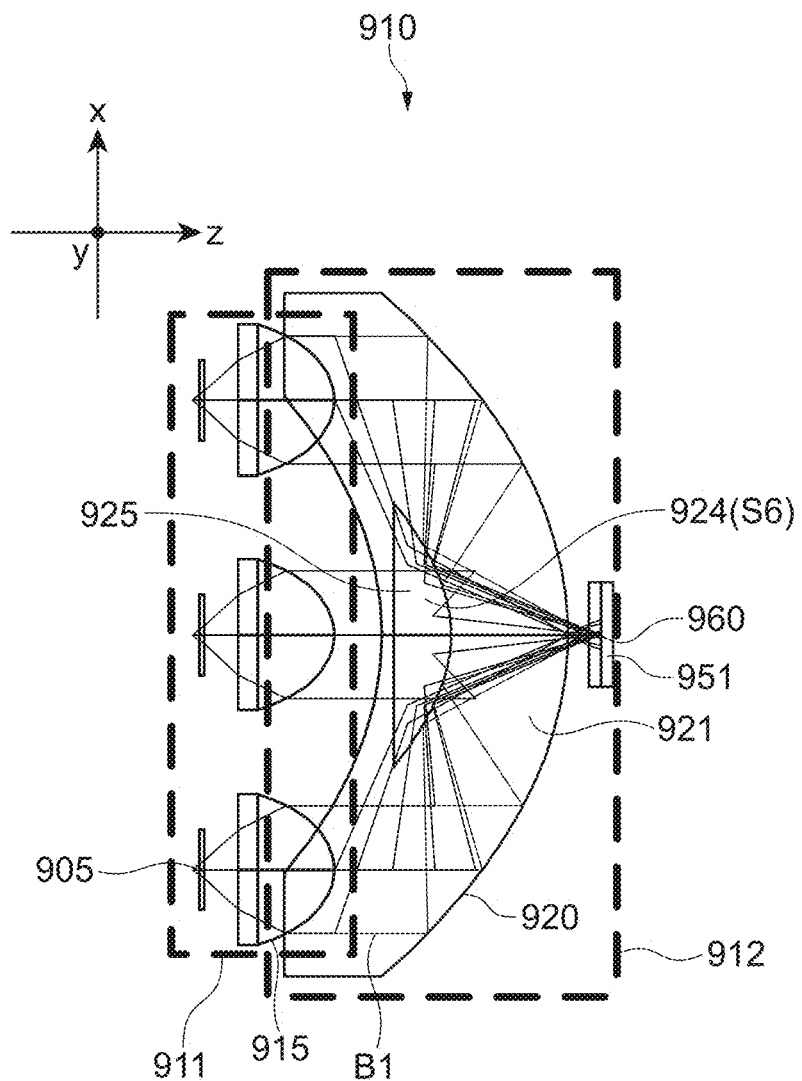
FIG. 49 is a diagram showing a configuration of a first light source unit according to a ninth embodiment of the present disclosure.
Figure 50:
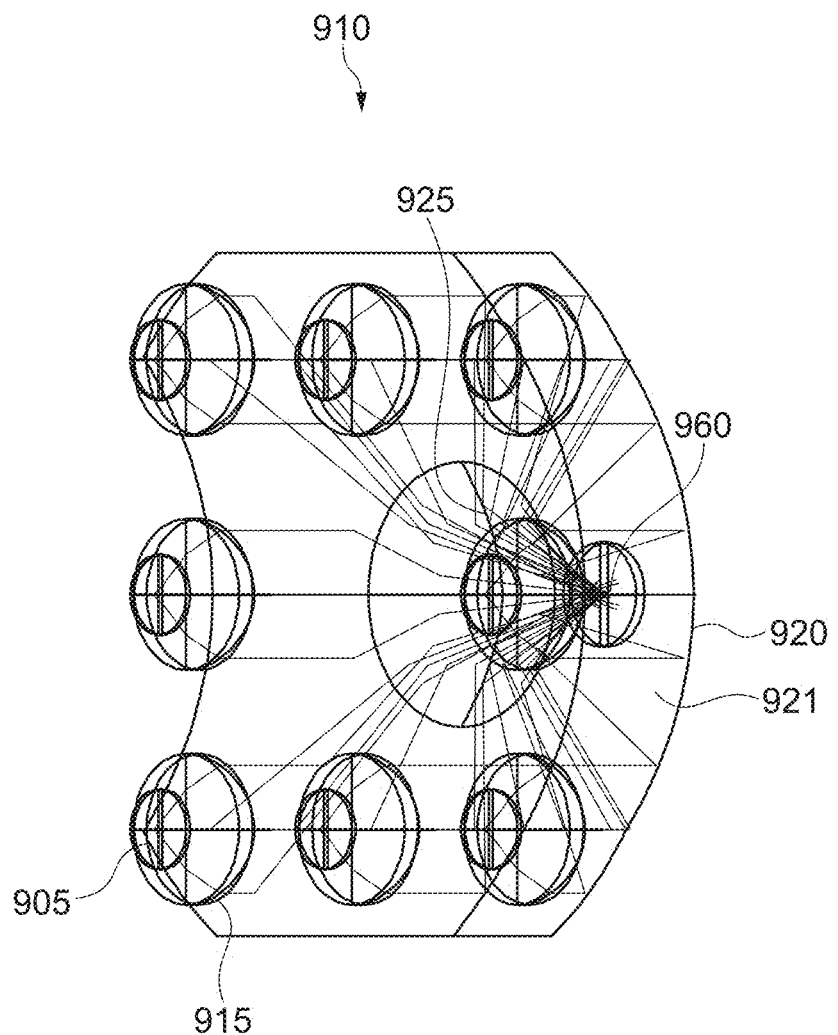
FIG. 50 is a diagram showing the configuration of the first light source unit according to the ninth embodiment.
Figure 51:
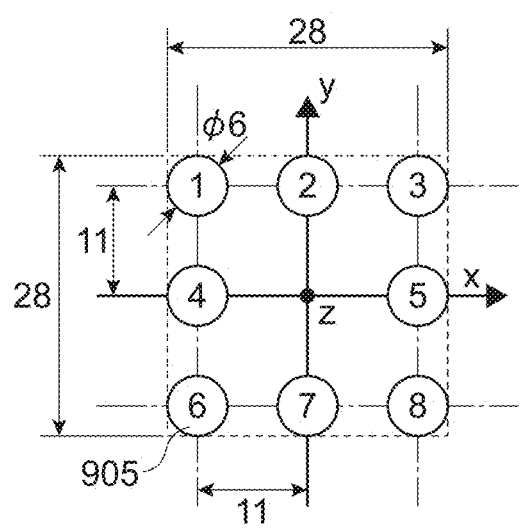
FIG. 51 is a diagram showing the number of laser light sources and arrangement positions thereof according to the ninth embodiment.

A light source apparatus according to a ninth embodiment of the present disclosure will be described. FIGS. 49 and 50 are diagrams each showing a configuration of a first light source unit 910 according to this embodiment. FIG. 51 is a diagram showing the number of laser light sources 905 and arrangement positions thereof. FIGS. 52 and 53 are tables each showing data on the first light source unit 910.

The first light source unit 910 according to this embodiment has substantially the same configuration as the first light source unit 810 according to the eighth embodiment. The first light source unit 910 is mainly different from the first light source unit 810 in the number of laser light sources 905. Along with the difference, data values shown in FIGS. 52 and 53 are different from those of the first light source unit 810.

As shown in FIG. 51, in this embodiment, a laser light source array including a total of 8 pieces of laser light sources 905 is used. The 8 pieces of laser light sources 905 are arranged in in matrix of three laser light sources 905 in the x-axis direction by three laser light sources 905 in the y-axis direction, and the center of the matrix is vacant. As shown in FIGS. 49 and 50, a convex reflecting member 925 is arranged at substantially the center of the 8 pieces of laser light sources 905.

Blue laser light B1 as substantially parallel light fluxes are output along a normal direction (z-axis direction) of a surface on which the plurality of laser light sources 905 are arranged. The blue laser light B1 are reflected on a first concave reflecting surface 921 toward the convex reflecting member 925. Then, the blue laser light B1 are reflected on a convex reflecting surface 924 and collected to a light collecting point 960 via an opening.

Also with such a configuration, if the conditional expression (7) described above is satisfied, the accuracy of light collection by a second optical system 912 can be improved. It should be noted that in this embodiment, a focal length fM is 7.670, and a focal length fm is −8.278.

FIG. 54 is a table showing data of the first to ninth embodiments. As shown in the table of FIG. 54, it is found that the conditional expressions (1) to (7) are satisfied in the respective embodiments.

Tenth Embodiment

Figure 55:
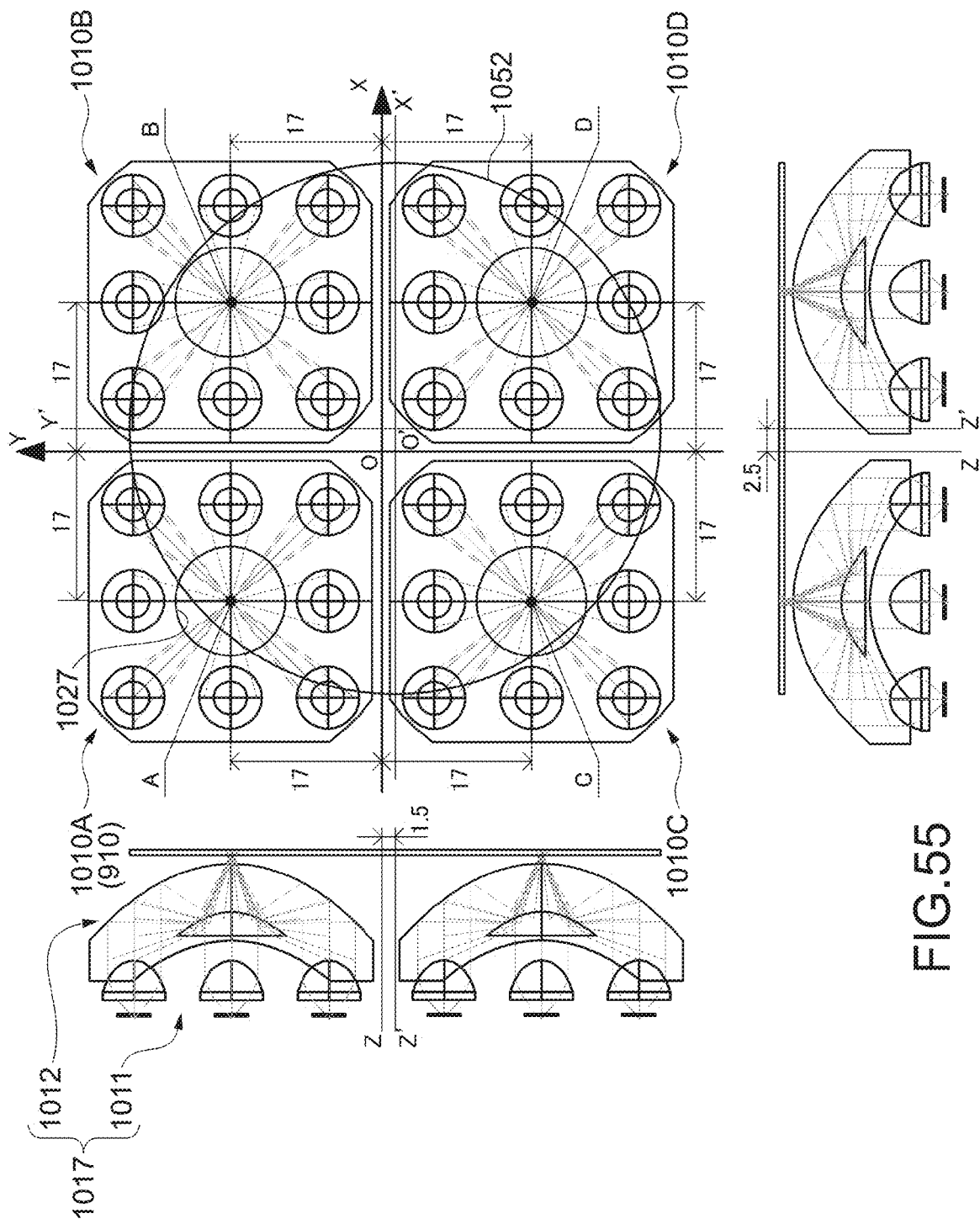
FIG. 55 is a diagram showing a configuration of a first light source unit according to a tenth embodiment of the present disclosure.

A light source apparatus according to a tenth embodiment of the present disclosure will be described. FIG. 55 is a diagram showing a configuration of a first light source unit according to this embodiment. As shown in FIG. 55, in this embodiment, four first light source units 1010 are arranged. The first light source units 1010 each include a light collecting optical system 1017 including a set of first and second optical systems 1011 and 1012. It should be noted that the first light source unit 1010 has substantially the same configuration as that of the first light source unit 910 described in the ninth embodiment.

The four first light source units 1010 are arranged symmetrically with the original point O of xy coordinates shown in FIG. 55. Therefore, in this embodiment, an axis extending in a direction vertical to the plane at the position of the original point O corresponds to a predetermined reference axis. Each of the first light source units 1010 outputs and collects blue laser light B1 through an opening 1027 at substantially the center thereof. Light collecting points A and D of the respective first light source units 1010 are located at positions symmetric with the original point O of the xy coordinates.

As shown in FIG. 55, the light collecting points A to D of the first light source units 1010A to 1010D are represented as below using the xy coordinates in which the length mm is a coordinate value.

Light collecting point A: (−17 mm, 17 mm)
Light collecting point B: (17 mm, 17 mm)
Light collecting point C: (−17 mm, −17 mm)
Light collecting point D: (17 mm, −17 mm)

A distance from each light collecting point to the original point O is equal. Therefore, the light collecting points A to D are located on a circumference of a circle having the center at the original point O and having a diameter Φ of about 48 mm. Those four light collecting points A to D are aligned with predetermined positions of a phosphor layer provided to a phosphor wheel 1052.

In the case where the plurality of light collecting points A to D are set, blue laser light B1 is collected at those points and accordingly the temperature of the phosphor layer rises. As the number of light collecting points is increased, there arises a case where a light emission efficient of the phosphor layer is saturated or the phosphor layer is burned. In order to avoid such situations, the phosphor wheel 1052 is used and operated at high-speed so that the blue laser light B1 is prevented from being continuously applied to the same position.

Here, it is assumed a case where an original point O' of x'y' coordinates, which is the center axis of the phosphor wheel 1052 shown in FIG. 55, is aligned with the original point O. Then, the four light collecting points A and D are arranged on a circumference of a circle having a diameter of about 48 mm with the original point O' being as the center, on the phosphor layer arranged on the phosphor wheel 1052. In this case, even if the phosphor wheel 1052 is rotated at high-speed, the blue laser light B1 is collected to the four light collecting points on the circumference of the circle. Specifically, the blue laser light B1 is intensively applied to a single circumference of a circle on the phosphor layer, and therefore there is a possibility that the phosphor layer may be saturated or burned.

Therefore, in this embodiment, the original point O' is displaced from the position of the original point O and set. Thus, the light collecting points A to D are set at four positions each having a different distance from the original point O' serving as a position of the rotation axis, on the phosphor layer arranged on an arrangement surface of the phosphor wheel 1052.

Figure 56:
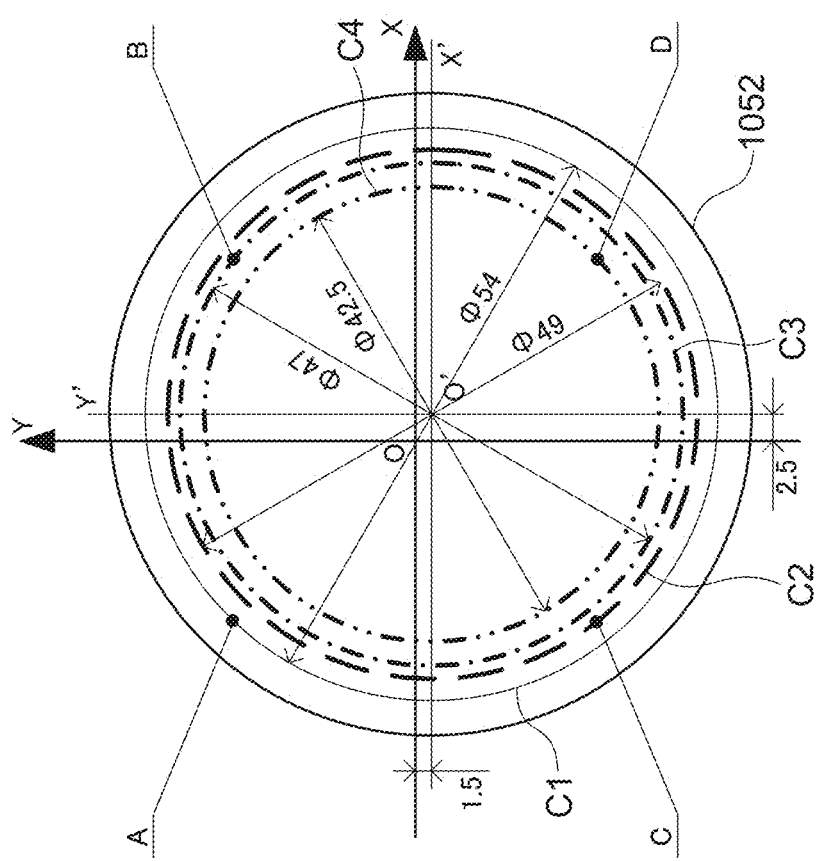
FIG. 56 is a diagram for describing the position of a light collecting point according to the tenth embodiment.

For example, as shown in FIG. 55, it is assumed that the original point O' is displaced from the original point O by (2.5 mm, −1.5 mm) on the xy coordinates. Then, as shown in FIG. 56, the positions of the light collecting points A to D are set in distances different from one another from the original point O'. When the phosphor wheel 1052 is rotated in this state, the light collecting points are set on respective circumferences of the following circles with the original point O' being as the center.

Light collecting point A: Circle C1 having a diameter of 54 mm

Light collecting point B: Circle C2 having a diameter of 47 mm

Light collecting point C: Circle C3 having a diameter of 49 mm

Light collecting point D: Circle C4 having a diameter of 42.5 mm

Thus, the four light collecting points A and D can be distributed to be set on the four circumferences of circles on the phosphor layer. Therefore, the blue laser light B1 can be prevented from being intensively applied to one circumference of a circle. As a result, the phosphor layer can be prevented from being saturated or burned. It should be noted that the phosphor layer is arranged in the range including the above-mentioned four circles C1 to C4 on the phosphor wheel 1052.

The method of setting the light collecting points at a plurality of positions in distances different from one another from the rotation axis O' of the phosphor wheel 1052 is not limited. Typically, as described in this embodiment, the center O of the circle having the circumference, on which the plurality of light collecting points A to D are arranged, is set so as not to match the center O' of the phosphor wheel 1052. Additionally, when the xy coordinate system including the center O and the x'y' coordinate system including the center O' are assumed, an amount of displacement of the x axis and that of the x' axis and an amount of displacement of the y axis and that of the y' axis do not match each other.

It should be noted that the phosphor layer may be applied on the entire arrangement surface of the phosphor wheel 1052 or may be applied independently at positions corresponding to the circles C1 to C4 formed by the respective light collecting points A to D.

Eleventh Embodiment

Figure 57:
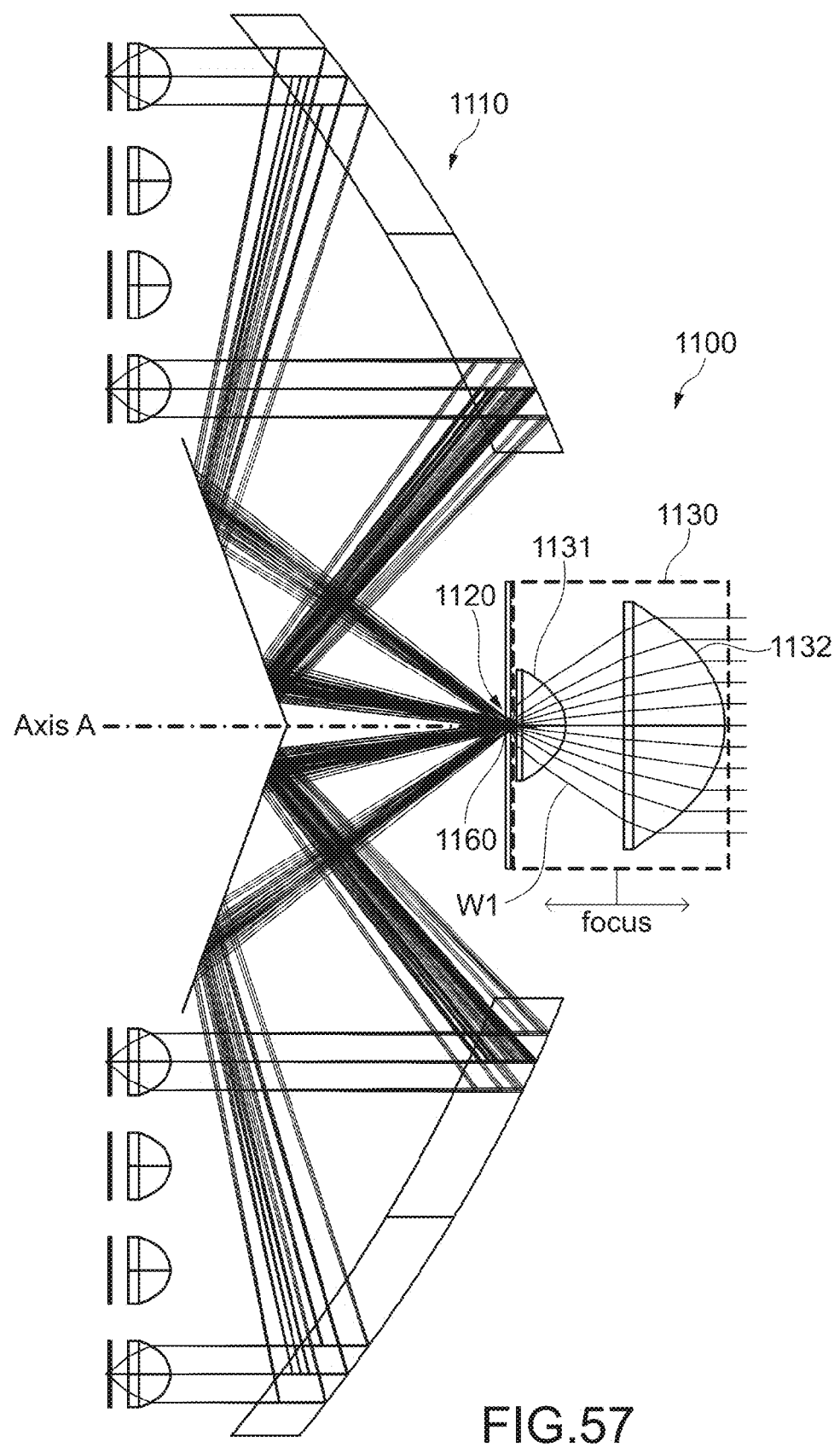
FIG. 57 is a diagram showing a configuration of a light source apparatus according to an eleventh embodiment of the present disclosure.

A light source apparatus according to an eleventh embodiment of the present disclosure will be described. FIG. 57 is a diagram showing a configuration of a light source apparatus according to this embodiment. A light source apparatus 1100 according to this embodiment includes a third optical system 1130 having a variable focal length. The third optical system 1130 can convert a light flux of white light W1 output from a second light source unit 1120 into a substantially parallel light flux.

In FIG. 57, the configurations of first and second light source units 1110 and 1120 are substantially the same as those according to the second embodiment shown in FIG. 16. However, the configurations of the first and second light source units 1110 and 1120 are not limited to those configurations, and configurations and the like described in the other embodiments may be appropriately used.

Figure 58:
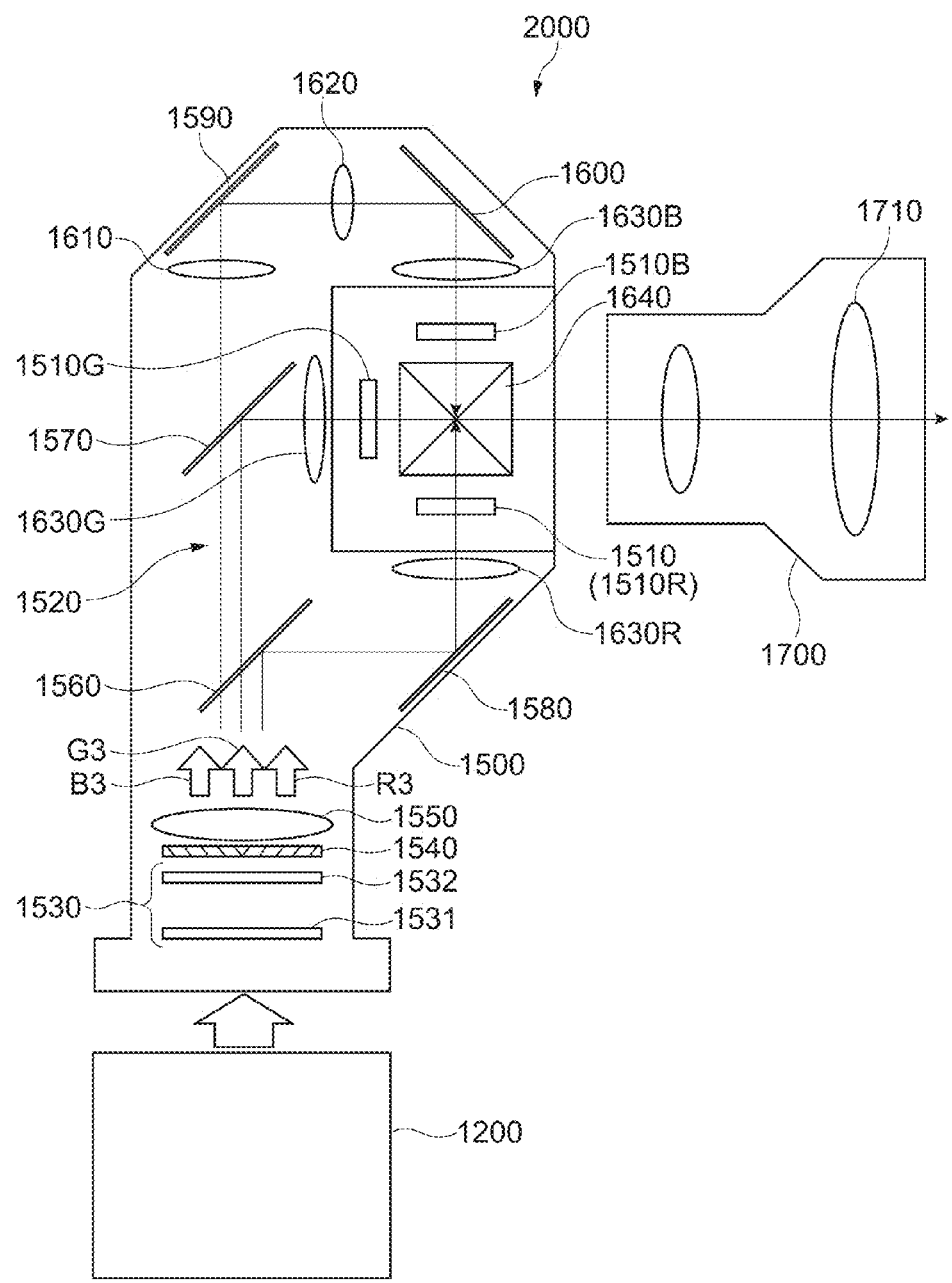
FIG. 58 is a schematic diagram showing a configuration example of a projector as an image display apparatus according to an embodiment of the present disclosure.

The third optical system 1030 is an optical system for taking in the light flux emitted from the second light source unit 1120 into a lighting system 1500 (see FIG. 58). In the example shown in FIG. 57, the axis A passing through a light collecting point 1160 is aligned with an optical axis of the third optical system 1030. Light is emitted from the light collecting point 1160 of a phosphor layer in a substantial lambertian pattern, and the emitted light flux is converted into a substantially parallel light flux by the third optical system 1130 and then output to the lighting system 1500.

As described above, the focal length of the third optical system 1130 is variable. For example, a focusing mechanism that moves the third optical system 1130 in an optical axis direction is provided. Thus, it is possible to efficiently take in the light flux emitted from a light-emitting source of the second light source unit 1120 into the lighting system 1500 without deterioration.

In this embodiment, two lenses 1131 and 1132 form the third optical system 1130. However, the configurations of the third optical system 1130 and the focusing mechanism are not limited.

It should be noted that the specific shapes of the respective portions described in the embodiments described above and the numerical values of the table shown in FIG. 54 are part of examples of the embodiments for carrying out the present disclosure, and the technical range of the present disclosure is not limited by those examples.

Image Display Apparatus

An image display apparatus according to this embodiment will be described. Here, a projector capable of mounting the light source apparatus described in each embodiment described above will be described as an example.

FIG. 58 is a schematic diagram showing a configuration example of the projector.

A projector 2000 includes a light source apparatus 1200 according to one embodiment of the present disclosure, the lighting system 1500, and a projection system 1700. The lighting system 1500 includes an image generation element 1510 and a lighting optical system 1520. The image generation element 1510 generates an image based on applied light. The lighting optical system 1520 applies output light coming from the light source apparatus 1200 to the image generation element 1510. The projection system 1700 projects the image generated by the image generation element 1510.

As shown in FIG. 58, the lighting system 1500 includes an integrator element 1530, a polarization conversion element 1540, and a light collecting lens 1550. The integrator element 1530 includes a first fly-eye lens 1531 and a second fly-eye lens 1532. The first fly-eye lens 1531 includes a plurality of microlenses two-dimensionally arranged. The second fly-eye lens 1532 includes a plurality of microlenses that are arranged to correspond to the respective microlenses of the first fly-eye lens 1531.

Parallel light that enters the integrator element 1530 from the light source apparatus 1200 is split into a plurality of light fluxes by the microlenses of the first fly-eye lens 1531 to form images on the corresponding microlenses of the second fly-eye lens 1532. The microlenses of the second fly-eye lens 1532 each function as a secondary light source and apply a plurality of parallel light beams with the same luminance to the polarization conversion element 1540 as incident light. The integrator element 1530 has a function of trimming the incident light to be applied to the polarization conversion element 1540 from the light source apparatus 1200 so as to have a uniform luminance distribution as a whole.

The polarization conversion element 1540 has a function of making a polarization state of the incident light uniform, the incident light being input via the integrator element 1530 and the like. For example, the polarization conversion element 1540 outputs output light including blue laser light B3, green light G3, and red light R3 via the light collecting lens 1550 and the like arranged on the output side of the light source apparatus 1200.

The lighting optical system 1520 includes dichroic mirrors 1560 and 1570, mirrors 1580, 1590, and 1600, relay lenses 1610 and 1620, field lenses 1630R, 1630G, and 1630B, liquid crystal light valves 1510R, 1510G, and 1510B serving as the image generation element, and a dichroic prism 1640.

The dichroic mirrors 1560 and 1570 have property of selectively reflecting light of color in a predetermined wavelength range and transmitting light in the other wavelength range. With reference to FIG. 58, for example, the dichroic mirror 1560 selectively reflects the red light R3. The dichroic mirror 1570 selectively reflects the green light G3 out of the green light G3 and the blue light G3 having passed through the dichroic mirror 1560. The remaining blue light G3 passes through the dichroic mirror 1570. Thus, the light output from the light source apparatus 1200 is split into a plurality of light beams with different colors.

The split red light R3 is reflected on the mirror 1580, converted into parallel light by passing through the field lens 1630R, and then input into the liquid crystal light valve 1510R for modulation of red light. The green light G3 is converted into parallel light by passing through the field lens 1630G and then input into the liquid crystal light valve 1510G for modulation of green light. The blue light G3 passes through the relay lens 1610 and is reflected on the mirror 1590, and further passes through the relay lens 1620 and is reflected on the mirror 1600. The blue light G3 reflected on the mirror 1600 is converted into parallel light by passing through the field lens 1630B, and then input into the liquid crystal light valve 1510B for modulation of blue light.

The liquid crystal light valves 1510R, 1510G, and 1510B are electrically connected to a signal source (for example, personal computer (PC)) (not shown) that supplies an image signal containing image information. The liquid crystal light valves 1510R, 1510G, and 1510B modulate the input light for each pixel based on supplied image signals of the respective colors, and generate a red-color image, a green-color image, and a blue-color image, respectively. The modulated light of each color (formed image) is input into the dichroic prism 1640 to be combined. The dichroic prism 1640 superposes and combines the light beams of the respective colors that are input from the three directions, and then outputs the combined light toward the projection system 1700.

The projection system 1700 includes a plurality of lenses 1710 and the like and applies the light combined by the dichroic prism 1640 onto a screen (not shown). Thus, a full-color image is displayed.

As described in the above embodiments, the light source apparatus 1200 according to this embodiment includes a concave reflecting surface to collect laser light from a plurality of laser light sources. Thus, the light source apparatus can be downsized. Further, when an optical member different from the concave reflecting surface is appropriately provided to the second optical system, a light source member with a variety of configurations can be provided.

Figure 59:
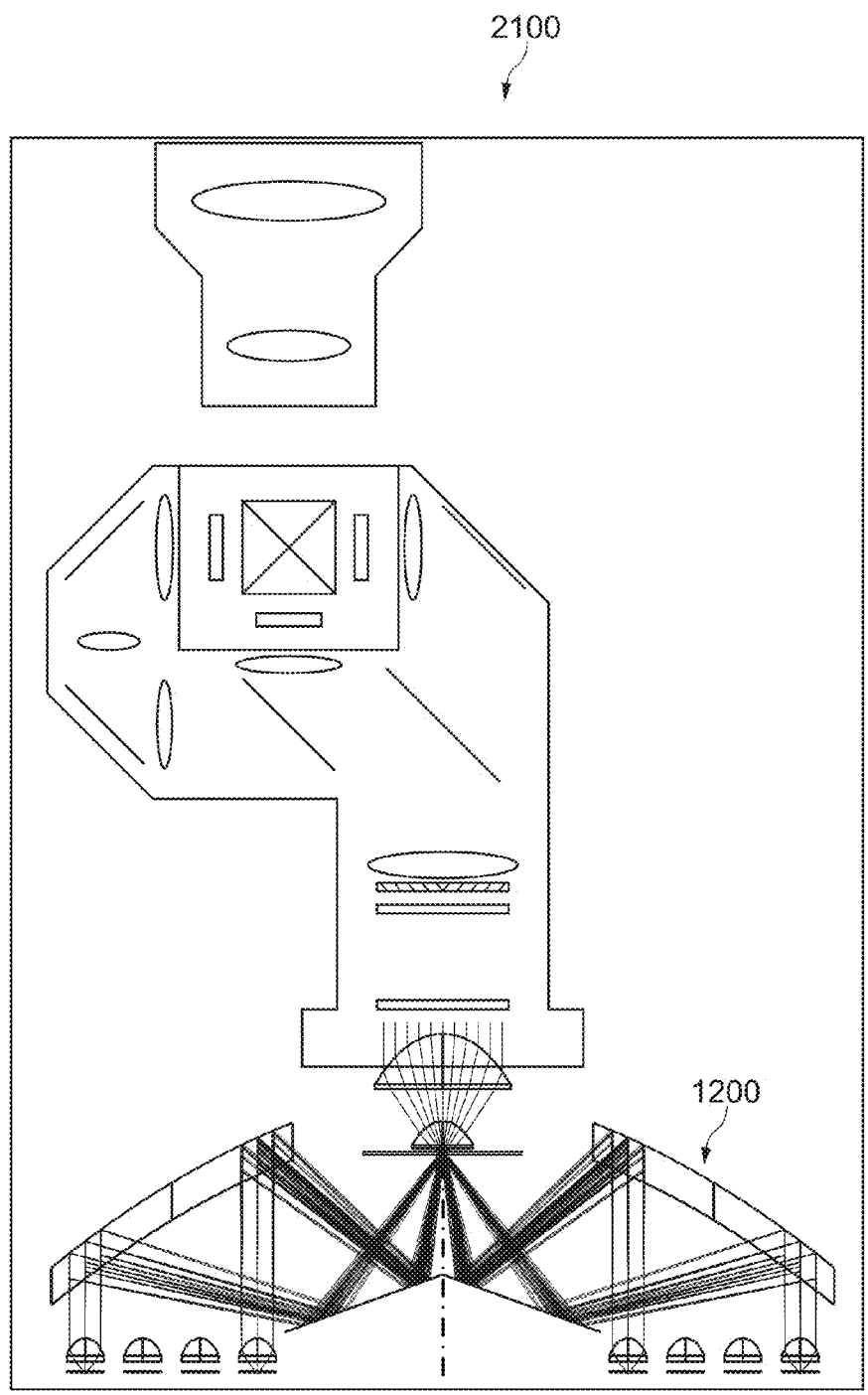
FIG. 59 is a schematic diagram showing another configuration example of the projector according to an embodiment of the present disclosure.
Figure 60:
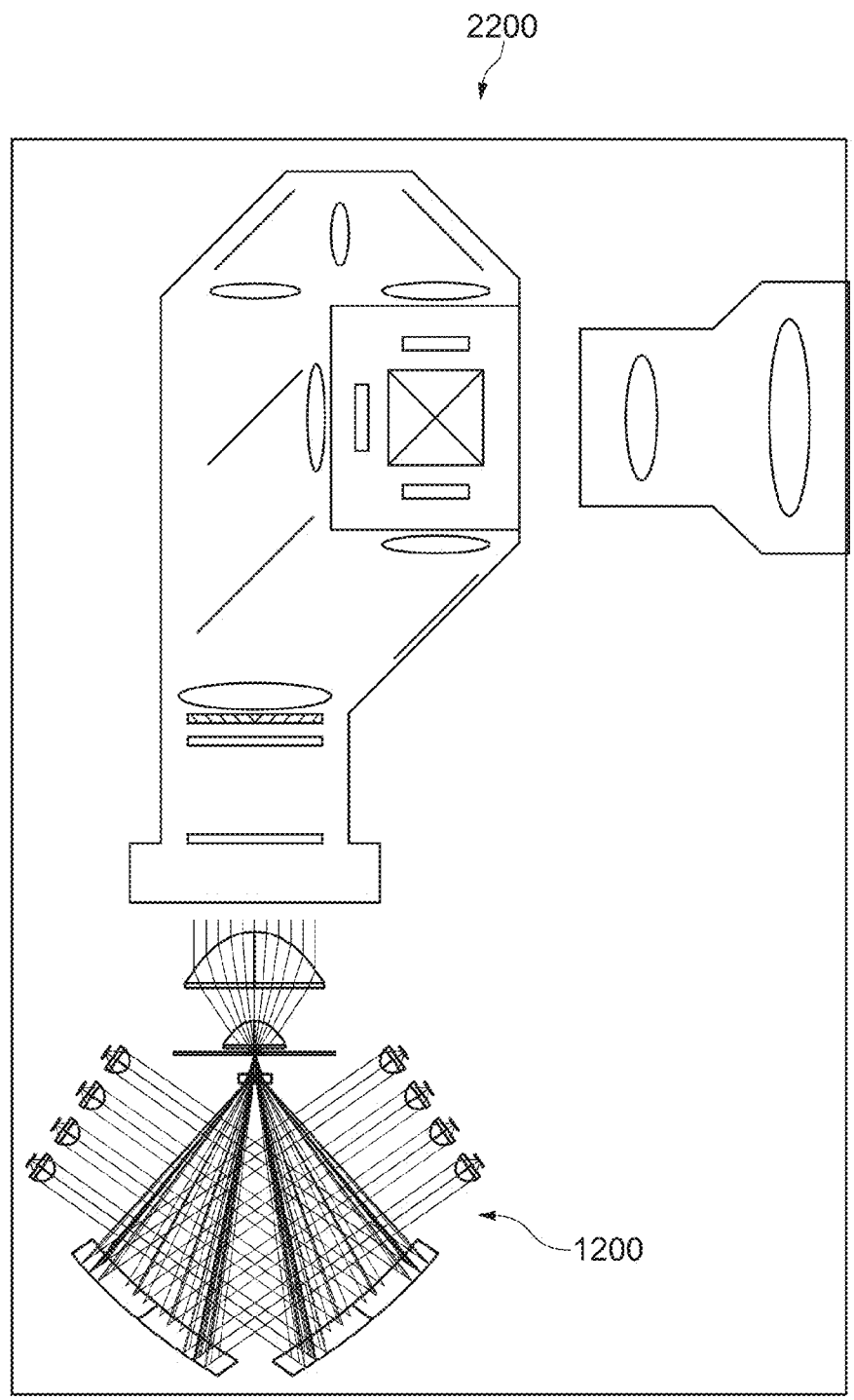
FIG. 60 is a schematic diagram showing another configuration example of the projector according to an embodiment of the present disclosure.

As a result, for example, as shown in FIGS. 59 and 60, the light source apparatus 1200 according to this embodiment can be appropriately configured so as to be accommodated in a limited space. In a projector 2100 shown in FIG. 59, the light source apparatus 1200 (second embodiment shown in FIG. 16) that is small in size for the output direction (length direction) of output light is used. In a projector 2200 shown in FIG. 60, the light source apparatus 1200 (fourth embodiment shown in FIG. 27) that is small in size for the direction (width direction) orthogonal to the output direction is used. As described above, the configuration of the light source apparatus can be appropriately set. Therefore, the downsizing of the projector, the improvement in design of the outer shape of the projector, and the like can be achieved.

Other Embodiments

The present disclosure is not limited to the embodiments described above and can achieve other various embodiments.

For example, an optical element such as a dichroic film may be arranged between the phosphor layer and the first light source unit, typically, on an arrangement surface of the phosphor wheel or an opposite surface thereof. The blue laser light that is input at an incident angle smaller than a predetermined value is transmitted, and the blue laser light that is input at an incident angle larger than the predetermined value is reflected. The use of such an optical element allows at least part of the blue laser light reflected on the phosphor layer (light with a large incident angle) to be applied to the phosphor layer again. As a result, use efficiency of the blue laser light can be improved.

In the case where such an optical element is used, in order to reduce the incident angle of the blue laser light initially applied, the concave lens as shown in FIG. 17 may be appropriately used. Thus, the blue laser light initially applied can be prevented from being reflected by the optical element. In such a manner, when an optical member such as a lens to be used in the second optical system is appropriately selected, various objectives can be achieved.

In the projector shown in FIG. 58, the lighting system 1500 formed of a transmissive liquid crystal panel is described. However, the lighting system can also be formed of a reflective liquid crystal panel. A digital micro-mirror device (DMD) and the like may be used as the image generation element. Additionally, a polarization beam splitter (PBS), a color combining prism that combines video signals of colors of RGB, a total internal reflection (TIR) prism, and the like may be used, instead of the dichroic prism 1640.

Further, in the embodiment described above, an apparatus other than the projector may be formed as the image display apparatus according to the embodiment of the present disclosure. In addition, the light source apparatus according to the embodiment of the present disclosure may be used for an apparatus other than the image display apparatus.

At least two of feature points of the embodiments described above may be combined.

It should be noted that the present disclosure can have the following configurations.

(1) A light source apparatus, including:

at least one solid-state light source configured to output light in a predetermined wavelength range;

a first optical system including at least one aspherical surface configured to convert a light flux from the at least one solid-state light source into a substantially parallel light flux;

an output unit including at least one light emitter that is excited by the light from the at least one solid-state light source and emits visible light with a wavelength longer than that of the light, the output unit being configured to output, as output light, light containing the light in the predetermined wavelength range and the visible light from the at least one light emitter; and a second optical system including at least one concave reflecting surface, the second optical system being configured to reflect the light on the at least one concave reflecting surface, the light coming from the at least one solid-state light source and being converted into the substantially parallel light flux by the first optical system, to collect the light to the at least one light emitter of the output unit.

(2) The light source apparatus according to (1), in which each of the first optical system and the second optical system has a focal length that satisfies the following expression, $1<f2/f1<80$ where f1 represents the focal length of the first optical system, and f2 represents the focal length of the second optical system.

(3) The light source apparatus according to (1) or (2), in which the at least one concave reflecting surface includes a rotation-symmetric aspherical surface that satisfies the following expression, $1.5<Km<-0.5$ where Km represents a conic constant of the at least one concave reflecting surface.

(4) The light source apparatus according to (1) or (2), in which the at least one concave reflecting surface includes a free-form surface that is free from an axis of rotational symmetry.

(5) The light source apparatus according to any one of (1) to (4), in which the second optical system includes an optical member configured to guide the light to the at least one light emitter, the light coming from the at least one solid-state light source and being reflected on the at least one concave reflecting surface.

(6) The light source apparatus according to (5), in which the optical member has a focal length that satisfies the following expression, $-200<f2/fm<200$ where f2 represents a focal length of the second optical system, and fm represents a focal length of the optical member.

(7) The light source apparatus according to (5) or (6), in which the optical member includes a lens and has a focal length that satisfies the following expression, $-100<fM/fm<100$ where fM represents a focal length of the at least one concave reflecting surface, and fm represents a focal length of the lens.

(8) The light source apparatus according to (5) or (6), in which the optical member includes a second concave reflecting surface that is different from a first concave reflecting surface serving as the at least one concave reflecting surface of the second optical system, the optical member having a focal length that satisfies the following expression, $0.5<fM/fm<50$ where fM represents a focal length of the first concave reflecting surface, and fm represents the focal length of the optical member.

(9) The light source apparatus according to (5) or (6), in which the optical member includes a convex reflecting surface and has a focal length that satisfies the following expression, $-50<fM/fm<-0.5$ where fM represents a focal length of the at least one concave reflecting surface, and fm represents the focal length of the optical member.

(10) The light source apparatus according to (5), in which the optical member includes a planar reflecting surface configured to reflect the light to the at least one light emitter, the light coming from the at least one solid-state light source and being reflected on the at least one concave reflecting surface.

(11) The light source apparatus according to (10), in which the planar reflecting surface is arranged at a rotation angle with a state parallel to an arrangement surface on which the at least one light emitter is arranged being set to zero degrees and with a rotation direction from the state toward the at least one concave reflecting surface about a predetermined rotation axis being set as a positive direction, the rotation angle satisfying the following expression, $0°<Am<60°$ where Am represents the rotation angle of the planar reflecting surface.

(12) The light source apparatus according to any one of (1) to (11), in which a plurality of light collecting optical systems each including a set of the first optical system and the second optical system are arranged symmetrically about a predetermined reference axis based on a position of the at least one light emitter.

(13) The light source apparatus according to (12), in which the second optical system includes an optical member configured to guide the light to the at least one light emitter, the light coming from the at least one solid-state light source and being reflected on the at least one concave reflecting surface, the light source apparatus further including an arrangement mechanism configured to adjust an arrangement of the optical member included in each of the plurality of light collecting optical systems.

(14) The light source apparatus according to any one of (1) to (13), in which the output unit includes a rotating wheel including an arrangement surface on which the at least one light emitter is arranged, the rotating wheel being configured to rotate about a predetermined rotation axis extending in a direction vertical to the arrangement surface, and the second optical system is configured to collect the light from the first optical system to a plurality of positions on the at least one light emitter arranged on the arrangement surface of the rotating wheel, the plurality of positions being different from one another in distance from the rotation axis.

(15) The light source apparatus according to any one of (1) to (14), further including a third optical system configured to convert a light flux of the output light into a substantially parallel light flux, the output light being output from the output unit, the third optical system having a variable focal length.

It should be understood by those skilled in the art that various modifications, combinations, sub-combinations and alterations may occur depending on design requirements and other factors insofar as they are within the scope of the appended claims or the equivalents thereof.

What is claimed is:

1. A light source apparatus, comprising:
a plurality of light source units, each including:
  a solid-state light source configured to output light;
  a first optical system configured to convert light flux from the solid-state light source into a substantially parallel light flux; and
  a second optical system configured to direct the parallel light flux from the first optical system to a light collecting point; and
an output unit including a light emitter that is excited by light from each of the light source units and a rotating wheel having an arrangement surface on which the light emitter is disposed, the rotating wheel being configured to rotate about a predetermined rotation axis extending in a direction perpendicular to the arrangement surface, wherein
light reflected by the second optical systems of the respective light source units is directed to a plurality of light collecting points on the light emitter, the plurality of light collecting points being at different distances from the rotation axis.

2. The light source apparatus according to claim 1, wherein the light source units are symmetrically arranged with respect to an origin and wherein the origin is displaced from the rotation axis of the rotating wheel.

3. The light source apparatus according to claim 1, wherein the light collecting points are distributed on a plurality of circles on the light emitter as the rotating wheel rotates, the circles having different diameters.

4. The light source apparatus according to claim 1, wherein the first optical system includes an aspherical surface.

5. The light source apparatus according to claim 4, wherein the second optical system includes a concave reflecting surface.

6. The light source apparatus according to claim 1, wherein each of the first optical system and the second optical system has a focal length that satisfies the following expression:

$$1 < f2/f < 80$$

where f1 represents the focal length of the first optical system and f2 represents the focal length of the second optical system.

7. The light source apparatus according to claim 1, wherein each of the light source units includes two or more solid-state light sources configured to output light and a corresponding number of aspherical surfaces configured to convert light flux from the solid-state light source into a substantially parallel light flux.

8. The light source apparatus according to claim 1, wherein the second optical system includes an optical member configured to guide the light reflected by the concave reflecting surface to the light emitter.

9. The light source apparatus according to claim 8, wherein the optical member comprises a convex reflecting member.

10. An image display apparatus comprising:
a light source apparatus comprising a plurality of light source units, each including:
  a solid-state light source configured to output light;
  a first optical system configured to convert light flux from the solid-state light source into a substantially parallel light flux; and
  a second optical system configured to direct the parallel light flux from the first optical system to a light collecting point; and
an output unit including a light emitter that is excited by light from each of the light source units and a rotating wheel having an arrangement surface on which the light emitter is disposed, the rotating wheel being configured to rotate about a predetermined rotation axis extending in a direction perpendicular to the arrangement surface, wherein
light reflected by the second optical systems of the respective light source units is directed to a plurality of light collecting points on the light emitter, the plurality of light collecting points being at different distances from the rotation axis; and
an image generation system including:
  an image generation element configured to generate an image based on applied light, and a lighting optical system configured to apply the output light from the light source apparatus to the image generation element; and
  a projection system configured to project the image generated by the image generation element.

* * * * *